United States Patent [19]
Olnowich

[11] Patent Number: 6,098,123
[45] Date of Patent: Aug. 1, 2000

[54] METHOD AND APPARATUS FOR DYNAMIC ALLOCATION OF BANDWIDTH TO/FROM NETWORK ADAPTER MEMORY AMONGST ACTIVE INPUT/OUTPUT PORTS

[75] Inventor: Howard Thomas Olnowich, Endwell, N.Y.

[73] Assignee: International Business Machines Corporation, Armonk, N.Y.

[21] Appl. No.: 08/853,387

[22] Filed: May 8, 1997

[51] Int. Cl.[7] .................................................. G06F 13/00
[52] U.S. Cl. .............................. 710/41; 710/31; 710/33; 710/56; 710/131; 370/254; 370/260; 370/413; 370/414
[58] Field of Search ...................... 710/127, 131, 710/129, 56, 105, 107, 33, 41, 31; 709/231, 238; 370/254, 459, 359, 414, 260, 413

[56] References Cited

U.S. PATENT DOCUMENTS

| | | | |
|---|---|---|---|
| 4,603,382 | 7/1986 | Cole et al. ................................. | 710/56 |
| 4,893,305 | 1/1990 | Fernandez et al. ...................... | 370/254 |
| 5,115,309 | 5/1992 | Hang ........................................ | 348/388 |
| 5,367,643 | 11/1994 | Chang et al. ............................. | 395/325 |
| 5,404,461 | 4/1995 | Olnowich et al. ....................... | 395/325 |
| 5,504,744 | 4/1996 | Adams et al. ........................... | 370/60.1 |
| 5,634,015 | 5/1997 | Chang et al. ............................ | 710/129 |
| 5,640,604 | 6/1997 | Hirano ..................................... | 710/56 |
| 5,673,290 | 9/1997 | Cioffi ....................................... | 375/260 |
| 5,734,843 | 3/1998 | Gephardt et al. ........................ | 710/107 |
| 5,748,629 | 5/1998 | Caldara et al. .......................... | 370/389 |
| 5,748,914 | 5/1998 | Barth et al. .............................. | 710/105 |
| 5,761,455 | 6/1998 | King et al. ............................... | 710/127 |
| 5,850,395 | 12/1998 | Hauser et al. ........................... | 370/398 |
| 5,912,889 | 6/1999 | Preas et al. .............................. | 370/359 |

FOREIGN PATENT DOCUMENTS 408249142  9/1996  Japan .

OTHER PUBLICATIONS

"Multiple Transmission Speeds for Asynchronous Networks", *IBM Technical Disclosure Bulletin*, vol. 38, No. 07, Jul. 1995, pp. 179 and 180.

*Primary Examiner*—Thomas C. Lee
*Assistant Examiner*—Tammara Peyton
*Attorney, Agent, or Firm*—Shelley M Beckstrand

[57] ABSTRACT

A dynamic allocation system and method is provided for allocating memory bandwidth associated with a store and forward memory communicating between a node processsor and a network. Dynamic allocation is controlled by a state machine in a network adapter, which monitors on a real time basis the active users of the network adapter memory, the node processor writing or reading adapter memory, the network sending port, and the network receiving port. Bandwidths are allocated to users with instant response to user bandwidth demand changes. Programmable options allow a node processor to control bandwidth allocations for various user scenarios.

24 Claims, 48 Drawing Sheets

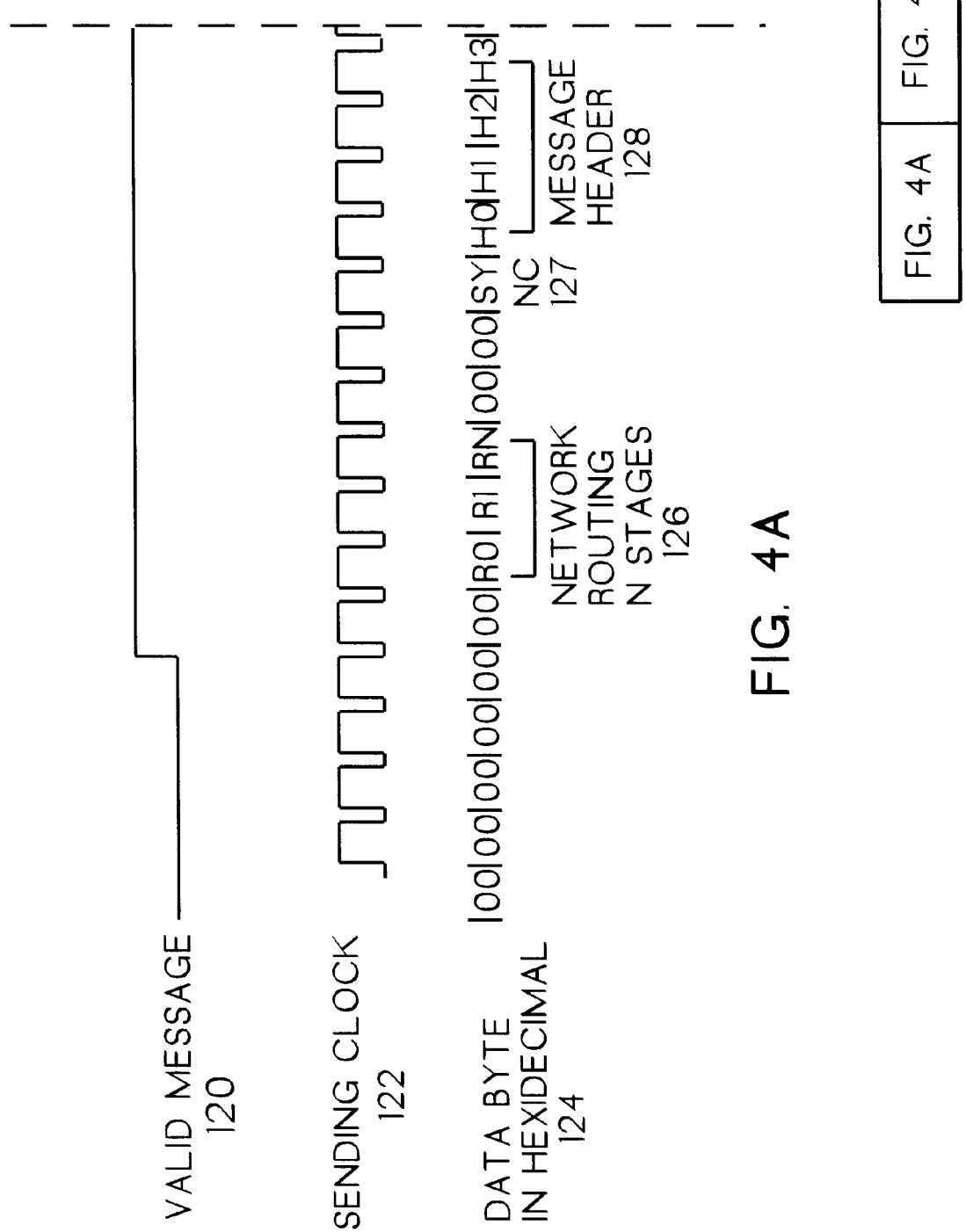

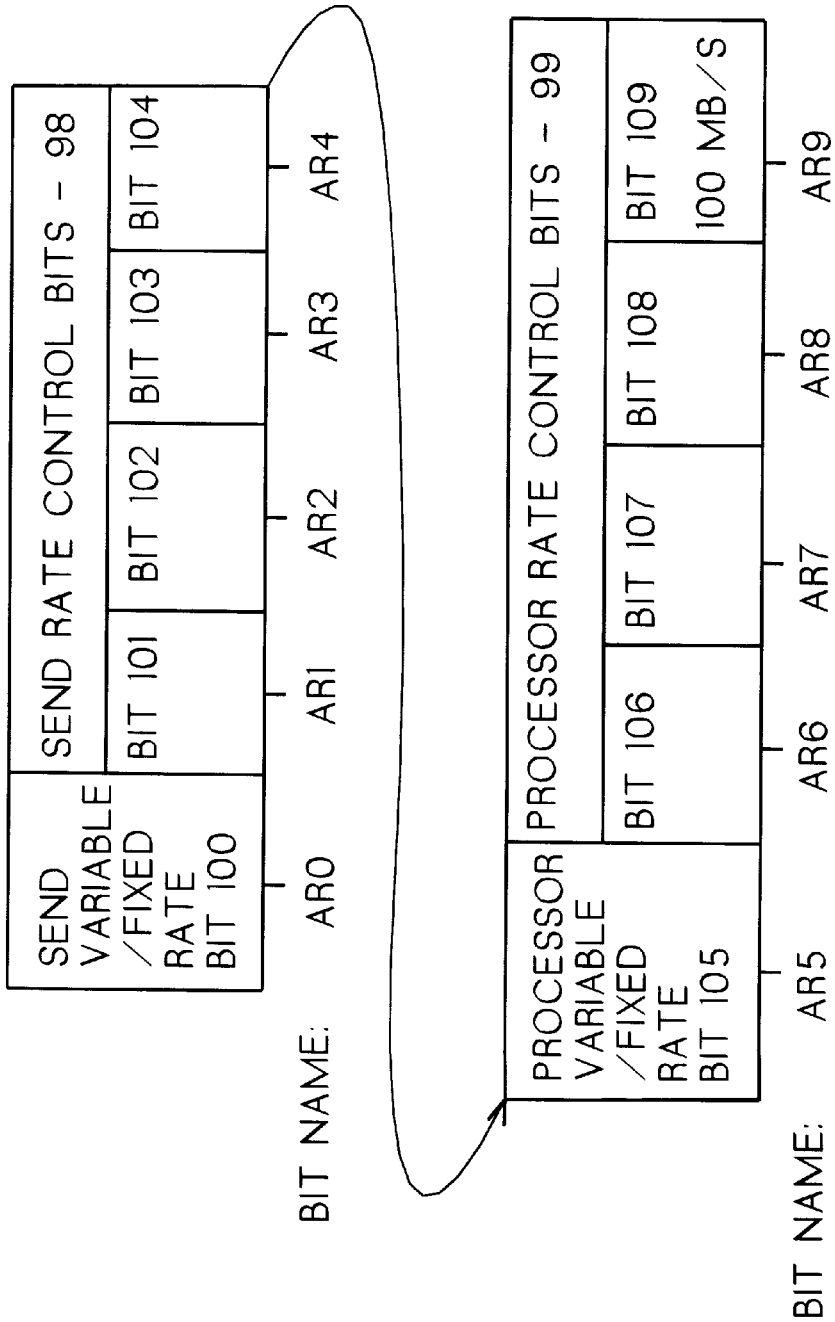

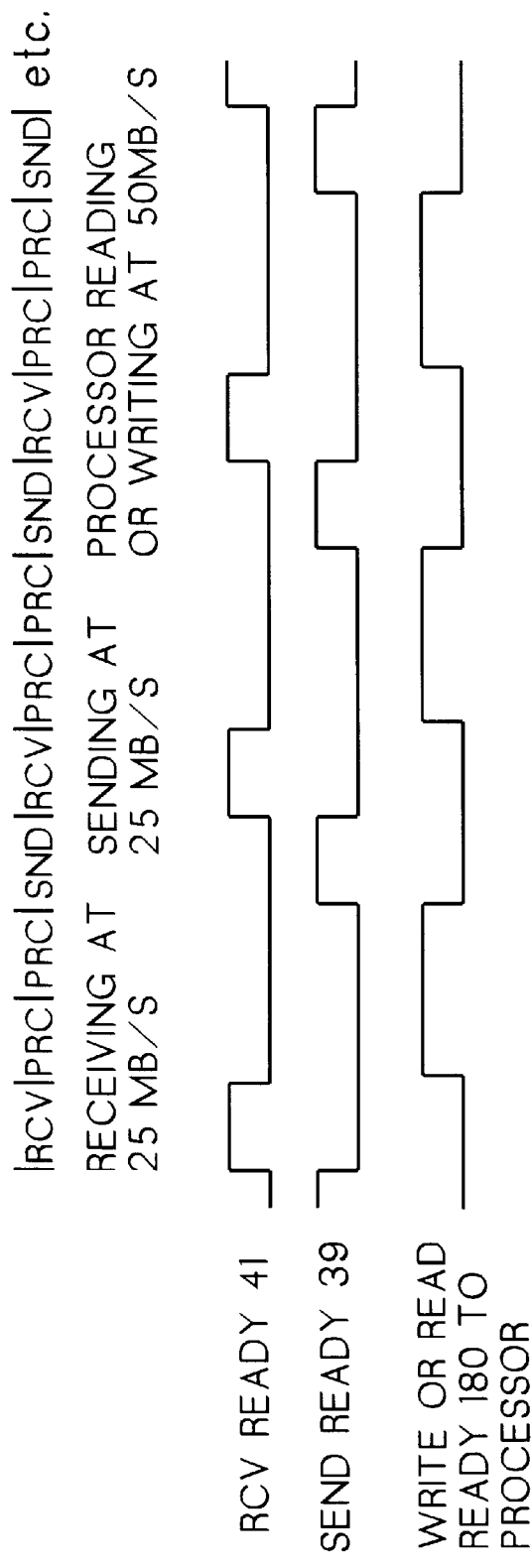

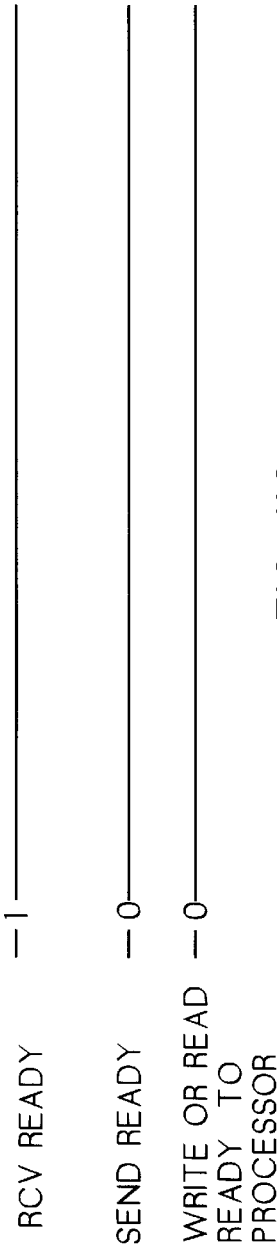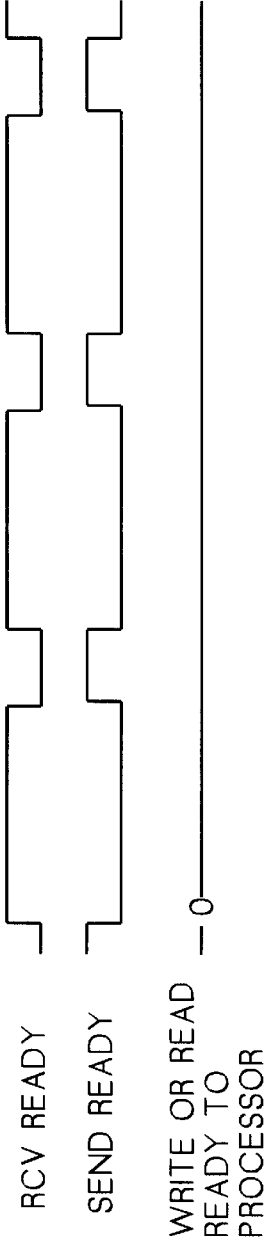
FIG. 11C
FIG. 11D

FIG. 11G

|RCV|RCV|Snd|Snd|RCV|RCV|Snd|Snd|RCV|RCV|Snd|Snd| etc.

RCV READY — RECEIVING AT 50 MB/S

SEND READY — SENDING AT 50 MB/S

WRITE OR READ READY TO PROCESSOR — 0

FIG. 11H

|RCV|RCV|Prc|Prc|RCV|RCV|Prc|Prc|RCV|RCV|Prc|Prc| etc.

RCV READY — RECEIVING AT 50 MB/S

SEND READY — 0

WRITE OR READ READY TO PROCESSOR — PROCESSOR READING OR WRITING AT 50 MB/S

|Prc | Prc | Prc | Prc |Prc | Prc | Prc | Prc |Prc | Prc | Prc | etc.
PROCESSOR READING
OR WRITING AT 100 MB/S

RCV READY ——0————————————

SEND READY ——0————————————

WRITE OR READ ——1————————————
READY

FIG. 12E

|Snd |Snd | Snd | Snd| Snd|Snd |Snd | Snd|Snd |Snd |Snd | etc.
SENDING AT
100 MB/S

RCV READY ——0————————————

SEND READY ——1————————————

WRITE OR READ ——0————————————
READY

FIG. 12F

METHOD AND APPARATUS FOR DYNAMIC ALLOCATION OF BANDWIDTH TO/FROM NETWORK ADAPTER MEMORY AMONGST ACTIVE INPUT/OUTPUT PORTS

BACKGROUND OF THE INVENTION

1. Technical Field of the Invention

This invention relates to digital parallel processing systems, wherein a plurality of nodes communicate via messages over an interconnection network. In particular, this invention deals with the message store and forward mechanism which operates between each processing node and the interconnection network.

2. Background Art

In parallel systems, as also in PC clustering, a plurality of nodes communicate via messages sent over an interconnection network. Each node usually contains one processor and one network adapter to connect the processor to the network. State of the art network adapters provide memory on the adapter to store and forward messages to and from the network. The adapter memory usually becomes the bottleneck of the system. Consequently, there is a need in the art for a dynamic allocation method and apparatus capable of more efficient usage of the adapter memory.

Most network adapters in the art use a store and forward adapter memory to send and receive messages to and from the network. Normally a single memory at the adapter supports four ports to handle the message traffic to and from the network. Message traffic includes messages arriving at the adapter memory from the processor (Memory Port A), messages being sent from the adapter memory to the processor (Memory Port B), messages being sent from the adapter memory to the network (Memory Port C), and messages arriving, to the adapter memory from the network (Memory Port D). The prior art approach is to assign a static bandwidth to each of the 4 adapter memory ports to provide a balanced system. For instance, if the adapter memory supported a total bandwidth of 100 Mbytes/s, 25 Mbytes/s would be statically assigned to each port. This allocation is permanent and unchangeable. This type of approach assures that the memory will function successfully under worst case conditions, where all 4 ports are active simultaneously. However, the prior art approach reduces the performance of the system. A large percentage of the time the 4 ports are NOT active simultaneously, and the bandwidth associated with idle ports is wasted. Consequently, there is a need in the art for a method and system for dynamically allocating bandwidth to the adapter memory ports responsive to load conditions.

It is an object of the invention to provide a dynamic allocation method and apparatus capable of more efficient usage of the adapter memory.

It is a further object of the invention to provide a method and system for dynamically allocating bandwidth to the adapter memory ports responsive to load conditions.

SUMMARY OF THE INVENTION

In accordance with the apparatus of the invention, a communication network adapter comprises a receive port for receiving data from a communication network; a send port for sending data to said communication network; at least one processor port for communicating data with respect to a nodal processor; and dynamic allocation logic for dynamically allocating adapter memory bandwidth to the send port and processor port.

In accordance with a further aspect of the invention, the dynamic allocation logic is responsive to allocation control indicia from the nodal processor and to the presence of data at the receive port in allocating the memory bandwidth, and to changes in the control indicia for reallocating memory bandwidth during message transmission.

In accordance with the method of the invention data are communicated with respect to a network adapter memory by selectively receiving data from a communication network at a first adapter memory port; selectively sending data to said communication network at a second adapter memory port; selectively communicating data with respect to a nodal processor at a third adapter memory port; and dynamically allocating adapter memory bandwidth amongst the ports.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 4A–4B are a timing diagram for a byte-wide message transfer transmitted over the multi-speed network according to the preferred embodiments of this invention.

FIG. 6 is a block diagram showing the basic format of the allocation register in the network adapter for controlling the programmable allocation of adapter memory according to the preferred embodiment of this invention.

FIGS. 11A through 11H are diagrams showing the timing of the data flow control (ready) signals in relation to adapter basic timing for 7 different allocations of adapter memory bandwidth according to the preferred embodiment of this invention.

FIGS. 12A through 12G are diagrams showing the timing of the data flow control (ready) signals in relation to adapter basic timing for 8 additional allocations of adapter memory bandwidth according to the preferred embodiment of this invention.

FIGS. 13A through 13L are logic flow diagrams showing the logic to control memory bandwidth allocation based on the instantaneous data flow in and out of the adapter memory and the allocation register selections according to the preferred embodiment of this invention.

BEST MODE FOR CARRYING OUT THE INVENTION

The invention provides a method and apparatus for a network adapter to dynamically allocate adapter memory and network bandwidths instantaneously on a demand basis. This has the effect of increasing the system performance by a factor of up to two. For instance, the local memory bandwidth allocated to the nodal processor (Memory Ports A and B) in the prior art is a constant 50 megabytes per second (MB/s) of the 100 MB/s available. In accordance with the new dynamic allocation approach of the invention, the nodal processor would be allocated up to 100 MB/s to double its bandwidth, if the network memory ports were not active at the time. Likewise, send and receive ports C and D, respectively, to the network are allocated up to 100 MB/s each, if the other memory ports are not active. Network receiving port D has the highest priority and will always be given the bandwidth it requires to receive a message. The remainder of the bandwidth is allocated to any other active memory ports. For instance, in accordance with a preferred embodiment of the invention, if processor port A is active and transferring at 100 MB/s and the network receiving port D becomes active and requires 50 MB/s of bandwidth to receive a message, network receive port D will be given 50 MB/s of the adapter memory bandwidth immediately and the processor port A will be down shifted by dynamic allocation logic from 100 MB/s to 50 MB/s.

The network send and receive ports C and D, respectively, are a little more complex. Suppose the send and receive ports are both active and working at 50 MB/s, and the nodal processor also requires the use of the adapter memory. The rate of network receiving port D cannot be changed by the receiving end of the connection. That is, the sending node determines the transmission rate and the receiver must take or reject the data. Rejecting data because of a rate change slows network traffic. Consequently, in general, the rate of the receiving channel is not changed by the receiving network adapter. However, sending port C can change rates and can be dynamically allocated. In the above example, sending port C changes speed by dropping from 50 MB/s to 25 MB/s. This permits the nodal processor to use 25 MB/s of local memory bandwidth by controlling the READY line to be active only every fourth cycle. When the network receiving port D finishes, the nodal processor is up shifted to 75 MB/s, or 50 MB/s depending on whether sending port C is kept at 25 MB/s or is up shifted to 50 MB/s. The dynamic allocation method of the invention permits this type of flexibility.

As used herein, the terms "data" and "data message" may in context include command messages, control messages, data messages and all forms of digital information which may be transferred over a communication network.

Figure 1:
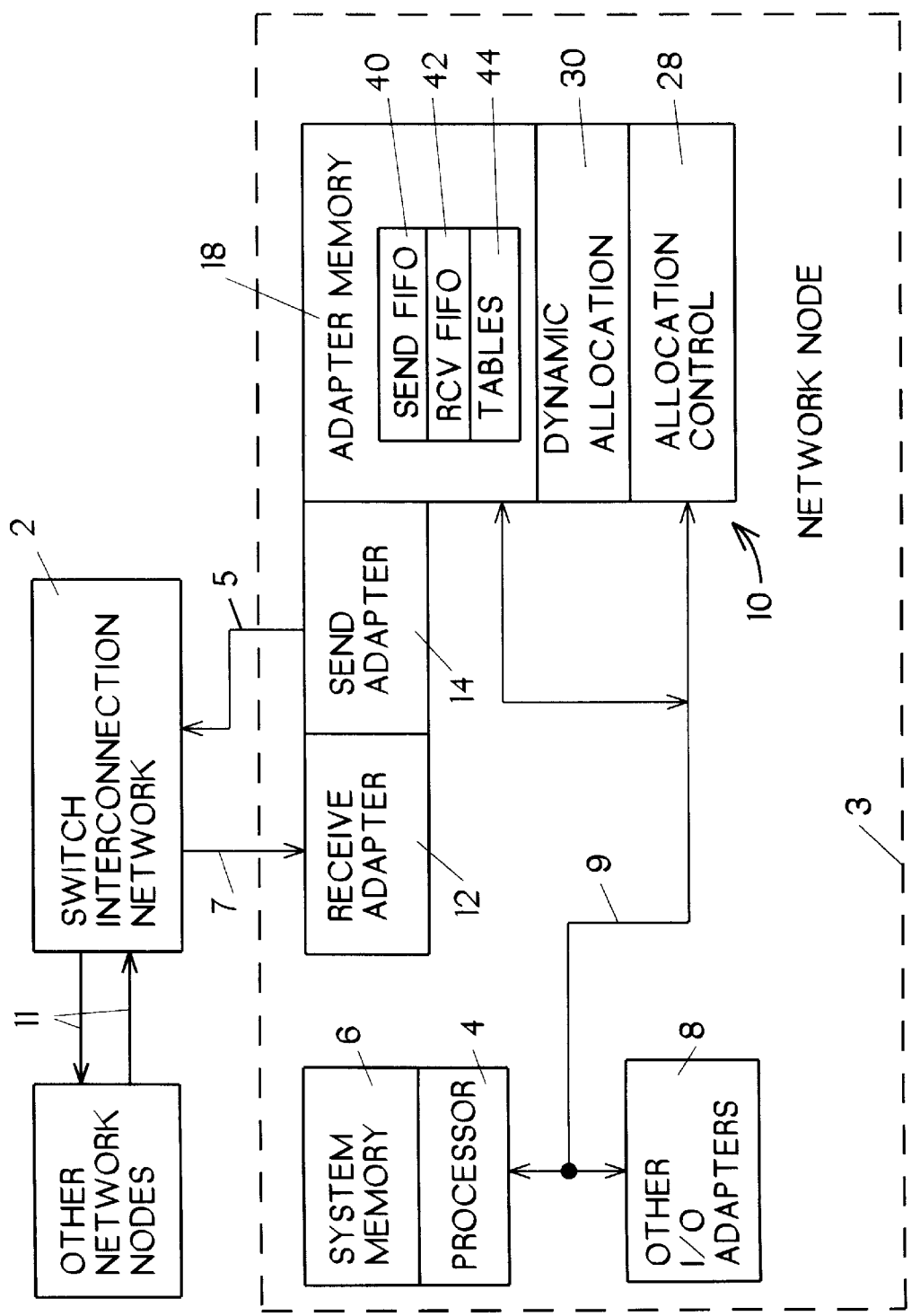
FIG. 1 is a diagram of a typical digital network showing the interconnection of a network node to the network and the components of the network node according to the preferred embodiments of this invention.

FIG. 1 shows a typical network node 3 implementing the disclosed concept. Node 3 includes processor 4, with system memory 6, attached to processor I/O bus 9, together with network adapter 10 and other I/O adapters 8. Node 3 attaches to one port of the network 2 in full duplex and contains Network Adapter 10 which converts processor 1/0 Bus 9 for communication to network 2. Network adapter 10 includes sending adapter 14 which transmits messages from network adapter 10 to other network adapters attached to network 2, receiving adapter 12 which receives messages from the other network adapters attached to network 2, and adapter memory 18 which has four ports (as will be described hereafter in connection with FIG. 2) and includes an area of memory dedicated as Send FIFO 40, an area of memory dedicated as receive (RCV) FIFO 42, and an area of memory dedicated as look-up and control tables 44. Identical copies of node 3 are connected to each bidirectional port 5, 7 and 11 of network 2, where each bidirectional port includes one sending port (such as port 5) into network 2 and one receiving port (such as port 7) from network 2. Adapter memory 18 also includes dynamic allocation logic 30 and allocation control register 28.

Figure 2:
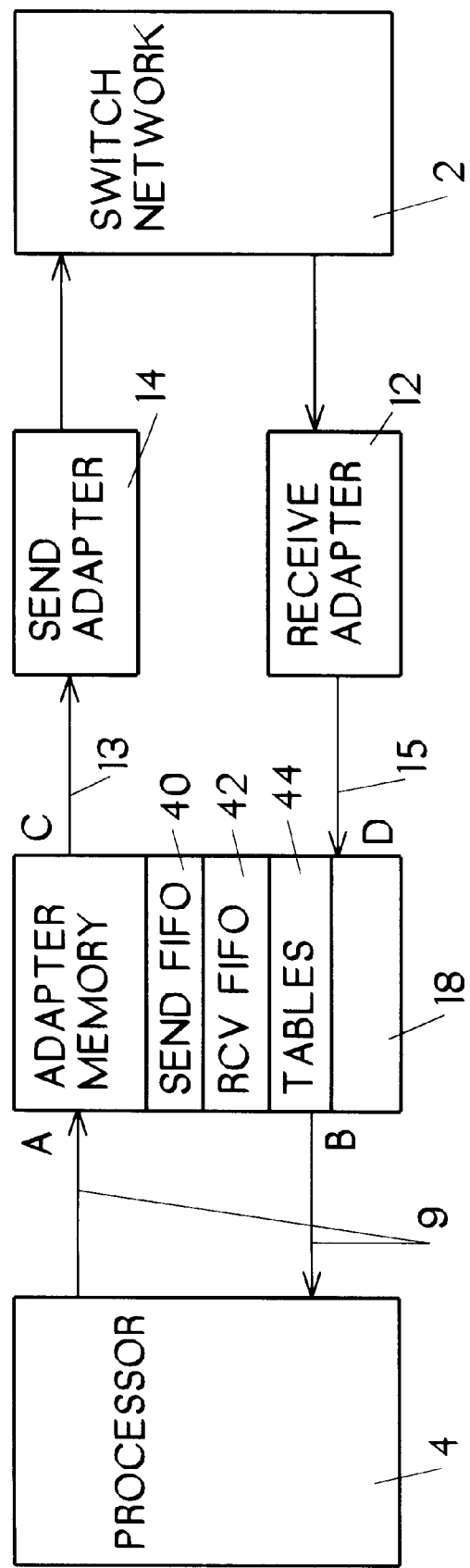
FIG. 2 is a diagram showing the four ported memory resident at the network adapter according to the preferred embodiments of this invention.

FIG. 2 shows a simplified diagram of memory 18 resident in network adapter 10 and the data flow in and out of memory 18 through the four ports, two ports A and B on bus 9 and one each at send adapter 14 and receive adapter 12, ports C and D, respectively. Processor 4 sends commands in the form of a 32-bit address word followed by 32-bit data words over the 1/0 bus 9 to network adapter 10. One of the processor commands writes messages directly to send FIFO 40, while another reads messages directly from RCV FIFO 42, and yet another writes control words to tables 44. The address word defines the operation to take place (write to send FIFO 40, read from RCV FIFO 42, or write/read tables 44). Messages for transmission to other nodes are sent from processor 4 over 1/0 bus 9 to send FIFO 40 in adapter memory 18. Sending adapter 14 reads the message from send FIFO 40 via port C bus 13 and transmits it over network 2 at the selected speed. The preferred embodiments assume for discussion purposes that sending adapter 14 selects one of 4 different speeds for the transmission for each message to network 2. The speed selection is made individually for each message transmitted and can be dynamically changed in between or during messages as required.

Network adapter 10 is a store-and-forward adapter supporting both send and receive operations to/from network 2. When receiving messages from network 2, network adapter 10 recovers the messages and routes them to RCV FIFO 42 over port D bus 15. The received message is temporarily stored in RCV FIFO 42 until a slave operation is initiated at network adapter 10 to read the message through port B over processor 1/0 bus 9 to processor 4. Processor 1/0 bus 9 supports both read port B and write port A from processor 4 to adapter memory 18.

As will be described hereafter, both sending adapter 14 and receiving adapter 12 include special logic to handle multi-speed messages.

The preferred embodiment of network 2 is a multi-stage interconnection network comprised of Allnode switches at each stage of network 2. The Allnode switch, described in U.S. Pat. No. 5,404,461, provides a network 2 that supports multiple speed transmissions inherently as described in the IBM Technical Disclosure Bulletin, "Multiple Transmission Speeds for Asynchronous Networks", Vol. 38, No. 07, July 1995, pages 179 and 180. The preferred Allnode switches have no central clock for controlling the network speed, instead the switch and network automatically conform to the speed at which an individual adapter transmits. Alternatively, other circuit switched networks that are unclocked could be used. Send adapter 14 and receiving adapter 12 are capable of transmitting and receiving, respectively, messages at various speeds as described in U.S. patent application Ser. No. 08/763,468, filed Dec. 10, 1996 by H. T. Olnowich for Network Adapters For Multi-Speed Transmissions, of common assignee (IBM Docket EN995119.) The present invention provides for dynamic allocation of memory 18 bandwidth to each memory port, and for decreasing or increasing the speed of transfers to network 2 or processor 4.

Figure 3A:
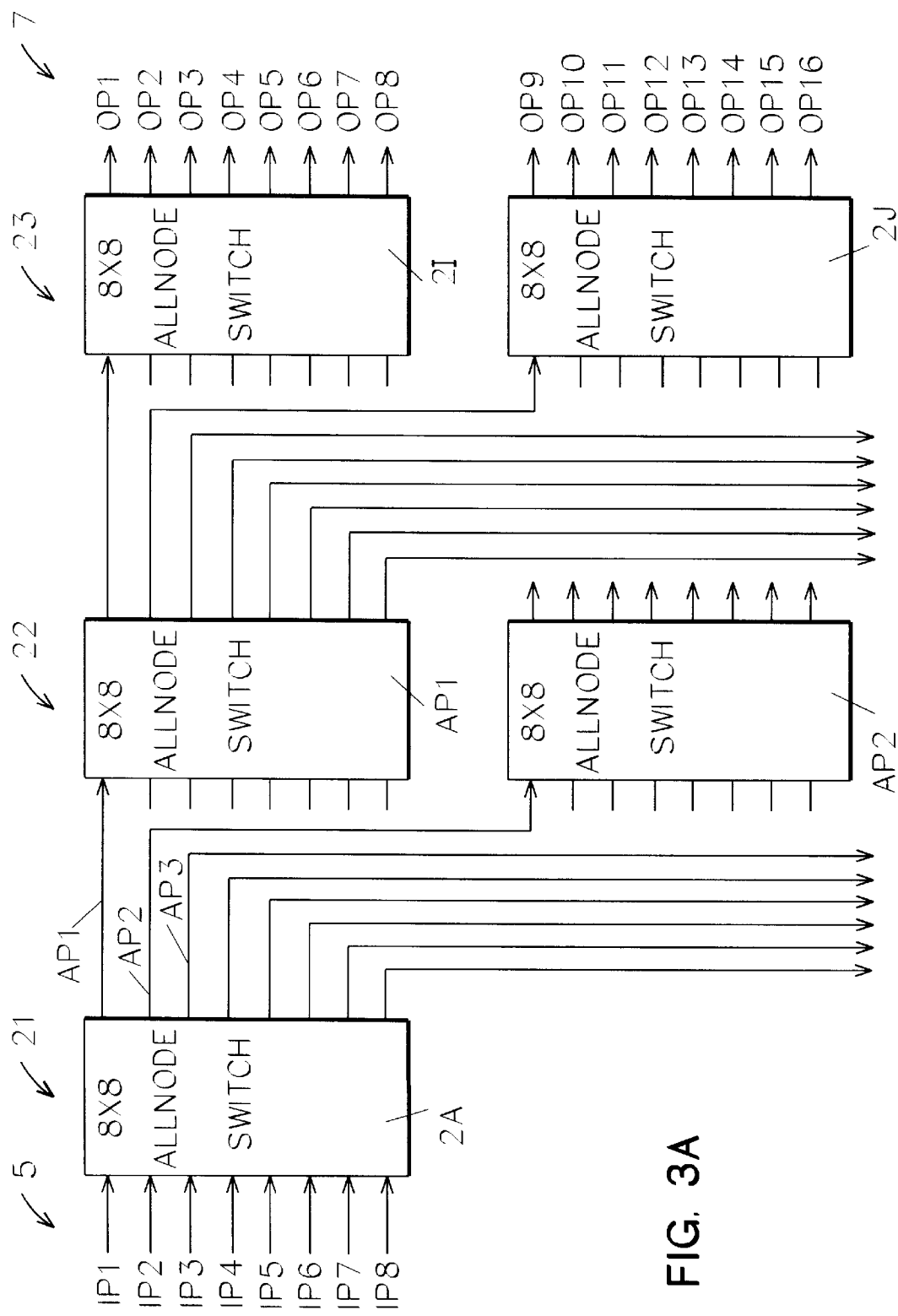
FIGS. 3A–3E show a typical network comprising 3 stages of switches according to the preferred embodiments of this invention.
Figure 3B:
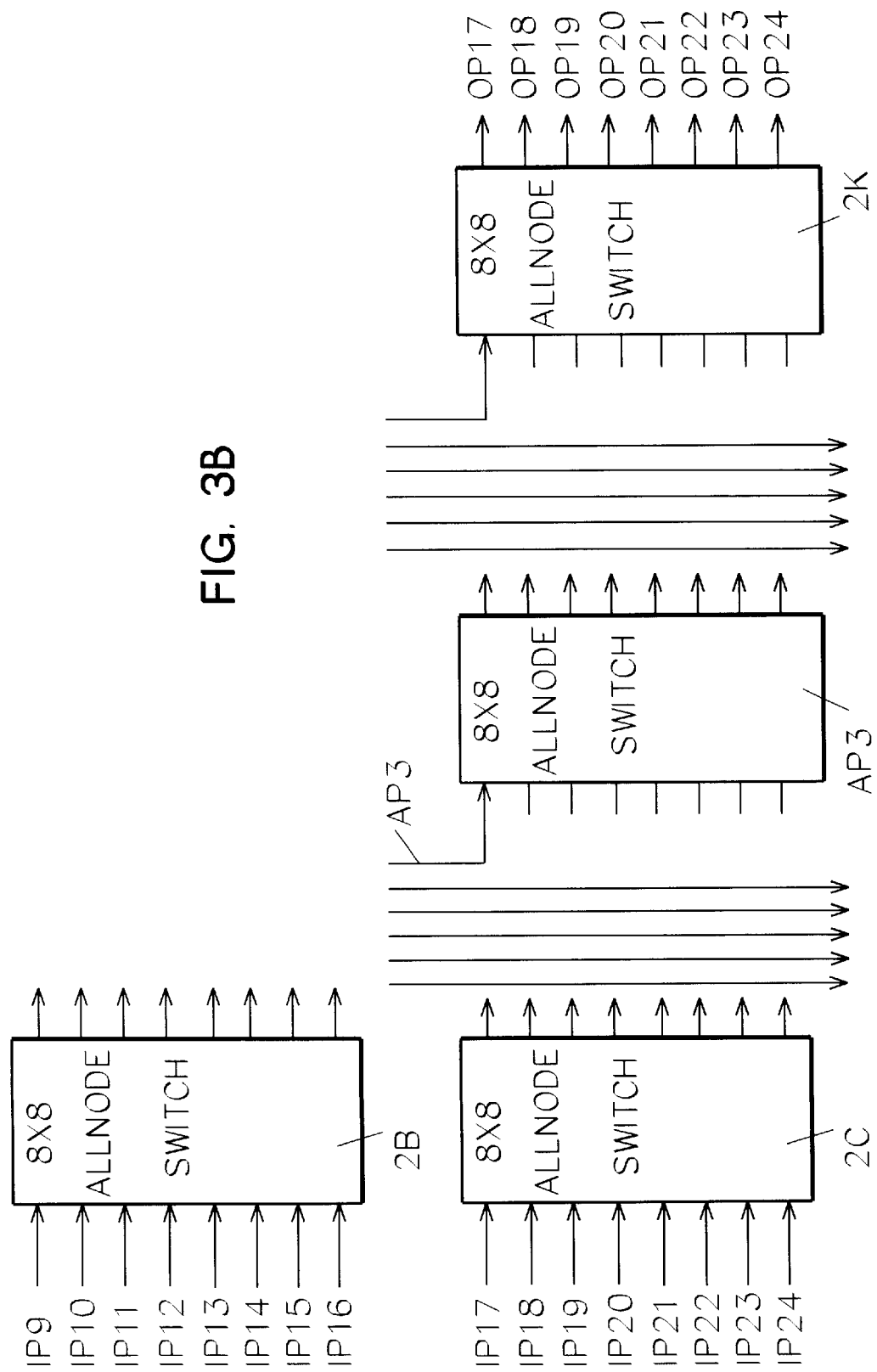
Figure 3C:
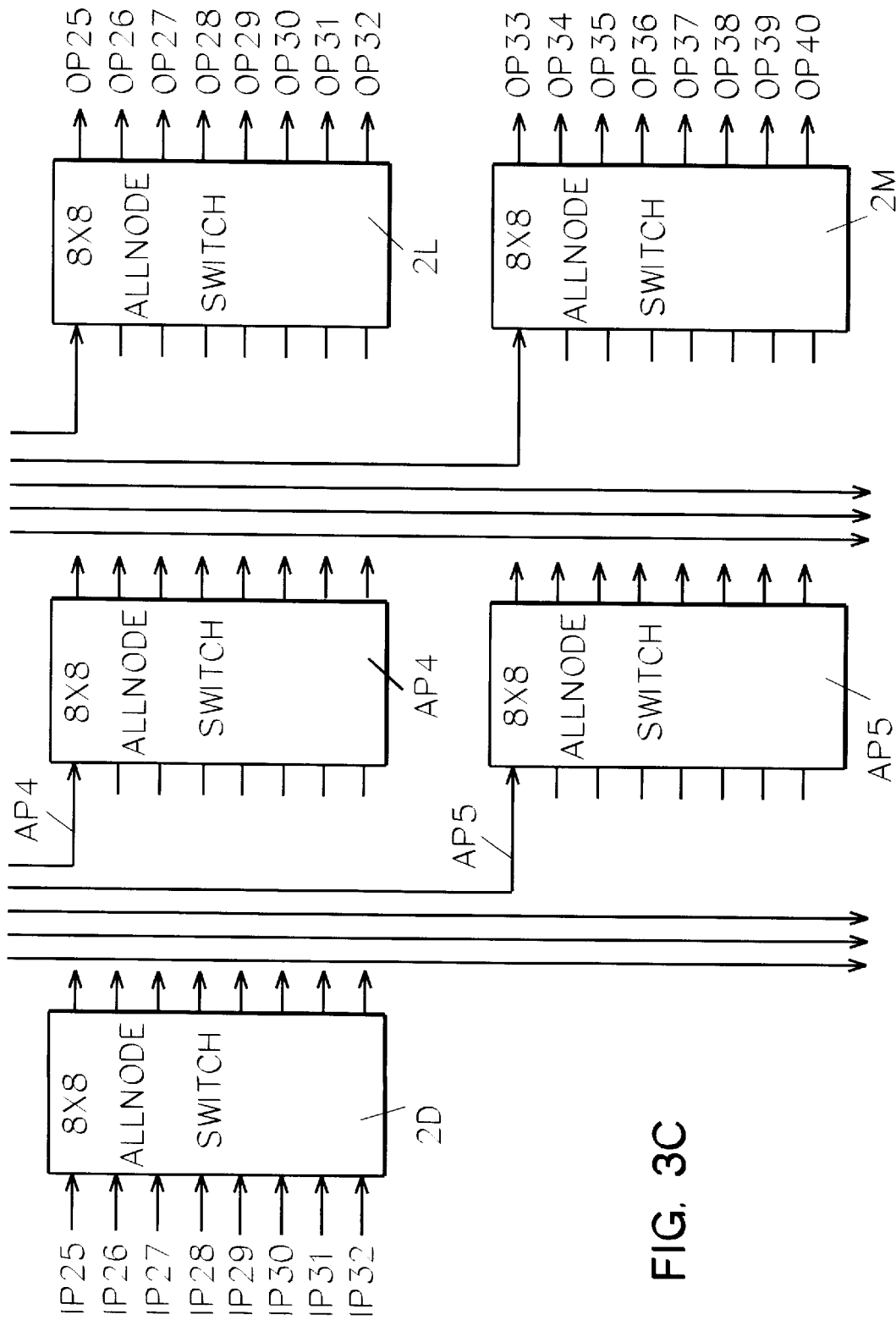
Figure 3D:
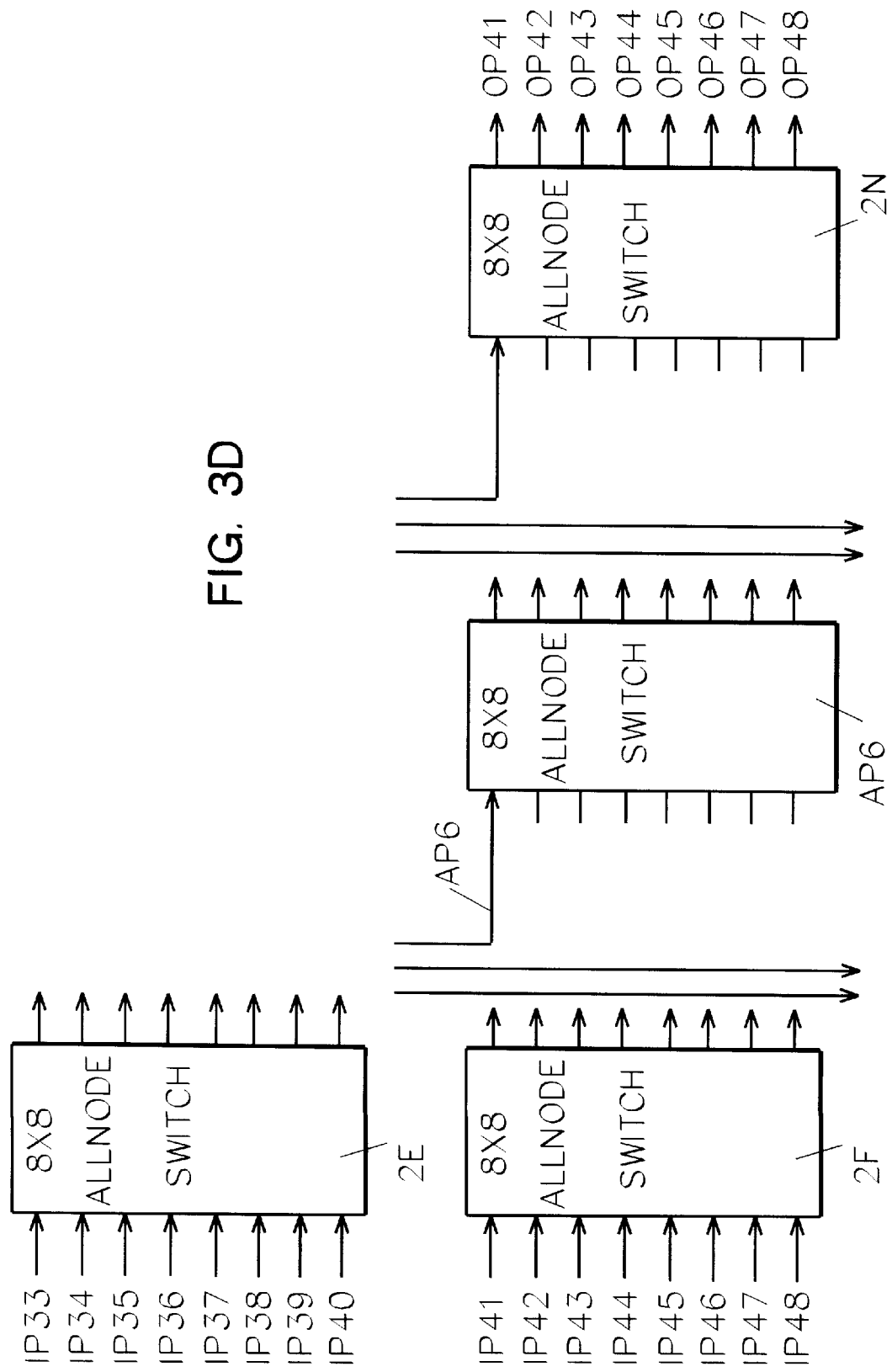
Figure 3E:
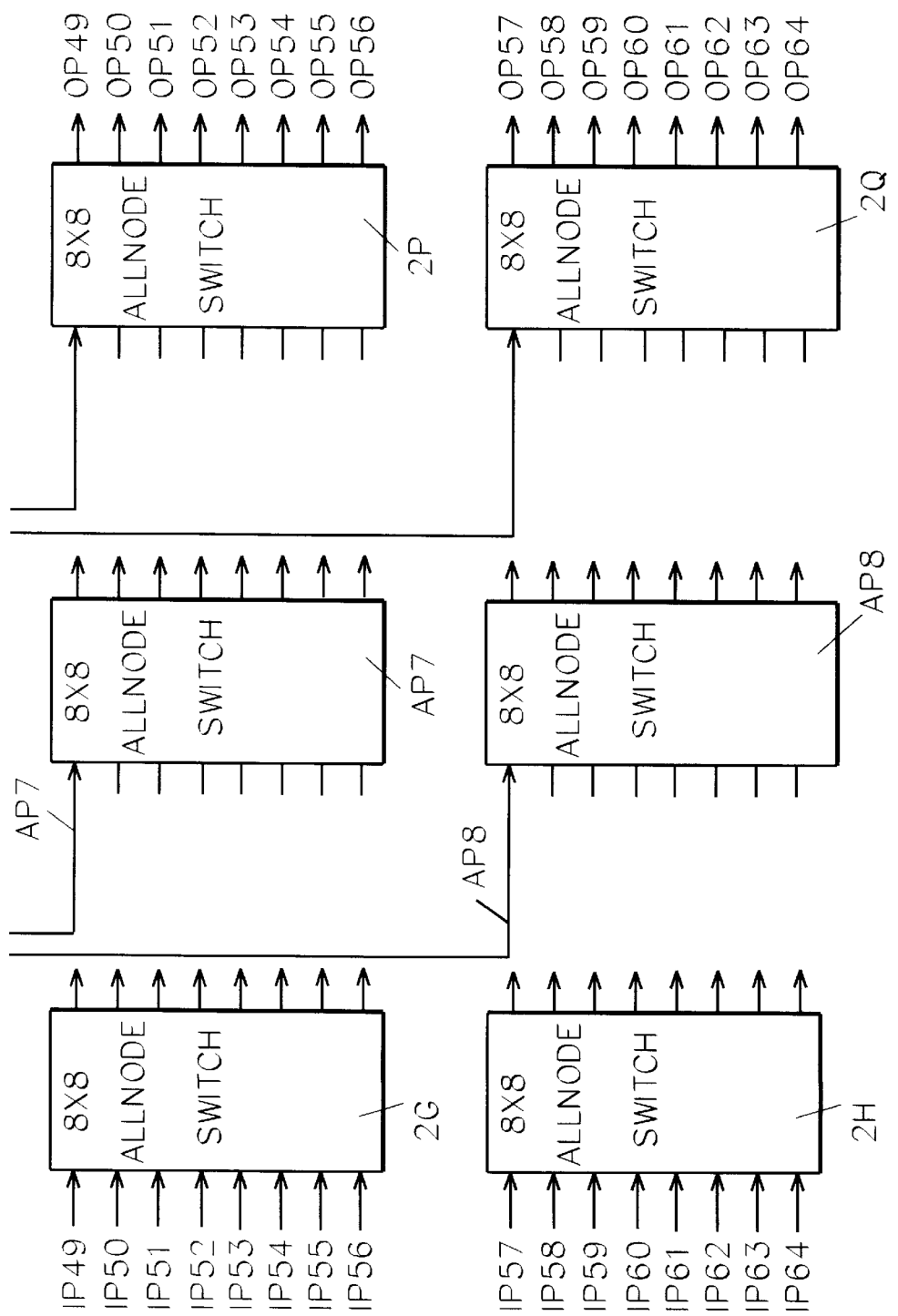

FIGS. 3A–3B show a typical 3 stage network comprised of Allnode switches and interconnecting 64 network nodes 3. In Allnode switches 2A through 2Q and AP1 through AP8 are arranged in 3 columns corresponding to stage 21, 22 and 23 of network 2. First stage 21 contains switches 2A to 2H and provides 64 input ports 5 to network 2, designated in FIGS. 3A–3B as INPUT PORT 1 through INPUT PORT 64. Second stage 22 includes Allnode switches AP1 through AP8, which provide 8 alternate paths between any two nodes. Third stage 23 includes switches 2I through 2Q, which provide 64 output ports 7 from network 2, designated in FIG. 3A–3B as OUTPUT PORT 1 through OUTPUT PORT 64.

FIG. 4 shows the timing for a message sent over Allnode switch network 2. Clock signal 122 is generated within send adapter 14. Send adapter 14 transmits bytes of data synchronized to the rate of sending clock 122, whose rate is also selected by sending adapter 14. When sending adapter 14 is not transmitting a message, it sends all zeroes data bytes 124 (00h—where h means in hexadecimal notation) and deactivates its valid message signal 120 to 0. With valid message signal 120 at logical 0, even though sending clock 122 inside the sending adapter 14 is always oscillating, no message is sent to network 2. When not transmitting a message, sending adapter 14 does not use any bandwidth from adapter memory 18.

When transmitting a message, sending adapter 14 sends only byte-wide data 124 and valid message signal 120 to network 2. Sending adapter 14 does not send a clock to network 2, neither does any node 3 connected to the network, and network switch 2 does not generate or use a clock. Thus, network 2 is an unclocked network.

Each input port 5 to network 2 includes only valid message signal 120 and the 8 parallel lines for sending data bytes 124. Likewise, each output port 5 from network 2 is includes only valid message signal 120 and the 8 parallel lines for sending data bytes 124. As shown in FIGS. 3A–3B, a direct connection is made across each switch in the network 2 from input port 5 to output port 7 without encountering any buffers. The switch is bufferless and merely passes the waveform receive at any input port directly to the selected output port without changing the input waveform in any way. Sending adapter 14 begins sending a message to network 2 by activating valid message signal 120 to 1, and sending null (00h) data bytes. After several clock times elapse, sending adapter 14 sends routing bytes 126 (RO, R1 . . . , RN) to select a connection path through network 2 to the desired destination. one routing byte selects one of 8 routing options at each stage 21, 22, 23 of the network. A network having N stages requires N routing bytes 126. After routing bytes 126, sending adapter 14 transmits several 00h bytes and begins to transmit the data message by first sending one SYNC byte 127 to start the message, followed by the message. One data byte is sent every clock time as shown in FIG. 4. Message header 128 includes bytes H1 to H4 and is sent immediately after SYNC byte 127. Immediately after header 128, message data bytes 130 (DO to Dn) follow, where n indicates that the message can be of a variable length. After Dn is transmitted to end the sending of valid data bytes, 00h data bytes 124 are sent and Valid Message signal 120 is deactivated.

Figure 5:
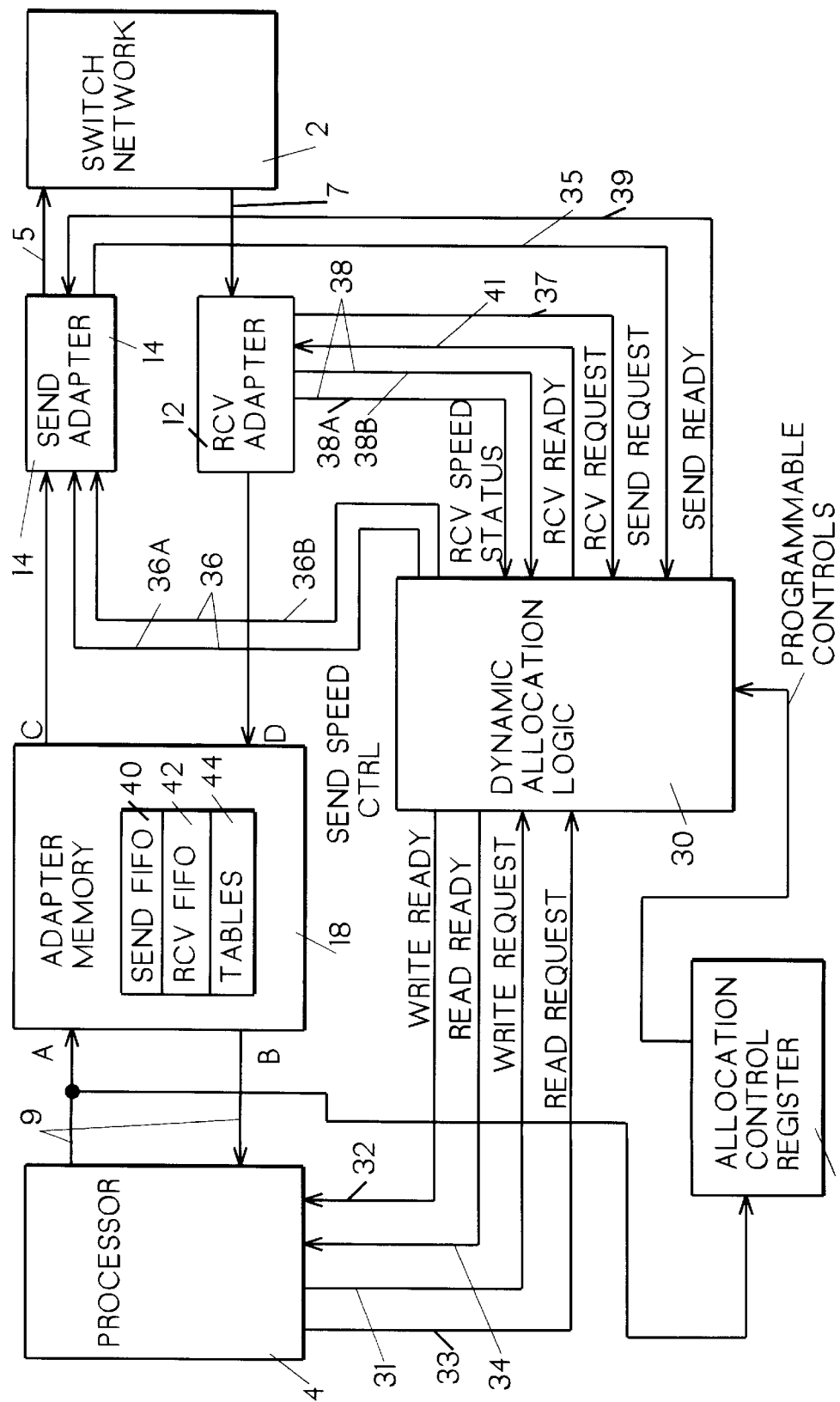
FIG. 5 is a diagram showing the interfaces of the dynamic allocation logic with the processor and network adapter according to the preferred embodiments of this invention.

FIG. 5 illustrates in greater detail dynamic allocation logic 30 of FIG. 1, and its interfaces with processor 4, send adapter 14, and RCV adapter 12. The initial speed assignment and changes in speed for each of the four ports A–D of adapter memory 18 are controlled by dynamic allocation logic 30. Network adapter 10, including allocation logic 30, is replicated at each node 3 attached to switch network 2. Dynamic allocation logic 30 receives requests for allocations on write request line 31, read request line 33, send request line 35 and receive request line 37, one request line 31–37 corresponding to each of four memory 18 ports A–D.

Write request 31 set to logical 1 from processor 4 informs dynamic allocation logic 30 that processor 4 requires some of the bandwidth of memory 18 for the purpose of writing a message to send FIFO 40 or to tables 44. When write request 31 is a logical 0, processor 4 requires no memory 18 bandwidth for writing at this time and it takes zero bandwidth from adapter memory 18.

Read Request 33 set to 1 from processor 4 informs dynamic allocation logic 30 that processor 4 requires some memory 18 bandwidth for the purpose of reading a message from RCV FIFO 42 or tables 44. When read request 33 is a 0, processor 4 requires no memory 18 bandwidth for reading at this time.

Send request 35 from send adapter 14 informs dynamic allocation logic 30 that send adapter 14 requires some of the memory 18 bandwidth for the purpose of sending a message from send FIFO 40 to network 2. When send request 35 is a 0, it indicates that send adapter 14 requires no memory 18 bandwidth for sending messages at this time. RCV Request 37 set to logical 1 from RCV adapter 12 informs dynamic allocation logic 30 that RCV adapter 12 requires some of the bandwidth of memory 18 for the purpose of receiving a message from network 2 to RCV FIFO 42. When RCV request 37 is a 0, it indicates that RCV adapter 12 requires no memory 18 bandwidth for receiving messages at this time.

Any of ports A–D to/from adapter memory 18, when requiring no memory bandwidth, is assigned a bandwidth of zero and makes no memory accesses until its request on the corresponding request line 31, 33, 35 or 37 goes active (is set to logical 1.)

Dynamic allocation logic 30 has a control interface 32, 34, 36, 38 associated with each of the 4 request lines 31, 33, 35 and 37. The four control lines function as follows:

1) Write ready 32 is a control line from dynamic allocation logic 30 of network adapter 10 to processor 4 which controls the speed at which processor 4 transmits (writes) messages to adapter memory 18. Write ready 32 can change every clock cycle to control the data flow. When write ready 32 is logical 1, network adapter 10 is ready and receives data from processor 4 during that particular clock cycle. When write ready is logical 0, network adapter 10 is NOT ready and cannot receive data during that particular clock cycle.

2) Read ready 34 is a control line from dynamic allocation logic 30 of network adapter 10 to processor 4 which controls the speed at which processor 4 receives (reads) messages from adapter memory 18. Read Ready 34 can change every clock time to control the data flow. When read ready 34 is set to logical 1, network adapter 10 is ready and sends data to processor 4 during that particular clock cycle. When read ready 34 is set to logical 0, network adapter 10 is NOT ready and cannot send data during that particular clock cycle. Ready signals 34 and 34 to Processor 4 will be more fully described hereafter in connection with FIGS. 11 and 12.

3) Send speed control 36 is a set of 2 coded control lines (36a and 36b) from dynamic allocation logic 30 to send adapter 14 which control the speed at which send adapter 14 sends messages from send FIFO 40 of adapter memory 18 to network 2. In this embodiment, if both control lines 36a and 36b are logical 0's, the resulting 00 state command sets adapter 14 to send at the 25 MB/s speed. The default state of control lines 36a and 36b is 00. If control line 36a is 0 and control line 36b is 1, the resulting 01 state command sets adapter 14 to send at the 50 MB/s speed. If control line 36a is 1 and control line 36b is 0, the resulting 10 state commands sets adapter 14 to send at the 75 MB/s speed. If both control lines 36a and 36b are 1's, the resulting 11 state command sets adapter 14 to send at the 100 MB/s speed. When send request 35 is 0, the send speed control lines 36a and 36b are not meaningful as there is no message being transmitted to network 2.

In addition, send ready 39 is a control line from dynamic allocation logic 30 to sending adapter 14 which controls the instantaneous rate at which sending adapter 14 reads messages from adapter memory 18. Send ready 39 can change every clock time to control the data flow. When send ready 39 is set to logical 1, adapter memory 18 is ready and sends data to sending adapter 14 during that particular clock cycle. when send ready 39 is logical 0, adapter memory 18 is NOT ready and cannot send data during that particular clock cycle.

Send ready 39 is further described hereafter in connection with FIGS. 11 and 12.

4) RCV speed status 38 is a set of 2 coded control lines (38a and 38b) to dynamic allocation logic 30 from RCV adapter 12 which inform dynamic allocation logic 30 of the speed at which the present message is being received from network 2 to RCV FIFO 42 of adapter memory 18. If both control lines 38a and 38b are 0's, the resulting 00 state informs dynamic allocation logic 30 that a message is being received at the 25 MB/s speed. The default state of control lines 38a and 38b is 00. If control line 38a is 0 and control line 38b is 1, the resulting 01 state informs dynamic allocation logic 30 that a message is being received at the 50 MB/s speed. If control line 38a is 1 and control line 38b is 0, the resulting 10 state informs dynamic allocation logic 30 that a message is being received at the 75 MB/s speed. If both control lines 38a and 38b are 1's, the resulting 11 state informs dynamic allocation logic 30 that a message is being received at the 100 MB/s speed. When RCV request 37 is set to logical 0, the RCV speed status lines 38a and 38b are not meaningful as there is no message being received from network 2.

In addition, RCV ready 41 is a control line from the dynamic allocation logic 30 to RCV adapter 12 which controls the instantaneous rate at which RCV adapter 12 writes messages to adapter memory 18. RCV ready 41 can change every clock time to control the data flow. When RCV ready 41 is set to logical 1, adapter memory 18 is ready and receives data from RCV adapter 12 during that particular clock cycle. When RCV ready 41 is set to logical 0, adapter memory 18 is NOT ready and cannot receive data during that particular clock cycle. RCV ready 41 is further described hereafter in connection with FIGS. 11 and 12. Network 2 data transmission rates are always defined by sending adapter 14 only. The Allnode switches within switch network 2 are unclocked and not buffered, so networks using the switch can change rates instantaneously, and the switch will automatically follow the rate being transmitted by sending adapter 14.

Figure 4B:
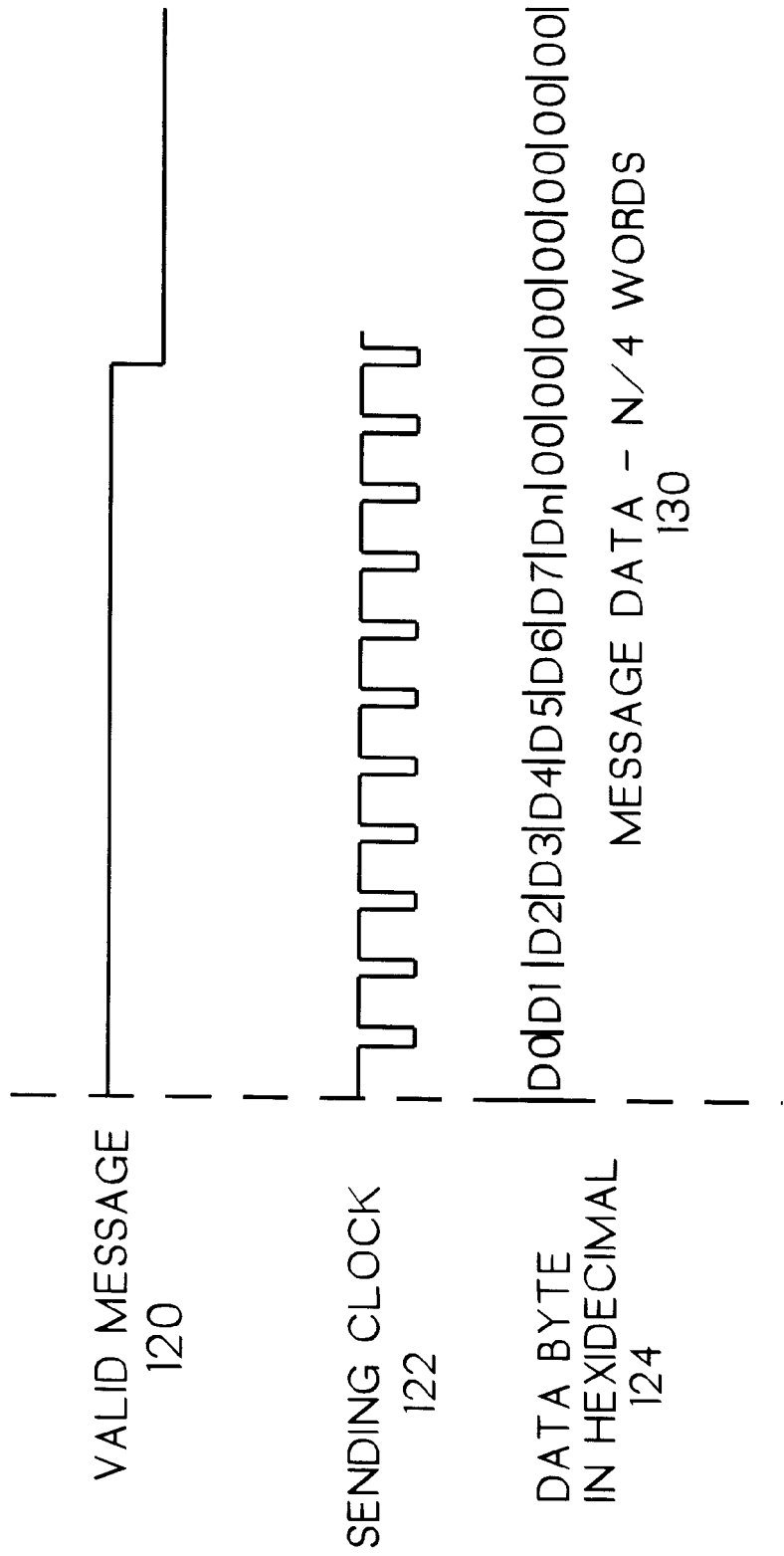

However, receiving adapter 12 at a destination node 3 across the network, which is the destination of a message, must be able to detect when the transmission rate of an incoming message changes. The method of down-shifting or up-shifting the rate in between messages or during a message transmittal over the network cannot be accomplished by pacing a READY signal. This is because there is no READY line carried across network 2, and there cannot be because trying to control a transfer on a clock cycle basis of 10 nano seconds (ns) with a READY signal over the long distance required for network interconnections is impossible. Instead, synchronization byte 127 of FIGS. 4A–4B is used to start each message and specify the transmission rate. The sending node has the capability of changing the message transmission rate at any time by transmitting a new synchronization byte 127 to inform the receiving node of the new transmission rate. Synchronization byte 127, having 8 bits, can contain up to 256 bit combinations. Of these, only one is required to define each sending speed across the network. Receiving channel 12 receives the synchronization byte 127 to start every message, recovers data at the commanded rate, and looks for subsequent synchronization bytes 127 to indicate a change in the rate.

The allocation of bandwidth to/from adapter memory 18 is flexible and is controlled by the software associated with processor 4. Processor 4 software sends a command to allocation control register 28 to select the desired algorithm for the allocation of bandwidth. Processor 4 can write commands during initialization or at any time thereafter to allocation control register 28. In this particular embodiment, allocation register 28 defaults at power-on to selecting an allocation of a fixed rate of 25 MB/s to send adapter 14 and a fixed rate of 50 MB/s to processor 4. RCV adapter 12 does not receive an allocation, but conforms instantaneously to the rate of any incoming message from switch network 2. The algorithms define how much bandwidth is to be allocated under conflict to processor 4 and how much to sending adapter 14. Processor 4 defines the desired algorithm for the allocation of bandwidth by writing an allocation command to allocation register 28 in network adapter 10.

FIG. 6 illustrates allocation register 28 and the meaning of its 10 bits (AR0–AR9). AR0 to AR4 bits 100–104 are used to control the sending adapter 14 bandwidth algorithm. AR0 bit 100 being set to 1 enables sending adapter 14 to be dynamically allocated.

Figure 7A:
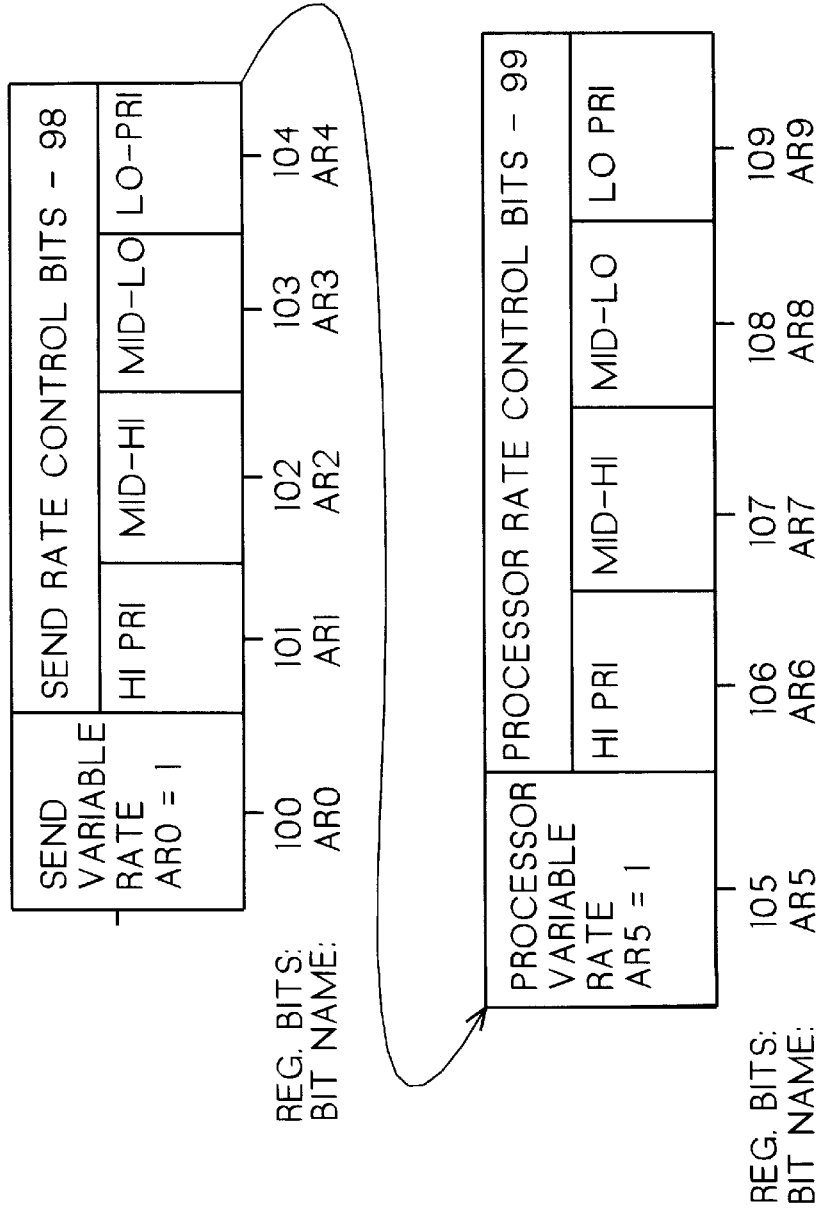
FIGS. 7A and 7B are block diagrams showing the format of the selection and controls for variable and fixed memory allocation, respectively, for the network sending adapter as controlled by the allocation register according to the preferred embodiment of this invention.

FIG. 7A illustrates the meaning of allocation register 28 send rate control bits 98, including AR1 bit 101 through AR4 bit 104 when AR0 bit 100 is set to 1. In this case bits 101 to 104 control the priority at which sending adapter 14 is allocated bandwidth. The four different priority levels controlled by mutually exclusive bits 101 to 104 are as follows:

Bit 101: send is high priority=1, and send adapter 14 takes all memory 18 bandwidth not used by RCV adapter 12.

Bit 102: send is mid-high priority=1, and send adapter 14 takes half or the majority of memory 18 bandwidth not used by RCV adapter 12.

Bit 103: send is mid-low priority=1, and send adapter 14 takes half or less of memory 18 bandwidth not used by RCV adapter 12.

Bit 104: send is low priority=1, and send adapter 14 takes only otherwise unused memory 18 bandwidth.

Figure 7B:
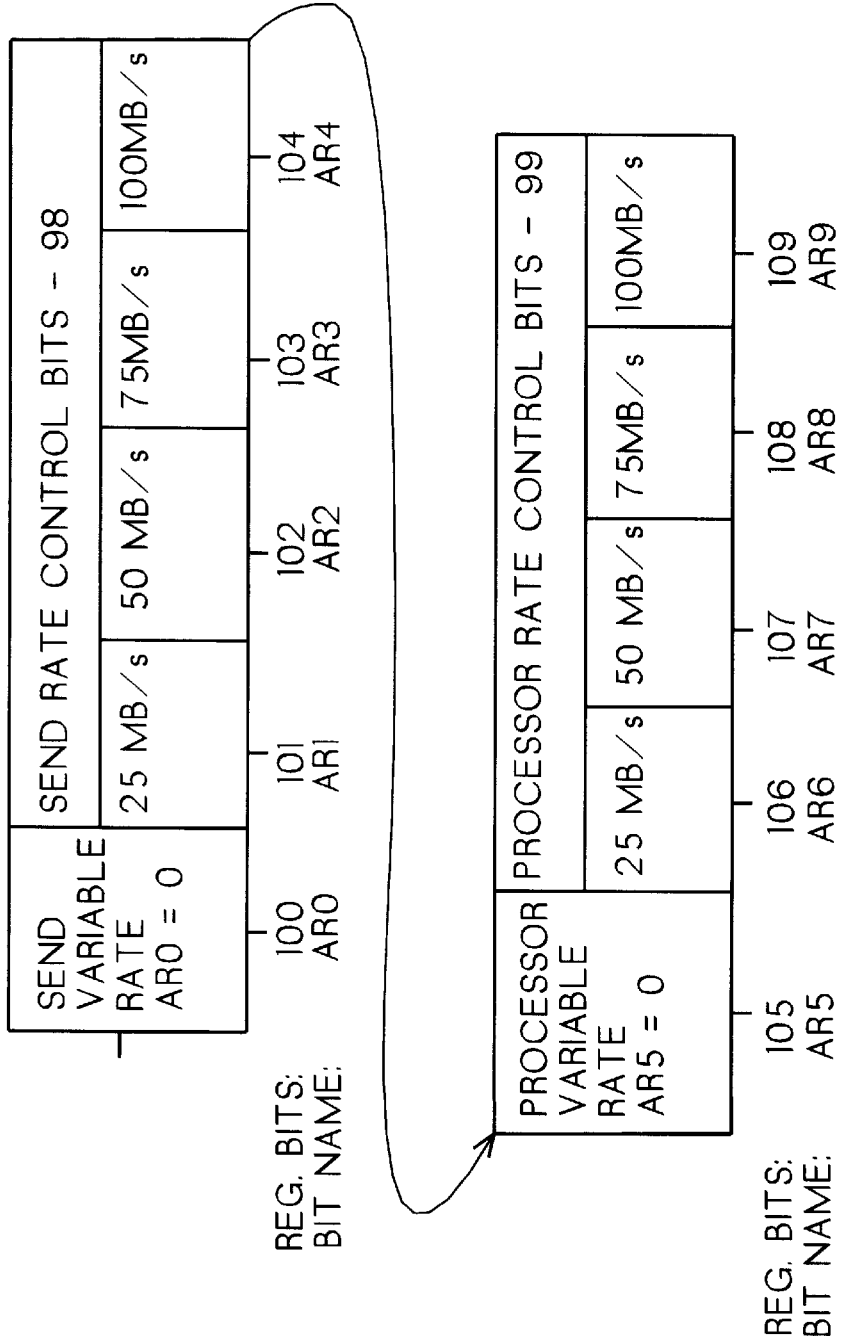

FIG. 7B illustrates the meaning of allocation register 28 bits 101 to 104 when AR0 bit 100 is set to 0, disabling sending adapter 14 from being dynamically allocated and instead defining a fixed rate of transfer. In this particular embodiment, for AR0 bit 100=0, AR1 bit 101=1 means send only at 25 MB/s; AR2 bit 102=1 means send only at 50 MB/s; AR3 bit 103=1 means send only at 75 MB/s; and AR4 bit 104=1 means send only at 100 MB/s.

Figure 8A:
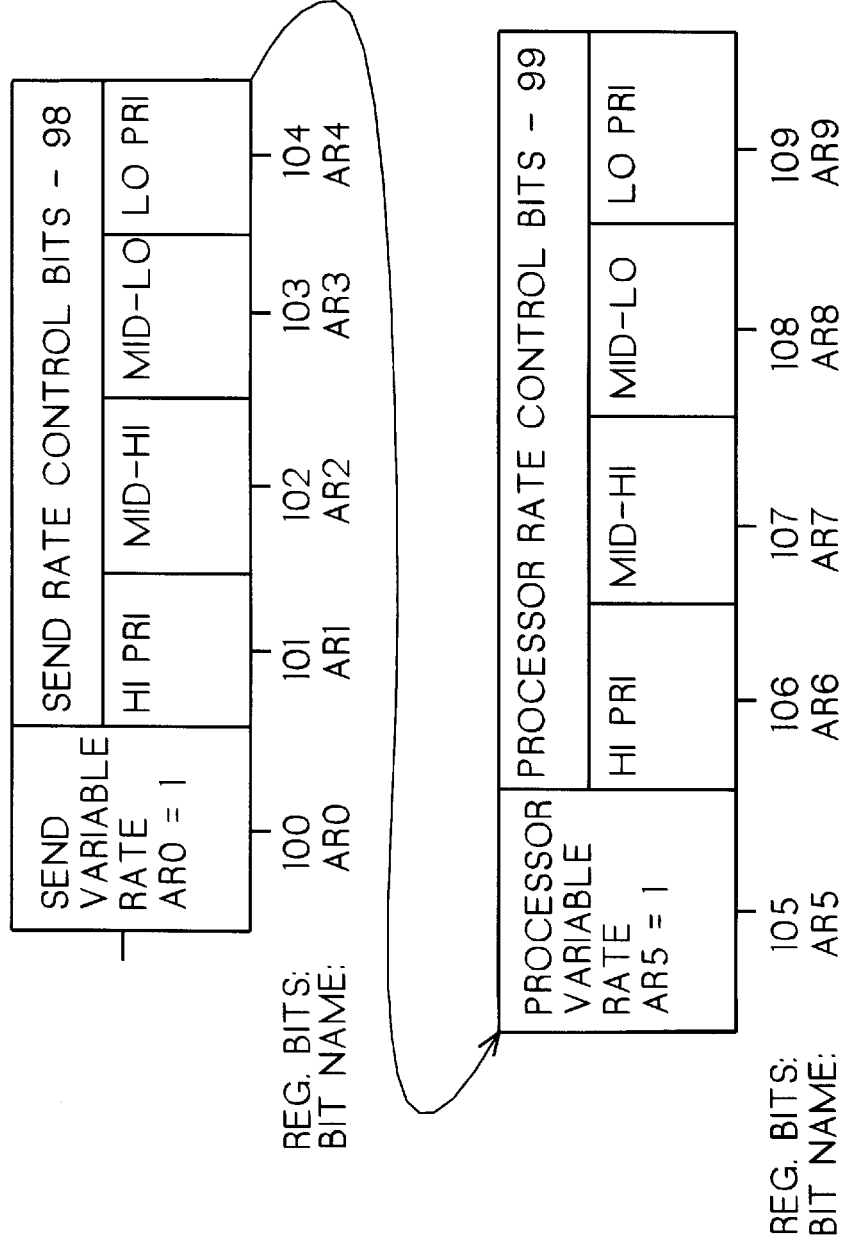
FIGS. 8A and 8B are block diagrams showing the selection and controls for variable and fixed memory allocation, respectively, for the processor to network adapter interface as controlled by the allocation register according to the preferred embodiment of this invention.
Figure 8B:
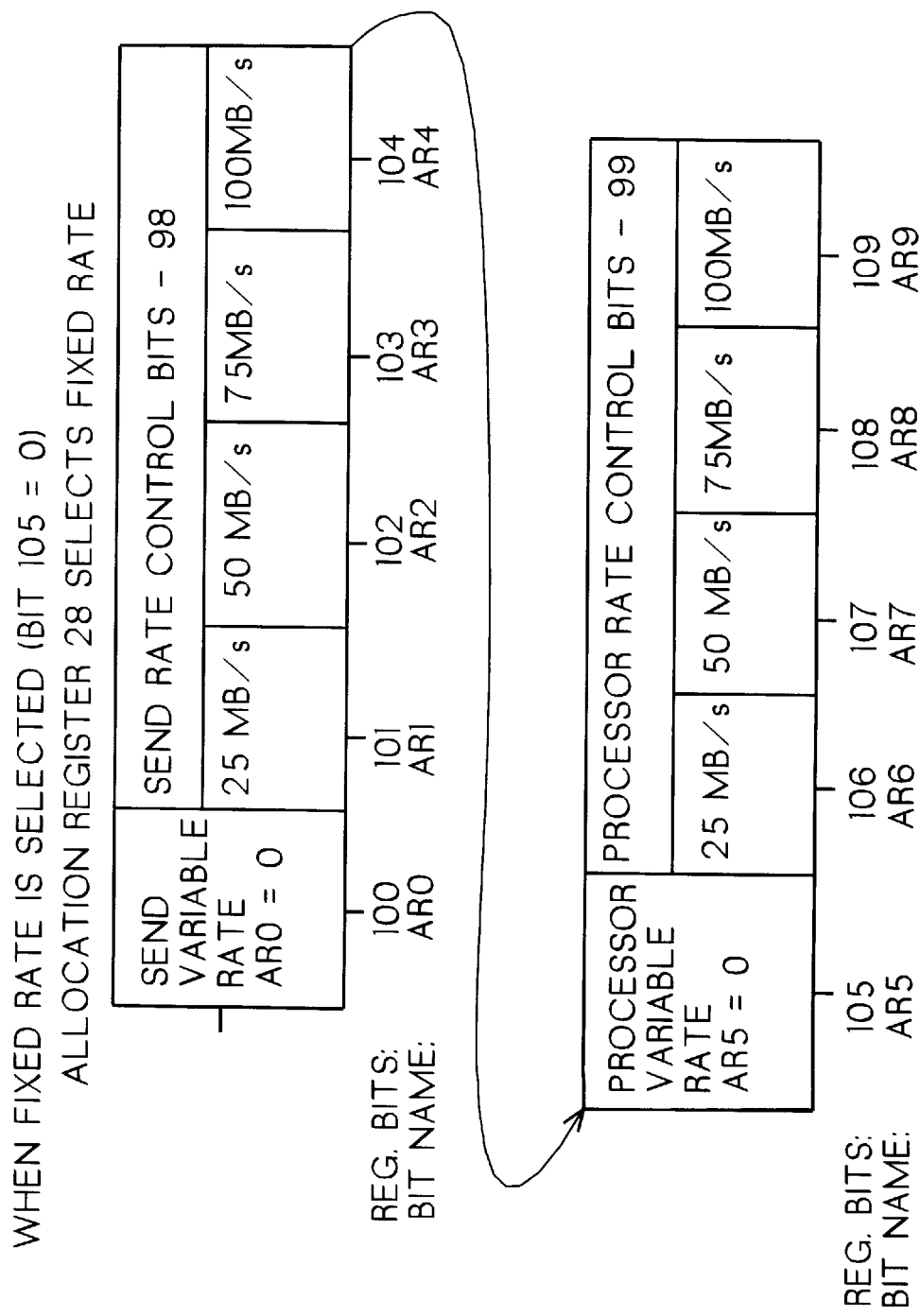

Referring to FIGS. 8A and 8B, AR5 to AR9 bits 105–109 control the bandwidth allocation to processor 4. AR5 bit 105 being set to 1 enables the processor rate to be dynamically allocated. FIG. 8A shows the meaning of allocation register 28 bits 106 to 109 when AR5 bit 100 is set to 1. In this case processor rate control bits 99, including AR6 bit 106 through AR9 bit 109 control the priority at which processor 4 is allocated bandwidth. FIG. 8A explains the 4 different priority levels controlled by the mutually exclusive bits 106 to 109 when AR5=1, as follows:

Bit 106: processor 4 is high priority=1, and processor 4 takes all memory 18 bandwidth not used by RCV adapter 12.

Bit 107: processor 4 is mid-high priority=1, and processor 4 takes half or the majority of memory 18 bandwidth not used by RCV adapter 12.

108: processor 4 is mid-low priority=1, and processor 4 takes half or less of memory 18 bandwidth not used by RCV adapter 12.

Bit 109: processor 4 is low priority=1, and processor 4 takes only otherwise unused memory 18 bandwidth.

FIG. 8B illustrates AR5 bit 105 being set to 0, which disables the processor rate from being dynamically allocated and instead defines a fixed rate of transfer. When AR5 bit 105 is set to 0, allocation register 28 bits 106 to 109 control the fixed rate at which processor 4 is allocated bandwidth: with AR6 bit 106=1, processor 4 send rate is set at only 25 MB/s; with AR7 bit 107=1, processor 4 send rate is set at only 50 MB/s; with AR8 bit 108=1, the send rate is only 75 MB/s; and with AR9 bit 109=1, the send rate is only 100 MB/s.

Figure 9:
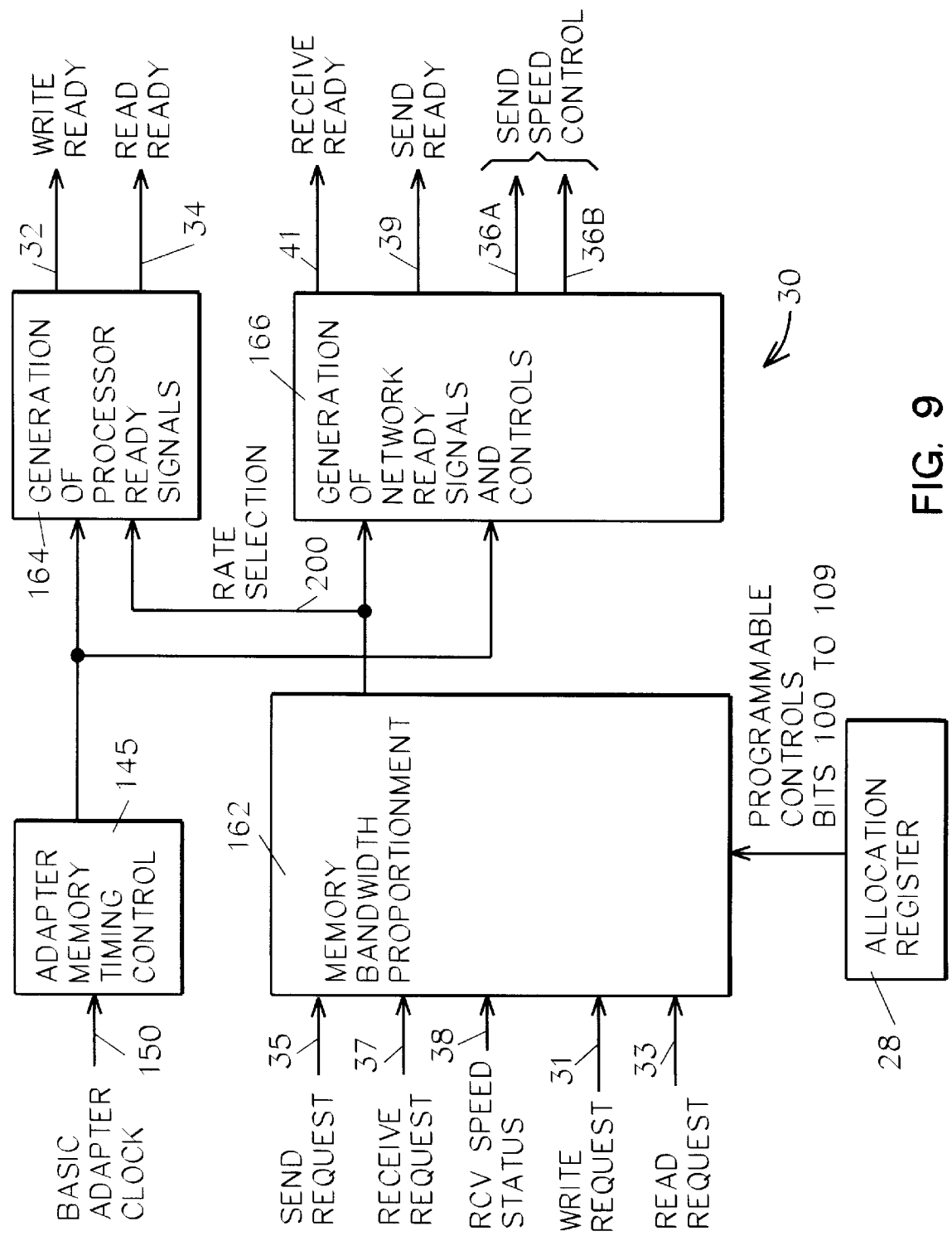
FIG. 9 is a block diagram showing further details of the dynamic allocation function of FIGS. 1 and 5, according to the preferred embodiment of this invention.

Since allocation register 28 contains two distinct fields (sending adapter 14 control fields 100–104 and processor 4 control fields 105–109), it is possible for sending adapter 14 and processor 4 to be assigned the same or different enable/disable functions. For instance, sending adapter 14 could be assigned a variable rate (AR0 bit 100=1), while processor 4 could be assigned a fixed rate (AR5 bit 105=0) or vice versa. However, the preferred embodiment is that both the send adapter and processor be enabled (AR0 bit 100=1 and AR5 bit 105=1) for dynamic allocation. It is also possible for both the send adapter and processor be commanded to use fixed rates (AR0 bit 100=0 and AR5 bit 105=0). Referring to FIG. 9 a more detailed diagram of dynamic allocation logic 30 is shown. Dynamic allocation logic 30 includes adapter memory timing control logic 145, memory bandwidth proportionment logic 162, generation of processor ready signals logic 164, and generation of network ready and control signals logic 166.

Figure 10A:
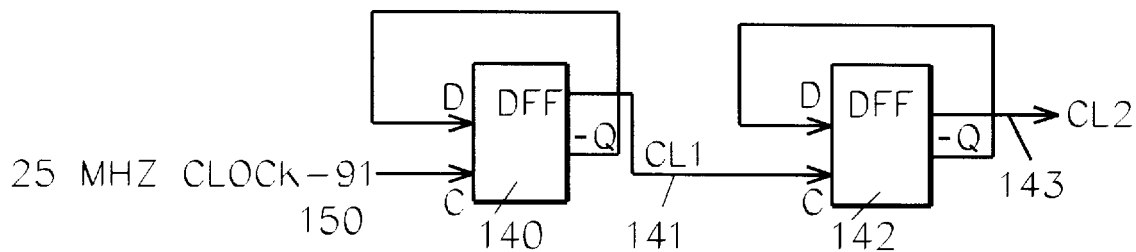
FIGS. 10A and 10B are block diagrams and FIG. 10C is a timing chart together illustrating adapter memory timing control.
Figure 10B:
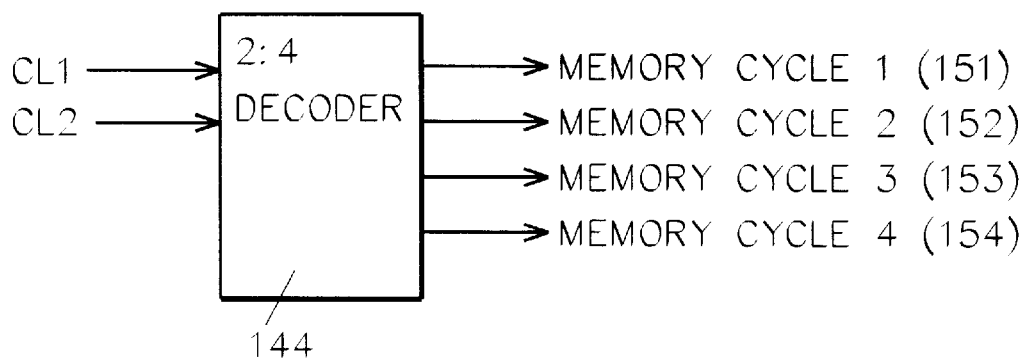
Figure 10C:
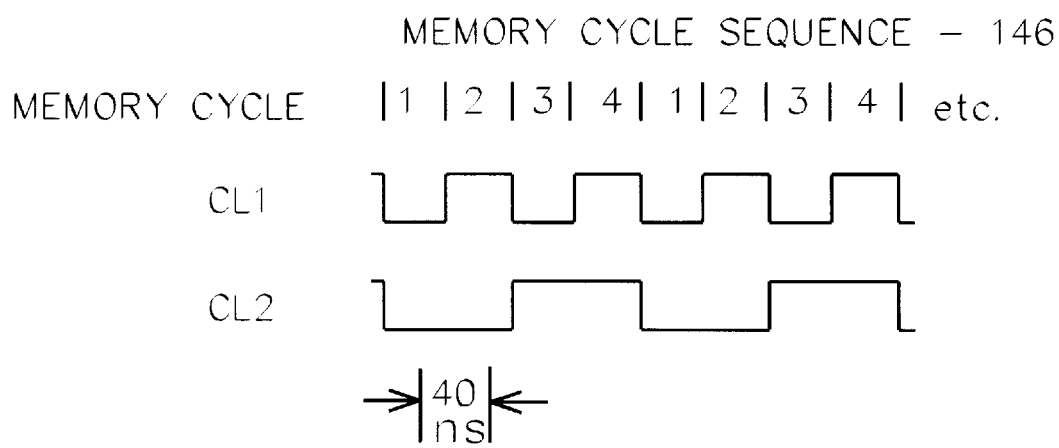

Referring to FIGS. 10A through 10C, adapter memory timing control 145 is shown in further detail. In FIG. 10A, 25 MHZ clock 91 on line 150 is counted down in two DFF circuits 140 and 142 to generate two timing signals: CL1 signal 141 and CL2 signal 143.

Referring to FIG. 10C, timing circuitry 140, 142 and 25 MHZ clock 91 are free running and continually generate CL1 141 and CL2 143 as two square waves which provide memory cycle sequence 146. CL1 signal 141 is repetitively changing on every rise of the 25 MHZ clock 91 signal, such that CL1 is up and down alternately between 25 MHZ clock 91 rises. CL1 is up for 40 ns and down for 40 ns alternately, since the period of the 25 MHZ clock signal is 40 ns. CL2 signal 143 is repetitively changing every two clock times, such that CL2 is half the frequency of CL1. CL2 is up for 80 ns and down for 80 ns alternately, and is always aligned to CL1 signal 141. Referring to FIG. 10B, memory 18 cycles are generated based on the timing provided by the CL1 and CL2 signals 141, 143 as decoded in 2:4 decoder 144 to generate memory cycle sequence 146. Memory 18 cycles 1–4 on lines 151–154, respectively, are repetitive every 4 cycle times, where the period of 25 MHZ clock 91 is defined as the memory cycle time of 40 ns. Four cyclic memory times are chosen for this exemplary embodiment because adapter memory 18 supports 4 ports A–D, and 4 memory cycle times allows a fixed allocation (if desired) of one memory cycle time per port.

Referring to FIGS. 11A through 11H and 12A through 12G, timing diagrams illustrate the various ways that dynamic allocation logic 30 allocates adapter memory 18 amongst the four ports A–D.

Referring to FIG. 11A, memory cycle 146, first introduced in FIG. 10C, is repeated for reference.

Referring to FIG. 11B, receive adapter 12 is receiving at 25 MB/s, send adapter 14 is sending at 25 MB/s, and processor 4 is reading or writing at 50 MB/s.

Referring to FIG. 1C, adapter 12 is receiving at 100 MB/s, thus using 100% of adapter memory 18 bandwidth.

Referring to FIG. 11D, receive adapter 12 is receiving at 75 MB/s, and send adapter 14 is sending at 25 MB/s.

Figure 11E:
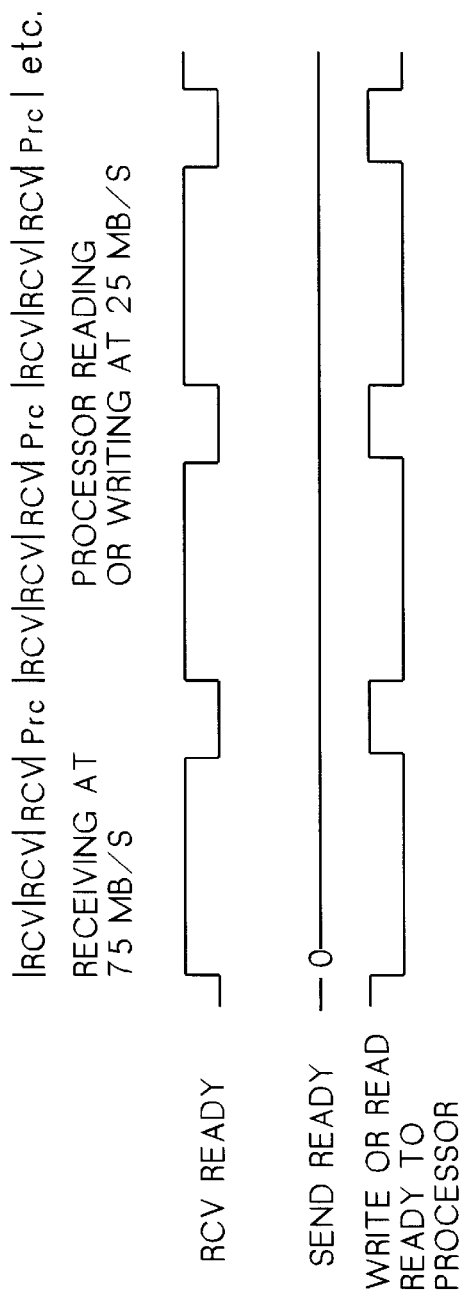

Referring to FIG. 11E, receive adapter 12 is receiving at 75 MB/s, and processor 4 is reading or writing at 25 MB/s.

Figure 11F:
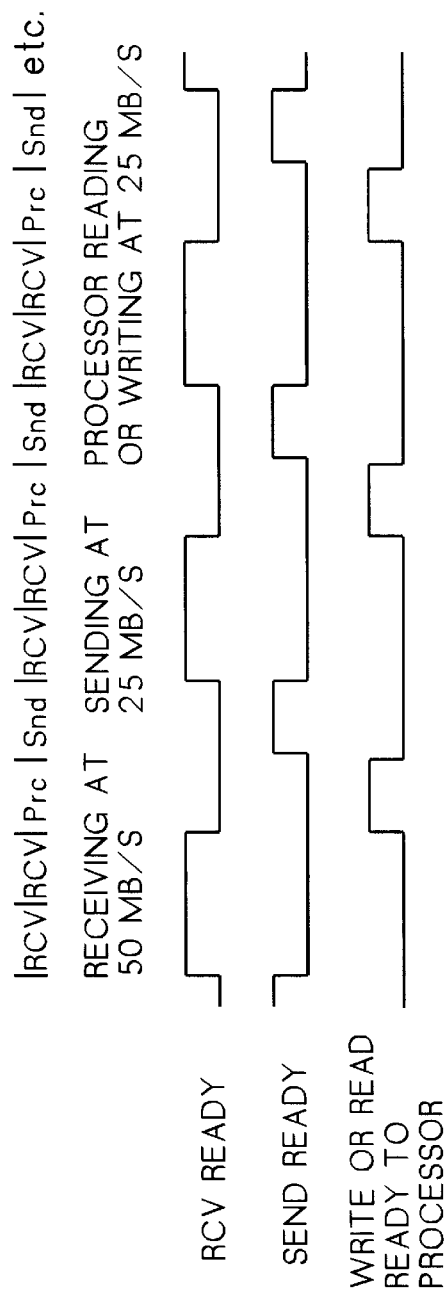

Referring to FIG. 11F, receive adapter 12 is receiving at 50 MB/s, send adapter 14 is sending at 25 MB/s, and processor 4 is reading or writing at 25 MB/s.

Referring to FIG. 11G, receive adapter 12 is receiving at 50 MB/s and send adapter 14 is sending at 50 MB/s.

Referring to FIG. 11H, receive adapter 12 is receiving at 50 MB/s, and processor 4 is reading or writing at 50 MB/s.

Figure 12A:
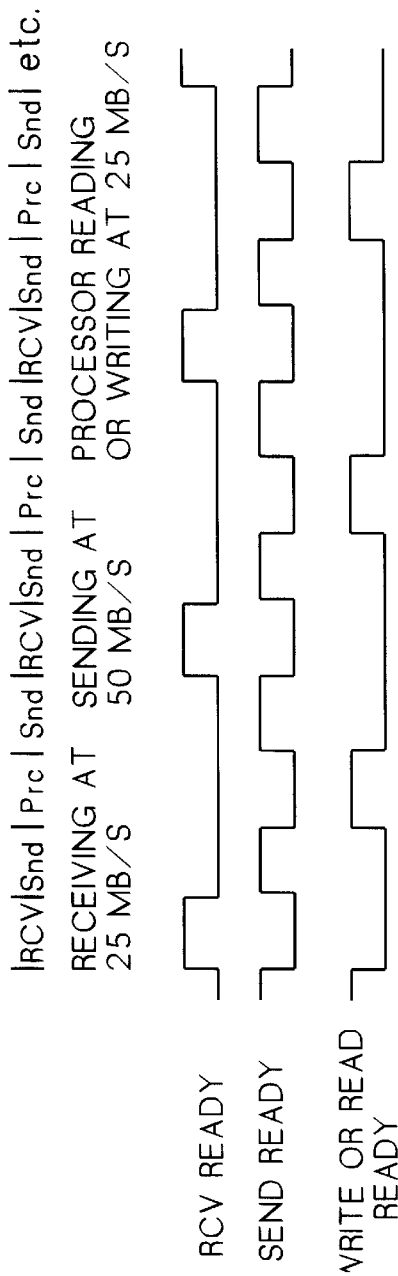

Referring to FIG. 12A, receive adapter 12 is receiving at 25 MB/s, send adapter 14 is sending at 50 MB/s, and processor 4 is reading or writing at 25 MB/s.

Figure 12B:
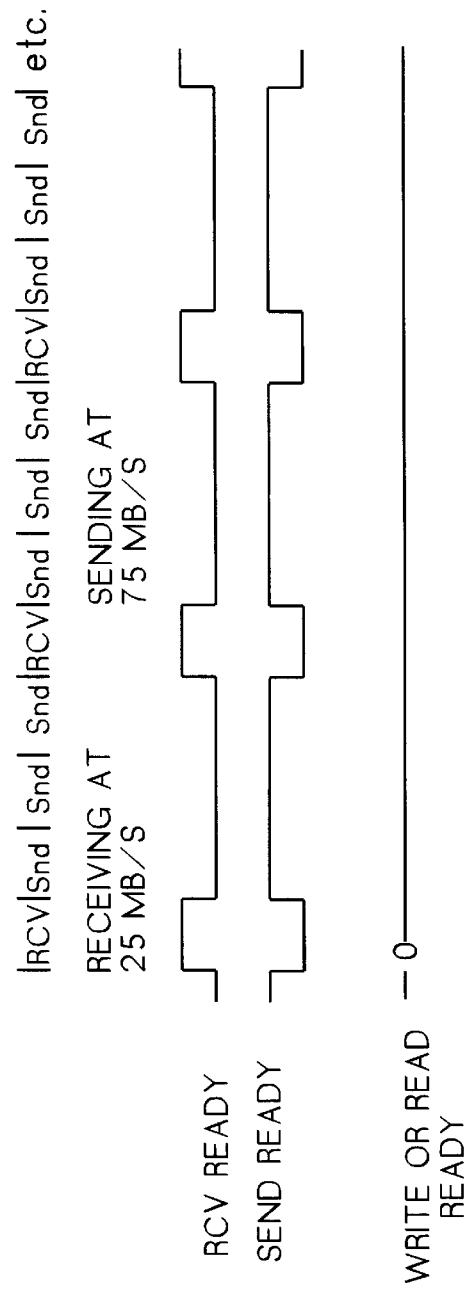

Referring to FIG. 12B, receive adapter 12 is receiving at 25 MB/s and send adapter 14 is sending at 75 MB/s.

Figures 12C, 12D:
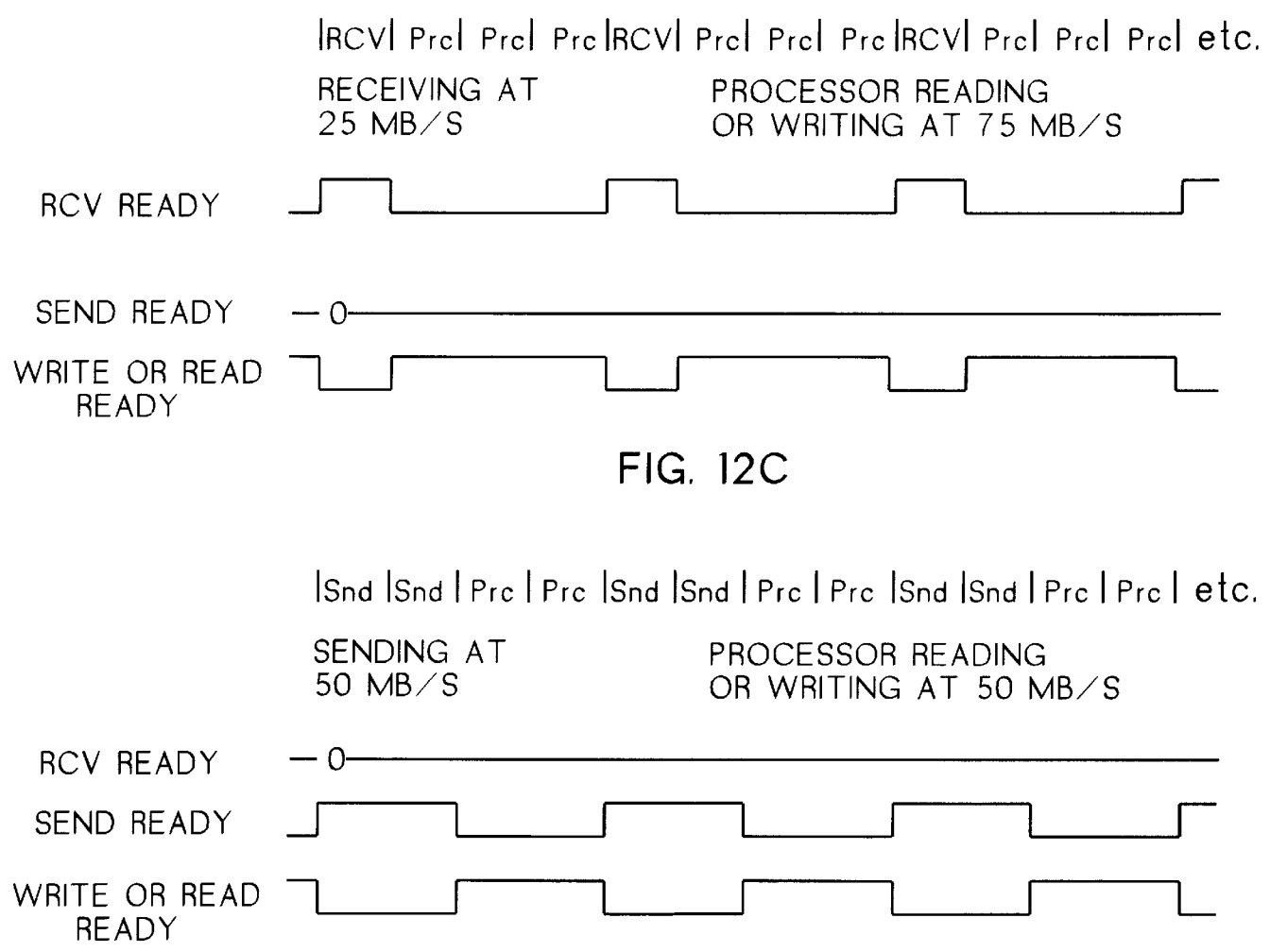

Referring to FIG. 12C, receive adapter 12 is receiving at 25 MB/s and processor 4 is reading or writing at 75 MB/s.

Referring to FIG. 12D, send adapter 14 is sending at 50 MB/s and processor 4 is reading or writing at 50 MB/s.

Referring to FIG. 12E, processor 4 is reading or writing at 100 MB/s.

Referring to FIG. 12F, send adapter 14 is sending at 100 MB/s.

Figure 12G:
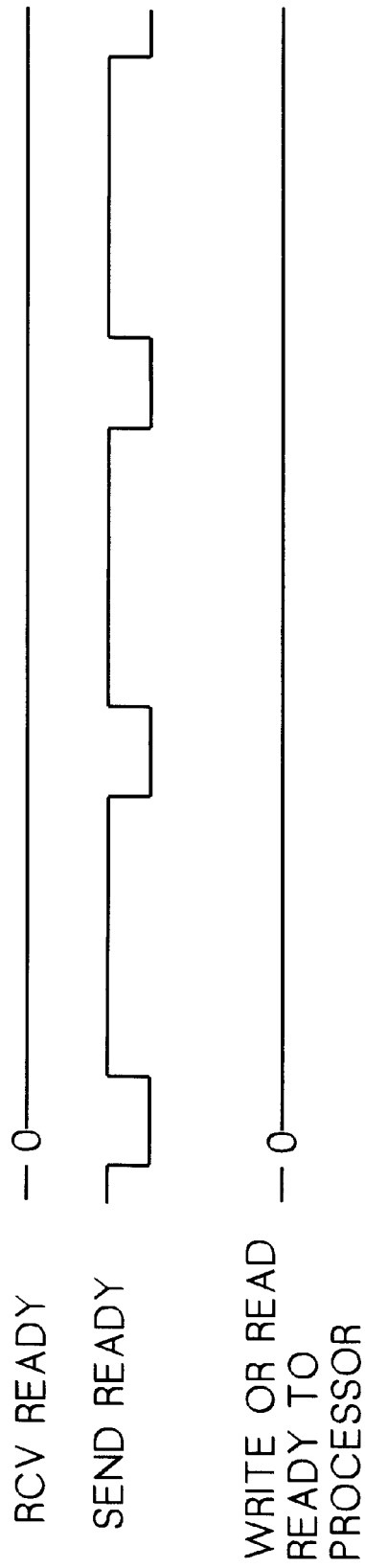

Referring to FIG. 12G, send adapter 14 is sending at 75 MB/s with no other requestors (receive adapter 12 or processor 4) active.

Included in the timing diagrams of FIGS. 11B–11H and 12A–12G are the waveforms generated on three ready signals: RCV ready 41, send ready 39, and write or read ready 180. Write ready 32 and read Rrady 34 are combined into write or read ready 180 in these timing diagrams.

Referring to FIG. 5 in connection with FIGS. 11B–H and 12A–G, allocation logic 30 doesn't have to know whether processor 4 is reading or writing, only whether processor 4 is requesting memory 18 bandwidth or not, by raising write request 31 or read request 33. Dynamic allocation logic 30 logically OR's (OR gate 50 of FIG. 13E) the two requests 31, 33 together to get a processor write or read request 49. Dynamic allocation logic 30 responds to the logical OR for the two requests 31, 33 by generating a write or read ready signal 180 as shown in the timing diagrams.

Referring to FIG. 11A, adapter memory timing control 145 generates memory cycle sequence 146, comprising four repetitive memory cycles. In this embodiment, adapter memory 18 operates at 25 MHZ and uses 40 ns memory cycles. Adapter memory 18 performs either one read of memory 18 contents or one write to memory 18 during each of the memory cycle times 1–4 of sequence 146.

Referring to FIGS. 2 and 9 in connection with FIG. 11B, the allocation of which requester 4, 12, or 14 uses a given memory 18 cycle is controlled by the three ready signals 39, 41, 180 generated by dynamic allocation logic 30. The three ready signals 39, 41, 180 are mutually exclusive and only one of the three ready signals 39, 41, 180 is activated for each of the memory cycle sequence 146 times 1, 2, 3, 4. If one of the three ready signals 39, 41, 180 is active during a given memory cycle 146 time, it defines the user of that memory cycle and informs the user that requested data to/from memory will have occurred by the end of that memory cycle. For example, referring further to FIG. 11B, RCV ready 41 is activated at every memory cycle 146 time 1. This means that at the end of memory cycle 1 that data has been stored from RCV adapter 12 to adapter memory 18. Also, send ready 39 is activated at every memory cycle time 4. This means that at the end of memory cycle 4 that data has been read from adapter memory 18 to send adapter 14. Likewise, write or read ready 180 is activated at every memory cycle 2 and 3 times. This means that at the end of memory cycle 2 that data has been read or stored to/from processor 4 from/to adapter memory 18, and at the end of memory cycle 3 a second data has been read or stored to/from processor 4 from/to adapter memory 18.

For this embodiment of the invention, adapter memory 18 is 4 bytes (one word) wide. Thus for every memory cycle, 4 bytes of data are transferred. Since the frequency of the memory cycle is 25 MHZ and 4 bytes are transferred per cycle, adapter memory 18 has an available bandwidth of 100 MB/s (4 bytes×25 MHZ.) Each memory cycle repeats every fourth cycle time.

Referring again to FIG. 11B, RCV Ready 41 takes 4 bytes of data from RCV adapter 12 during memory cycle 1 for an instantaneous rate of transfer of 100 MB/s. However, this is not a sustained data rate, because memory cycle 1 repeats every fourth cycle time. Thus, RCV adapter 12 writes 100 MB/s of data every forth cycle time, which gives a sustained rate of 100/4=25 MB/s. If a requester uses two of the four repetitive memory cycles it has a sustained transfer rate of 50 MB/s. If a requester uses three of the four repetitive memory cycles it has a sustained transfer rate of 75 MB/s. If a requester uses four of the four repetitive memory cycles it has a sustained transfer rate of 100 MB/s; i.e., the single requester is using all of the available adapter memory 18 bandwidth.

Referring to FIG. 11C, RCV ready 41 is up for all four memory cycles, indicating that RCV adapter 12 is transferring data at 100 MB/s. Referring to FIG. 12B, send ready 39 is up for three of the four memory cycles, indicating that send adapter 14 is transferring data at 75 MB/s. Referring to FIG. 11E, RCV ready 41 is up for 2 of the four memory cycles, indicating that RCV adapter 12 is transferring data at 50 MB/s. Returning to FIG. 11B, an allocation case is shown where RCV ready 41 is using 25 MB/s, send ready 39 is using 25 MB/s, and write or read ready 180 is using 50 MB/s.

FIGS. 11A–11H and 12A–12G show all of the possible cases for allocation of the 100 MB/s of adapter memory 18 bandwidth for each of 3 requesters: processor 4, RCV adapter 12, and send adapter 14. The allocation determines the waveform on the corresponding ready signals: write or read ready 180, RCV ready 34, and send ready 32. Each requester 4, 12, and 14 is assigned allocations of 0, 25, 50 75, and 100 MB/s of bandwidth.

Referring to FIGS. 13A through 13L, 14A–14B and 15A through 15E, the detailed logic for dynamic allocation logic 30 will be described. The overall function of dynamic allocation logic 30 is to generate ready signals to each requester based on the following inputs: requests for adapter memory 18 bandwidth, RCV speed status, and programmable controls from allocation register 28 as shown in FIG. 9.

Figure 13A:
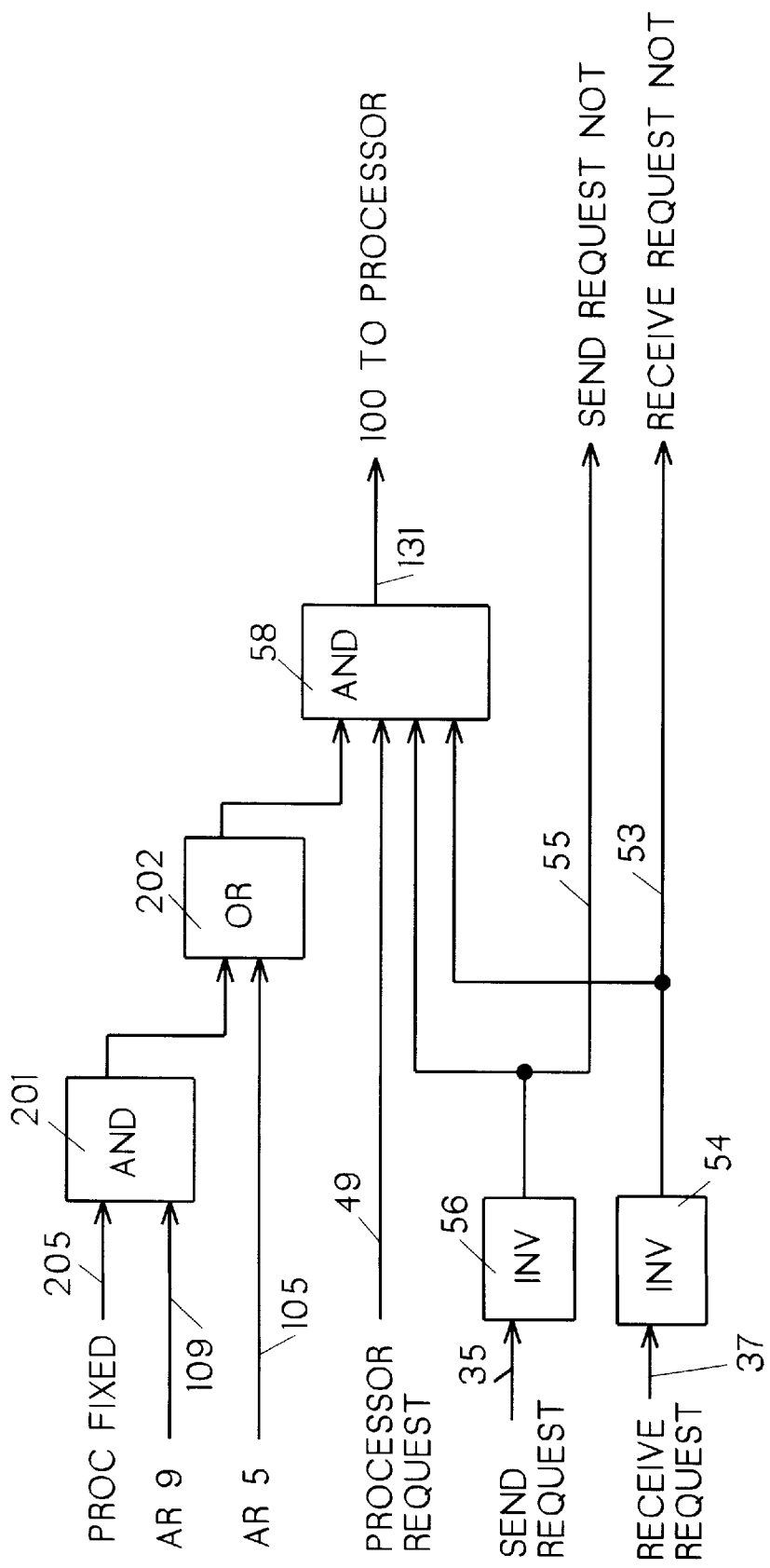

FIG. 13A illustrates the logic for generating 100 TO PROCESSOR signal 131.

Figure 13B:
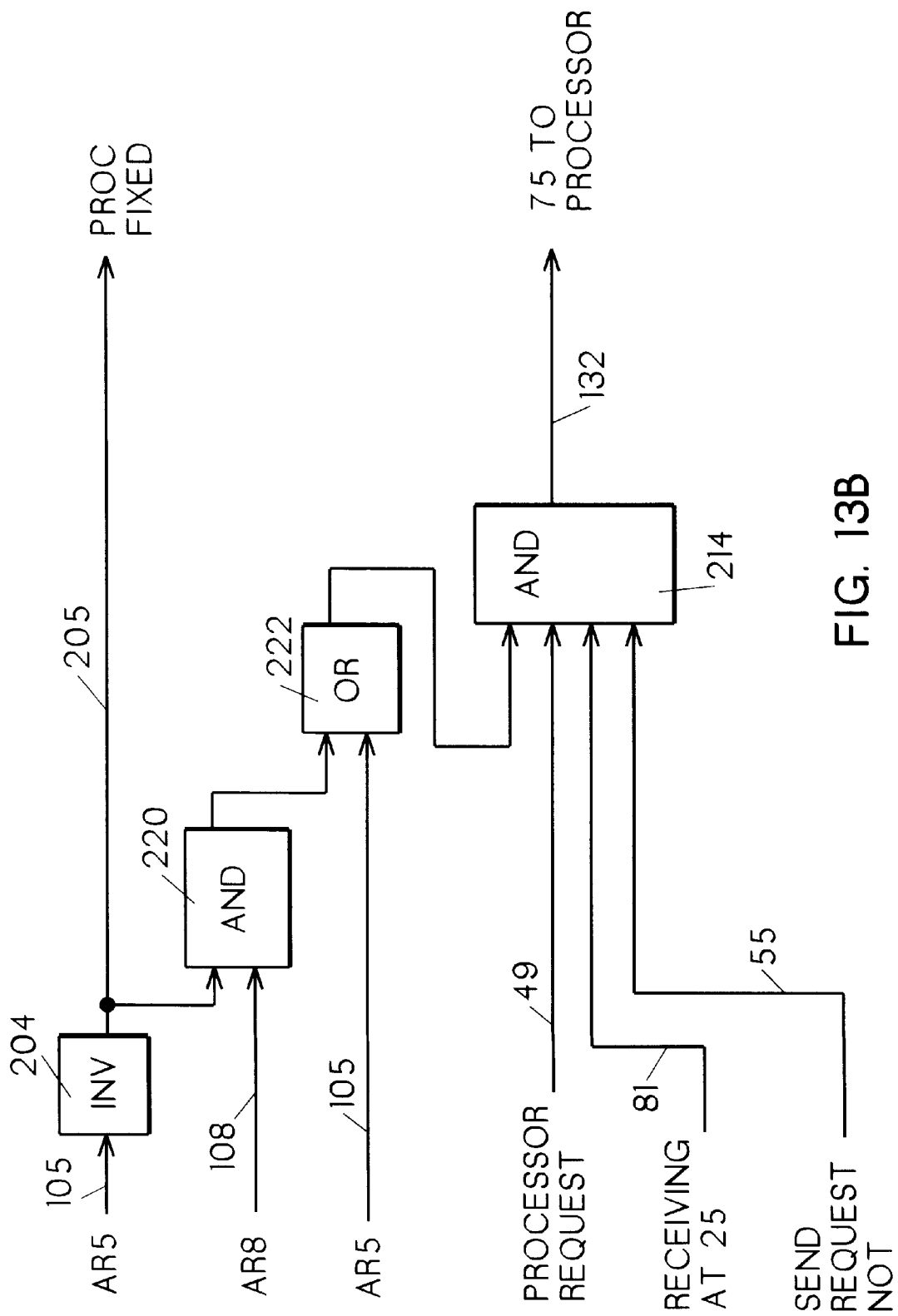

FIG. 13B illustrates the logic for generating 75 TO PROCESSOR signal 132.

Figure 13C:
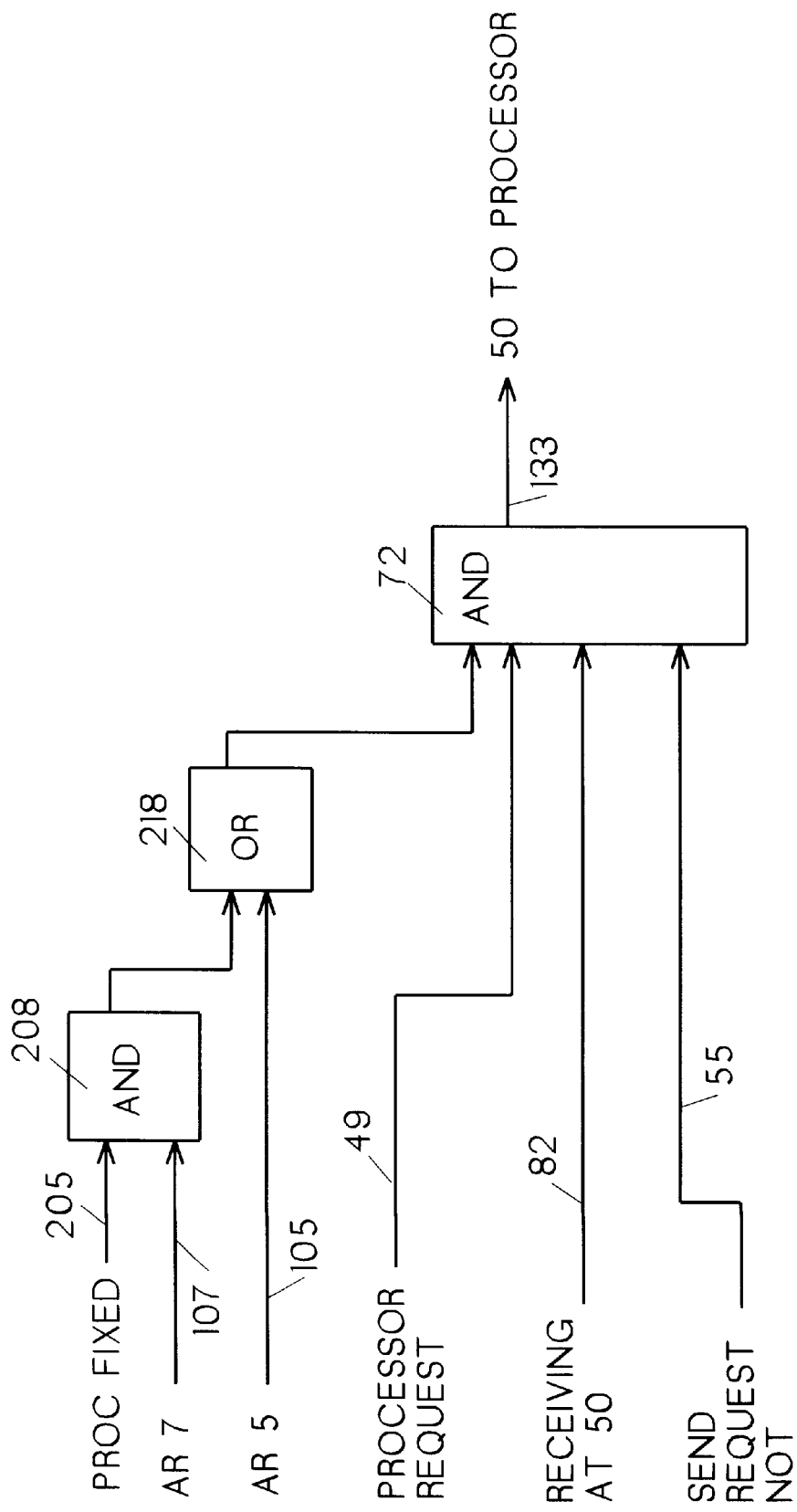

FIG. 13C illustrates the logic for generating 50 TO PROCESSOR signal 133.

Figure 13D:
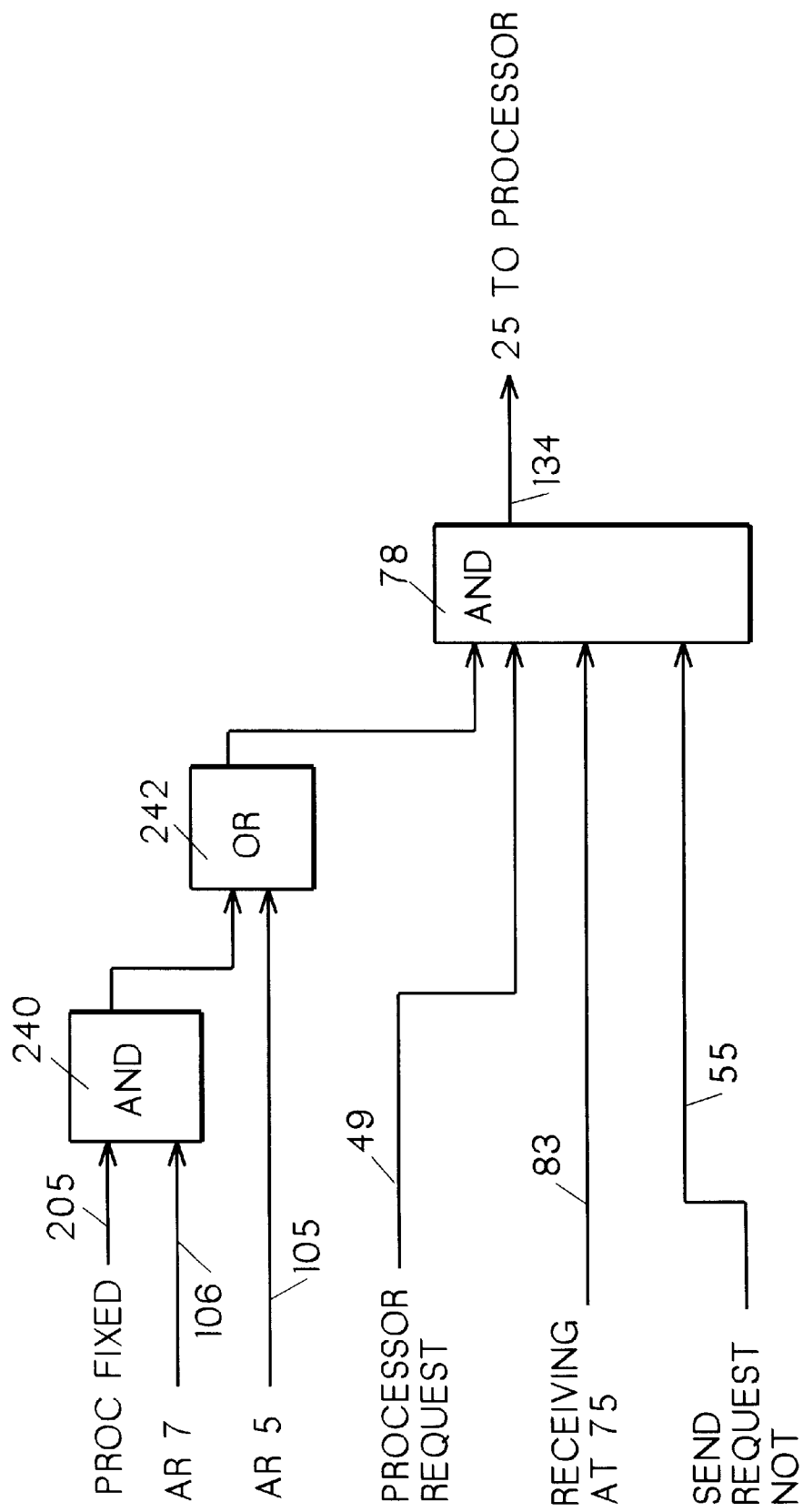

FIG. 13D illustrates the logic for generating 25 TO PROCESSOR signal 134.

Figure 13E:
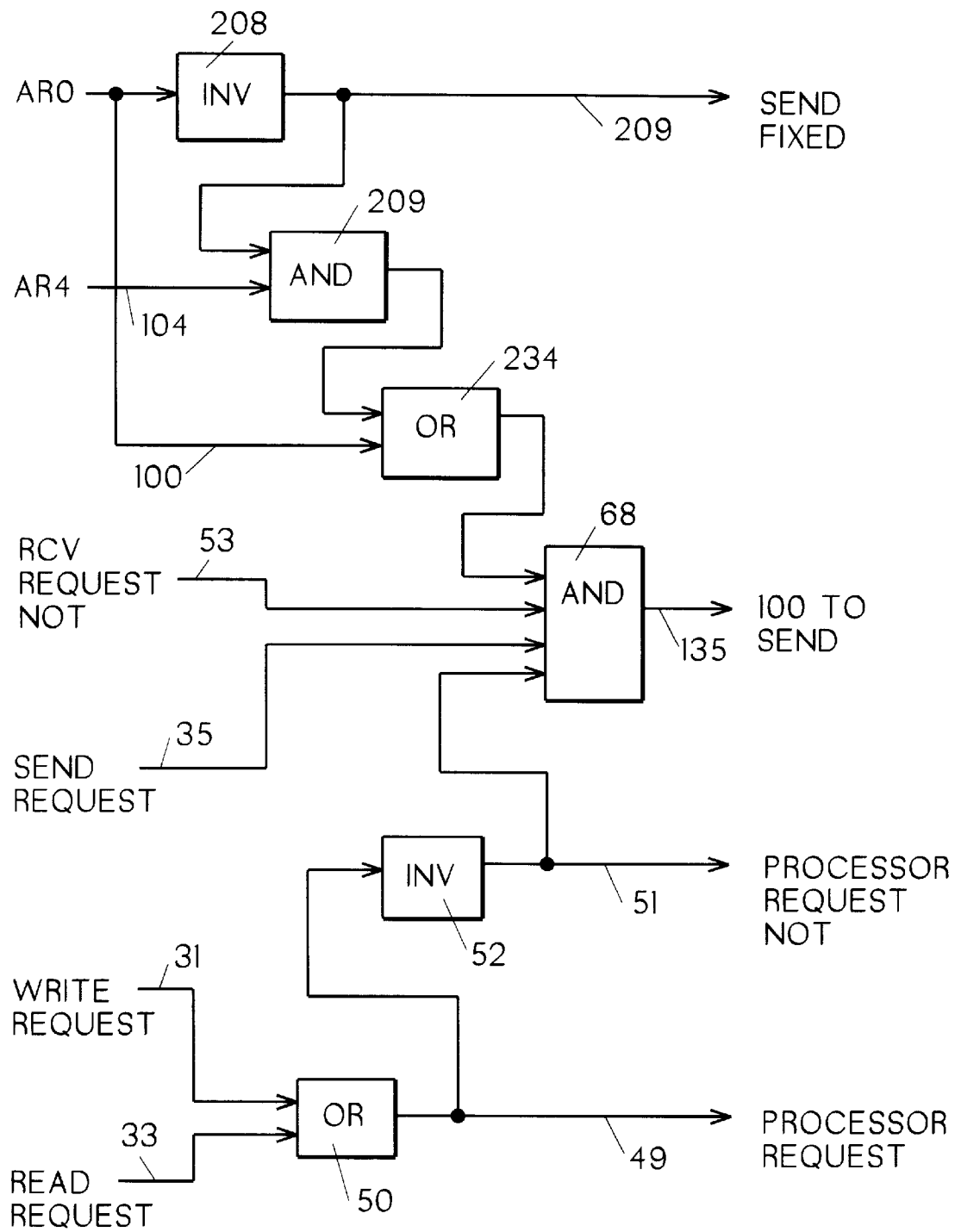

FIG. 13E illustrates the logic for generating 100 TO SEND signal 135.

Figure 13F:
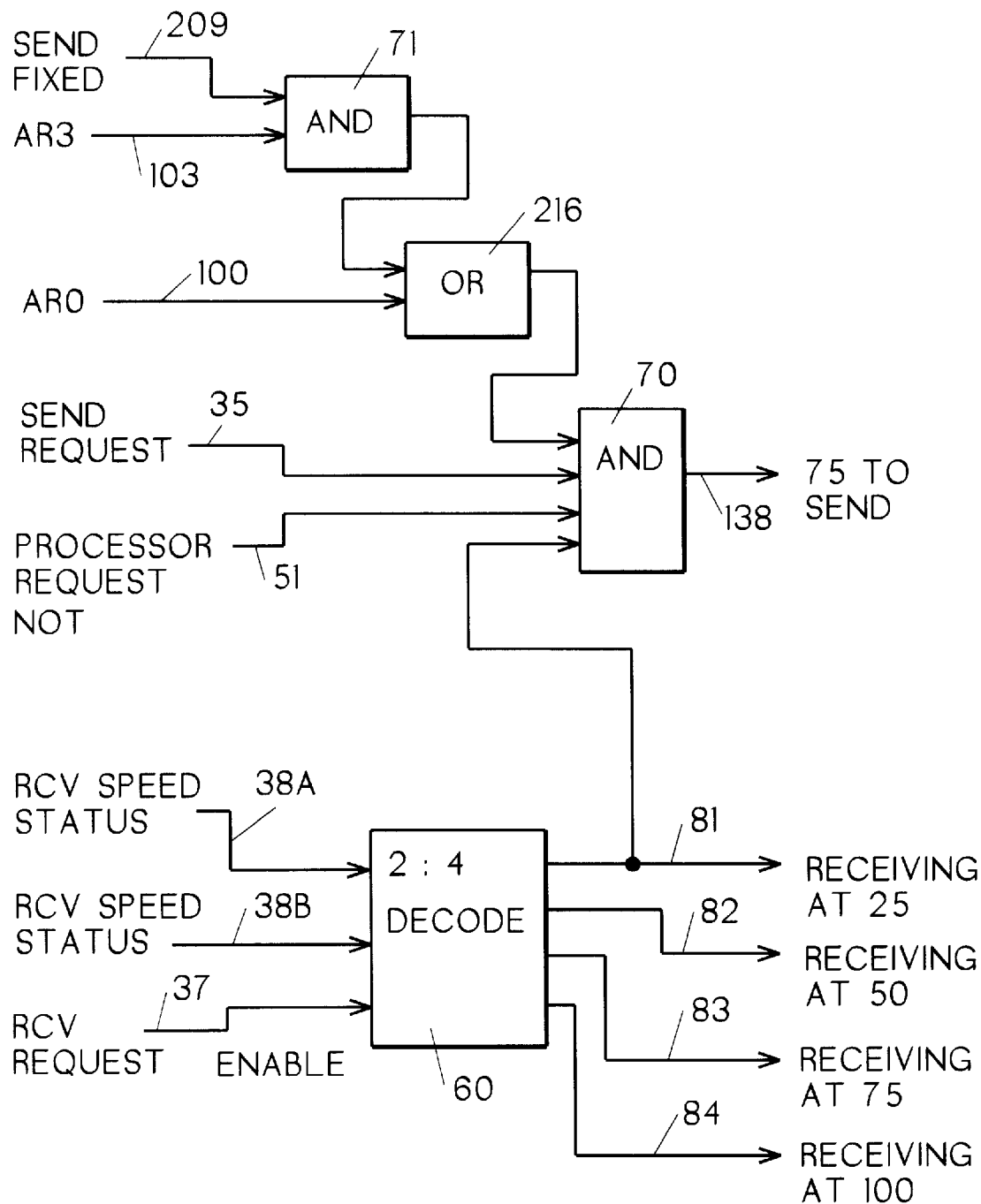

FIG. 13F illustrates the logic for generating 75 TO SEND signal 138.

Figure 13G:
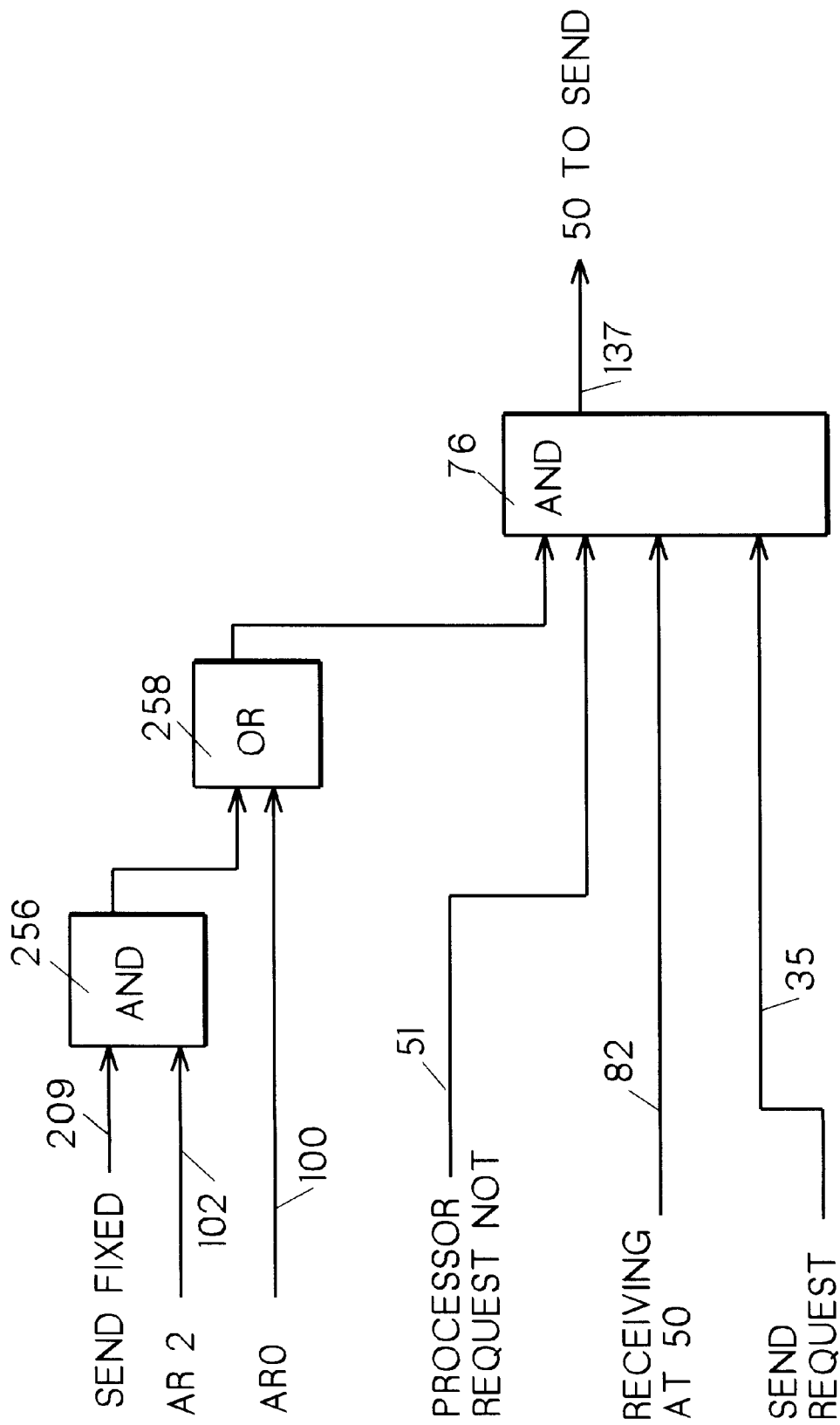

FIG. 13G illustrates the logic for generating 50 TO SEND signal 137.

Figure 13H:
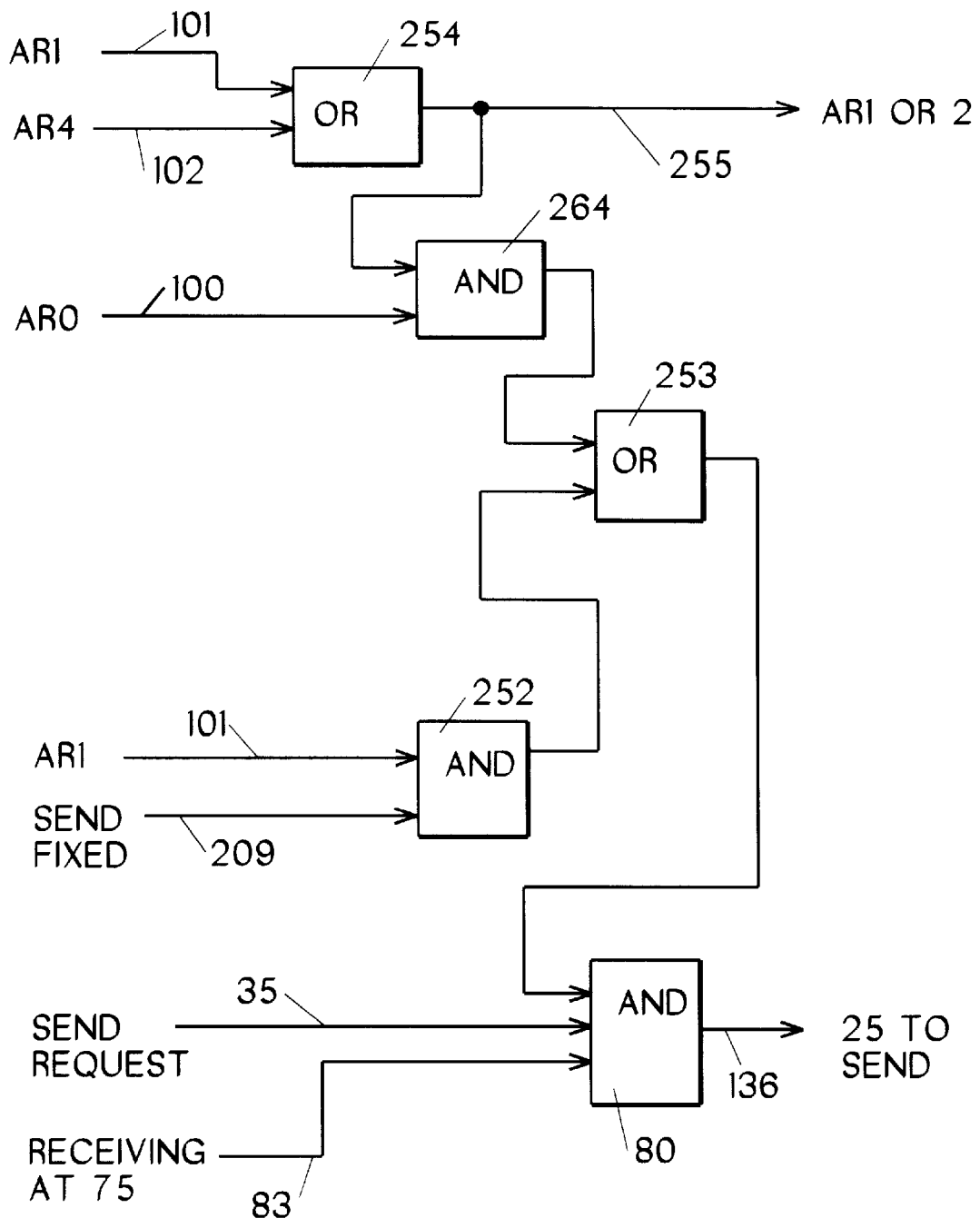
Figure 131:
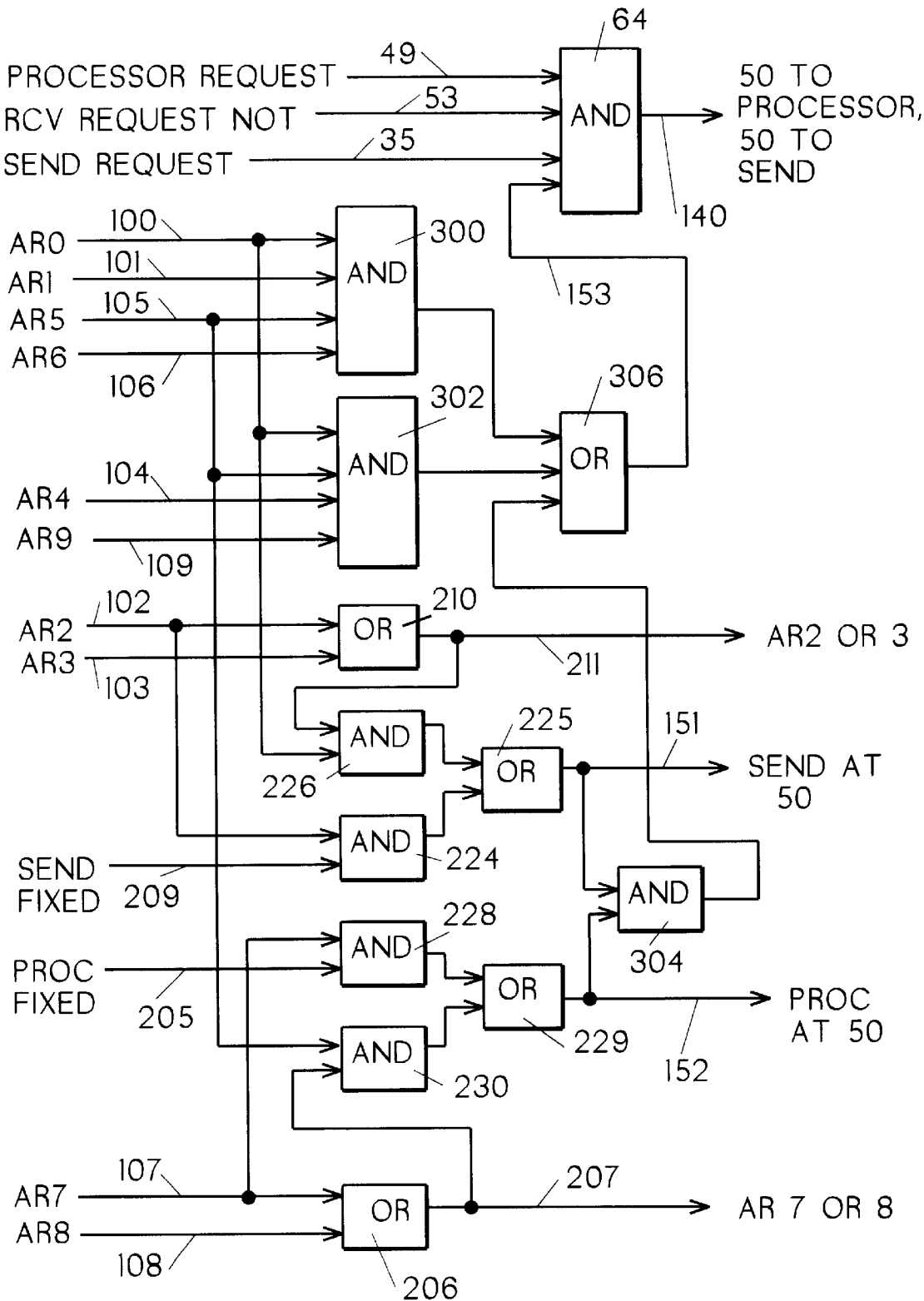

FIG. 13H illustrates the logic for generating 25 TO SEND signal 136.

FIG. 13I illustrates the logic for generating 50 TO PROCESSOR 50 TO SEND signal 140.

Figure 13J:
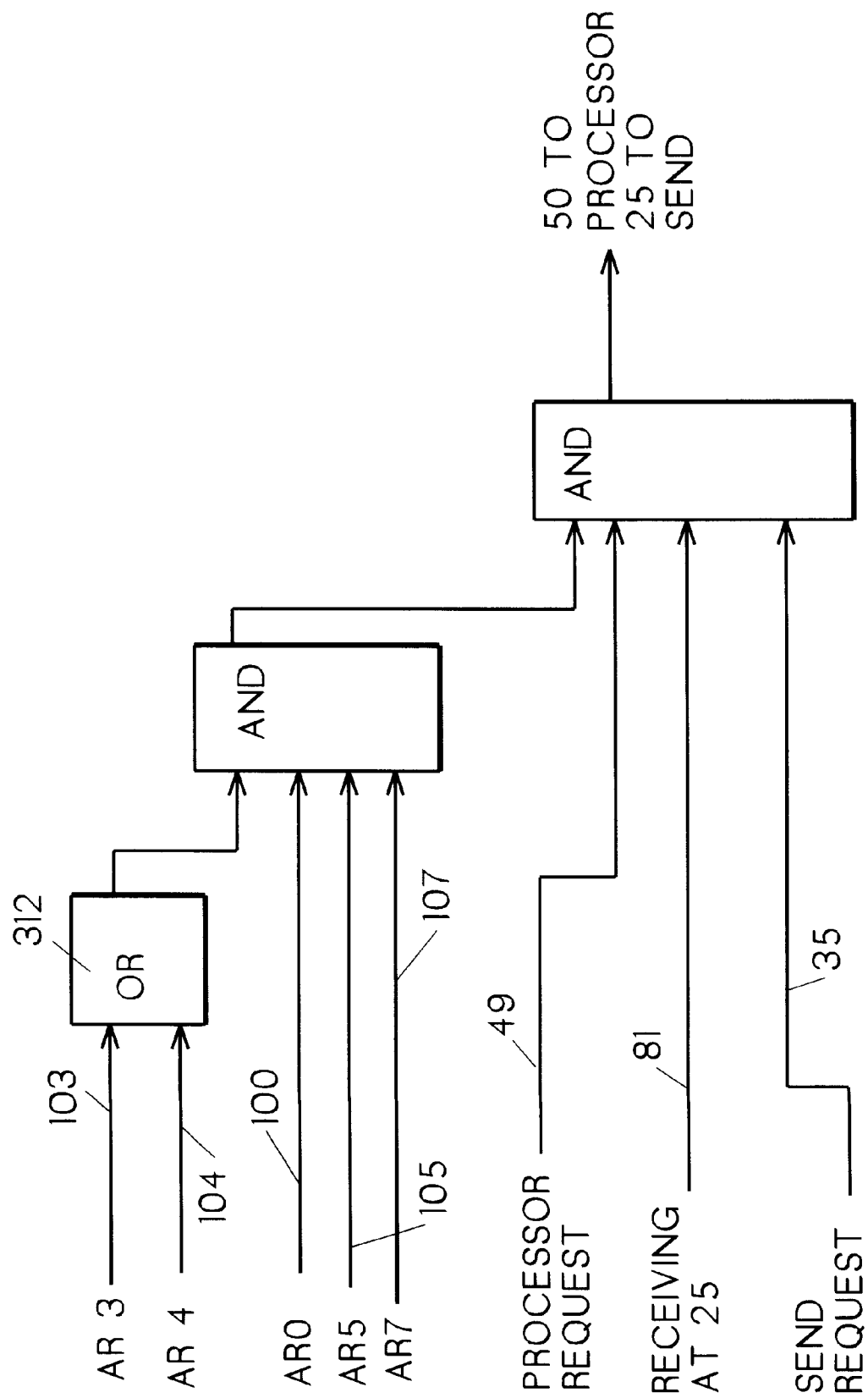

FIG. 13J illustrates the logic for generating 50 TO PROCESSOR 25 TO SEND signal 142.

Figure 13K:
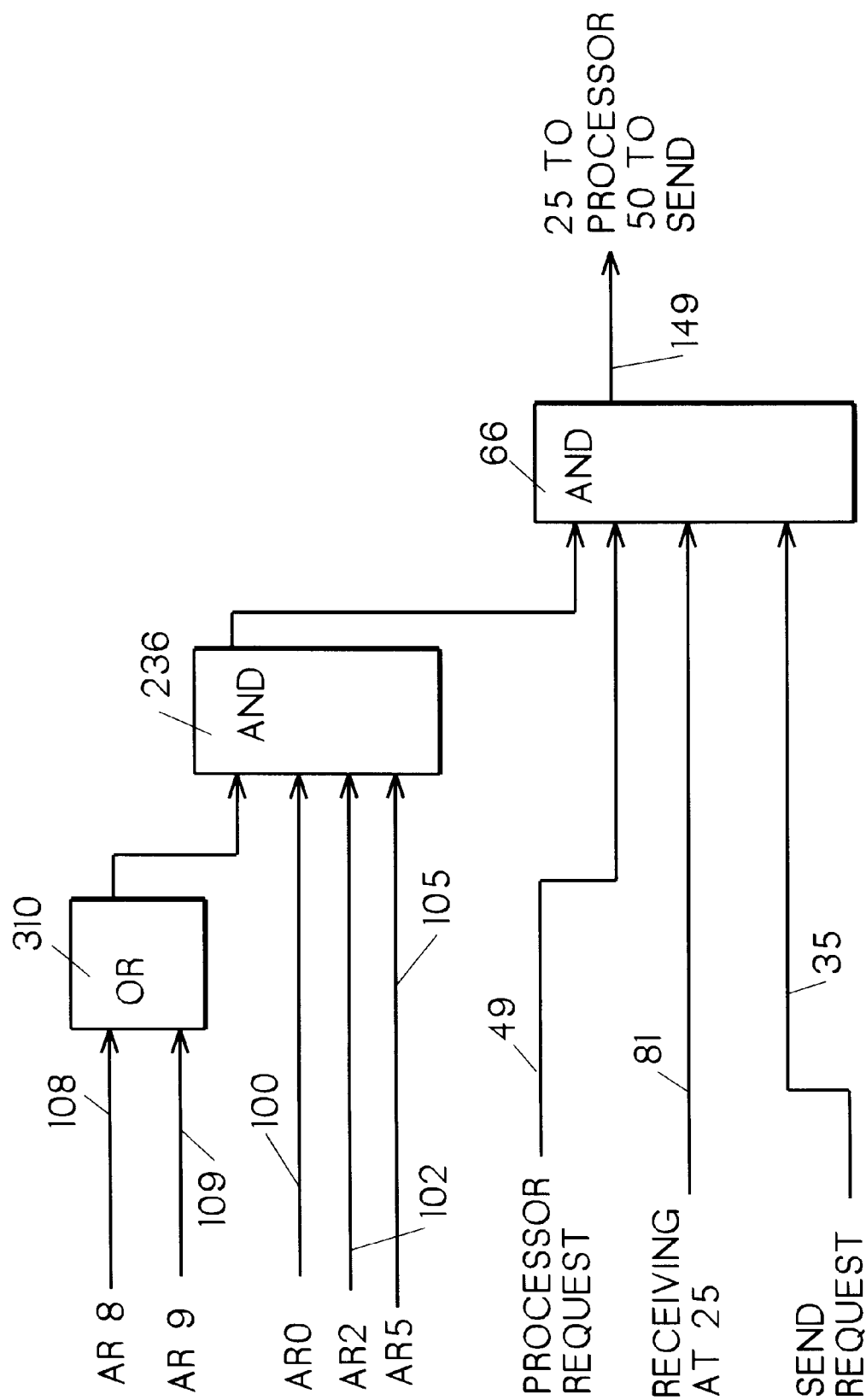

FIG. 13K illustrates the logic f or generating 25 TO PROCESSOR 50 TO SEND signal 141.

Figure 13L:
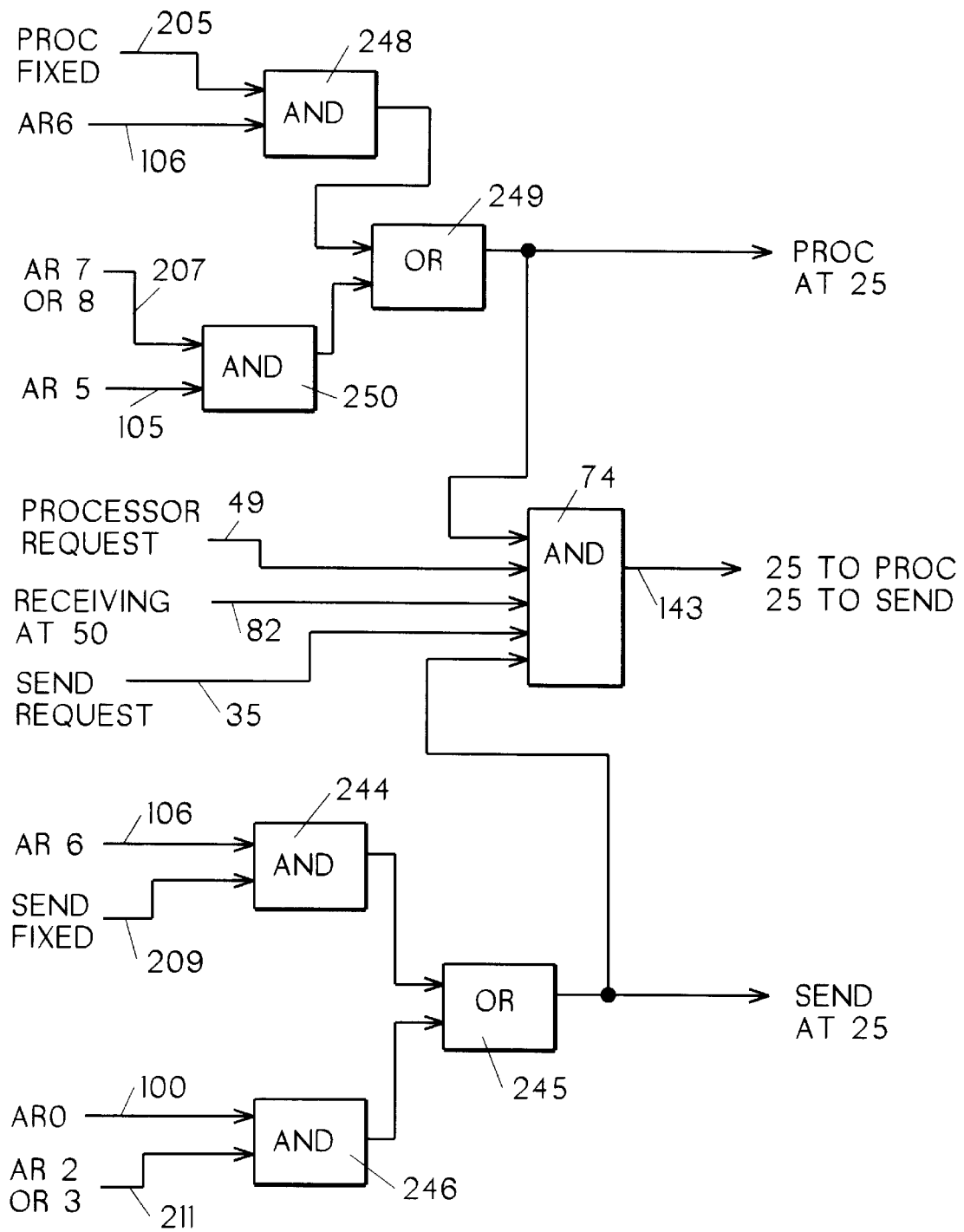

FIG. 13L illustrates the logic for generating 25 TO PROCESSOR 25 TO SEND signal 143.

Referring to FIGS. 13A–13L in connection with FIG. 9, memory bandwidth proportionment 162 will be described. Write request 31 and read request 33 are fed to OR gate 50. Write request 31 is also fed to AND gate 181, and read request 33 is fed to AND gate 182. Send request 35 is input to inverter 56, AND gate 64, AND gate 66, AND gate 68, AND gate 74, AND gate 76, AND gate 70, AND gate 80, and AND gate 260. Receive request 37 is fed to inverter 54, AND gate 193 and to the enable pin on decoder 60.

The output of OR gate 50 is fed on processor request line 49 to inverter 52, AND gate 58, AND gate 214, AND gate 66, AND gate 64, AND gate 72, AND gate 78, AND gate 74, and AND gate 260. The output of inverter 52 is fed on processor request NOT line 51 to AND gate 68, AND gate 76, and AND gate 70. The output of inverter 56 is fed on send request NOT line 55 to AND gate 58, AND gate 214, AND gate 72, and AND gate 78. The output of inverter 54 is fed on receive request NOT line 53 to AND gate 58, AND gate 64, and AND gate 68.

Referring to FIGS. 13A–13L in connection with FIG. 6, allocation register 28 bits AR0 through AR9 appear in FIGS. 13A–13L as bit lines 100 through 109, respectively. Allocation register 28 bit AR0 on line 100 is fed to inverter 208, AND gate 236, OR gate 234, AND gate 300, AND gate 302, AND gate 226, AND gate 246, AND gate 264, OR gate 258, OR gate 216, and AND gate 262. Allocation register 28 bit AR1 on line 101 is fed to OR gate 254, AND gate 300, and AND gate 252. Allocation register bit AR2 on line 102 is fed to OR gate 210, OR gate 254, AND gate 236, AND gate 256, and AND gate 224. Allocation register 28 bit AR3 on line 103 is fed to OR gate 210, OR gate 312, and AND gate 71. Allocation register 28 bit AR4 on line 104 is fed to AND gate 232, AND gate 302, and OR gate 312. Allocation register 28 bit AR5 on line 105 is fed to OR gate 202, inverter (INV) 204, OR gate 222, AND gate 236, AND gate 300, AND gate 302, AND gate 230, OR gate 218, OR gate 242, AND gate 250, and AND gate 262. Allocation register 28 bit AR6 on line 106 is fed to AND gate 300, AND gate 240, AND gate 244, and AND gate 248. Allocation register 28 bit AR7 on line 107 is fed to OR gate 206, AND gate 228, AND gate 238 and AND gate 262. Allocation register 28 bit AR8 on line 108 is fed to OR gate 206, AND gate 220, and OR gate 310. Allocation register 28 bit AR9 on line 109 is fed to AND gate 201, OR gate 310, AND gate 302.

The output of inverter 208, representing send fixed (NOT AR0) on line 209 is fed to AND gate 232, AND gate 224, AND gate 71, AND gate 244, AND gate 252, and AND gate 256. The output of OR gate 210, representing AR2 or AR3 on line 211 is fed to AND gate 226 and AND gate 246. The output of inverter 204, representing NOT AR5, is fed on process fixed line 205 to AND gate 220, AND gate 201, AND gate 228, AND gate 238, AND gate 240, and AND gate 248. The output of OR gate 254, representing AR1 or AR2 is fed on line 255 to AND gate 264. The output of OR gate 206, representing AR7 or AR8, is fed on line 207 to AND gate 230 and AND gate 250.

Decoder 60 decodes the two bits on receive speed status lines 38a and 38b, and responsive thereto, when enabled by receive request line 37, generates one of four signal lines: RECEIVING AT 25 MB/s line 81, RECEIVING AT 50 MB/s line 82, RECEIVING AT 75 MB/s line 83, or RECEIVING AT 100 MB/s line 84. RECEIVING AT 25 MB/s line 81 is fed to AND gate 66, AND gate 214, AND gate 70, and AND gate 260. RECEIVING AT 50 MB/s line 82 is fed to AND gate 72, AND gate 74 and AND gate 76 (and also to OR gate 191, FIG. 15C.) RECEIVING AT 75 MB/s line 83 is fed to AND gate 78 and AND gate 80 (and also to OR gate 192, FIG. 15C.) RECEIVING AT 100 MB/s line 84 is fed to OR gate 192 and AND gate 196 (both in FIG. 15C.)

Figure 14A:
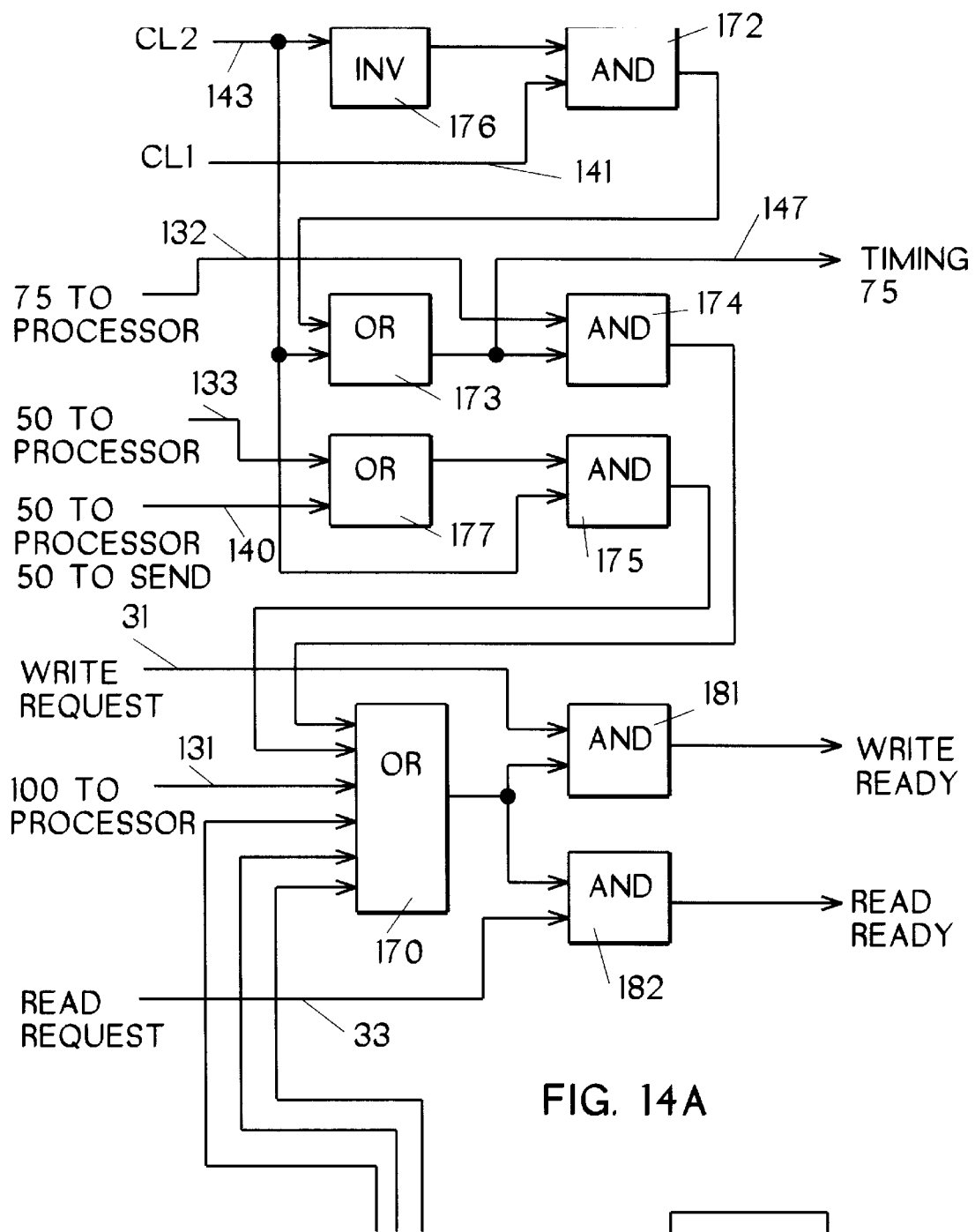
FIGS. 14A and 14B are a logic flow diagram showing the logic to generate the data flow pacing (ready) signals for the processor to network adapter interface according to the preferred embodiment of this invention.

The output of AND gate 201 is fed to OR gate 202, the output of which is fed to AND gate 58. The output of AND gate 58, representing 100 MB/s bandwidth allocated to processor 4, as is illustrated in FIG. 12E, is fed on line 131 to OR gate 170 (FIG. 14A.) The output of AND gate 220 is fed to OR gate 222, the output of which is fed to AND gate 214. The output of AND gate 214, representing 75 MB/s bandwidth allocated to processor 4, is fed on line 132 to AND gate 174 (FIG. 14A.)

Figure 15A:
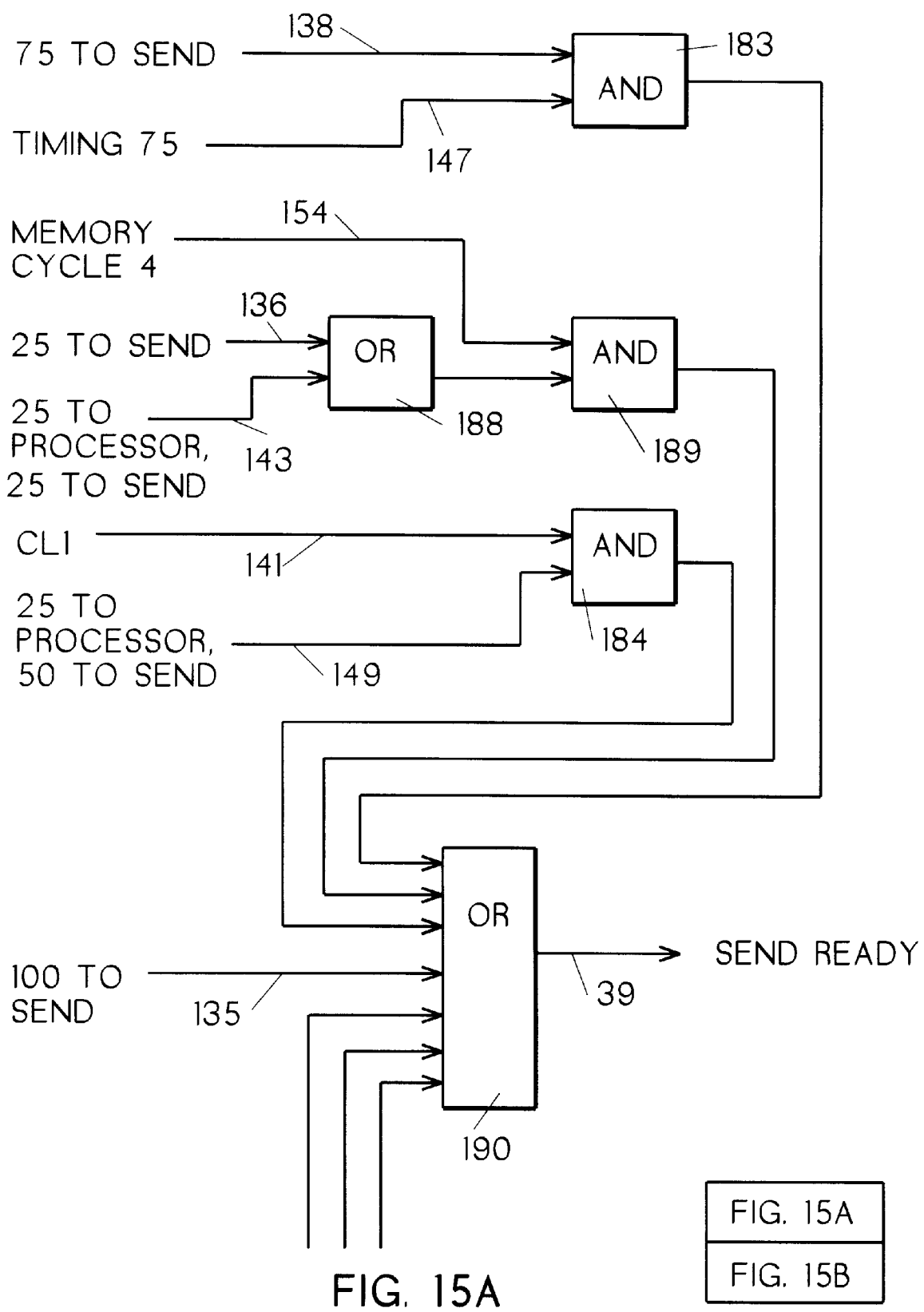
FIGS. 15A through 15E are logic flow diagrams showing the logic to generate the data flow pacing (ready) signals for the network adapter to network interface according to the preferred embodiment of this invention.
Figure 15B:
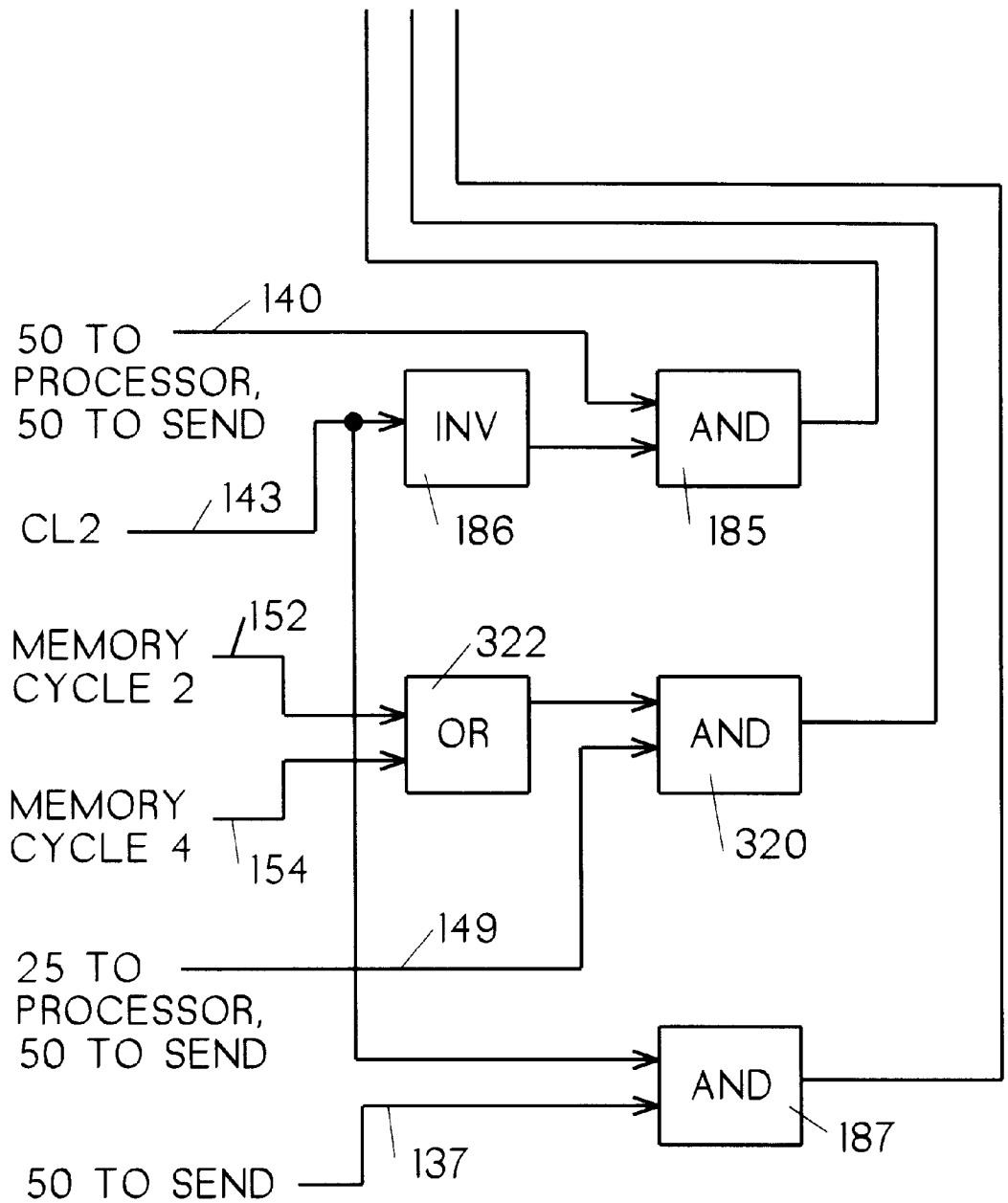

The output of AND gate 232 is fed to OR gate 234, the output of which is fed to AND gate 68. The output of AND gate 68, representing 100 MB/s bandwidth allocated to send adapter 14, is fed on line 135 to OR gate 190, OR gate 199, and OR gate 198 (FIG. 15D.)

The outputs of AND gate 224 and 226 are fed to OR gate 225. The output of OR gate 225, representing the command to operate send adapter 14 at 50 MB/s, if fed on line 151 to AND gate 304. The outputs of AND gates 228 and 230 are fed to OR gate 229, the output of which is fed on line 152 to AND gate 304. The outputs of AND gates 300, 302 and 304 are fed to OR gate 306, the output of which is fed on line 153 to AND gate 64. The output of AND gate 64, representing 50 MB/s memory 18 bandwidth allocated to each of processor 4 and send adapter 14A, is fed on line 140 to OR gate 177 (FIG. 14); and to AND gate 185 and OR gate 198 (FIG. 15.)

The output of OR gate 310 is fed to AND gate 236, the output of which is fed to AND gate 66. The output of AND gate 66, representing 25 MB/s memory 18 bandwidth allocated to processor 4, and 50 MB/s to send adapter 14, is fed on line 141 to OR gate 178 (FIG. 14B); and to AND gate 184, AND gate 320, and OR gate 198 (FIG. 15D.)

The output of AND gate 71 is fed to OR gate 216, the output of which is fed to AND gate 70. The output of AND gate 70 appears on 75 MB/s allocated to send adapter 14, line 138 (see FIG. 12B), which is fed to AND gate 183, and OR gate 199 (FIG. 15E.)

The output of AND gate 238 is fed to OR gate 218, the output of which is fed to AND gate 72. The output of AND gate 133, representing 50 MB/s memory bandwidth allocated to processor 4, is fed on line 133 to OR gate 177 (FIG. 14A.)

Figure 14B:
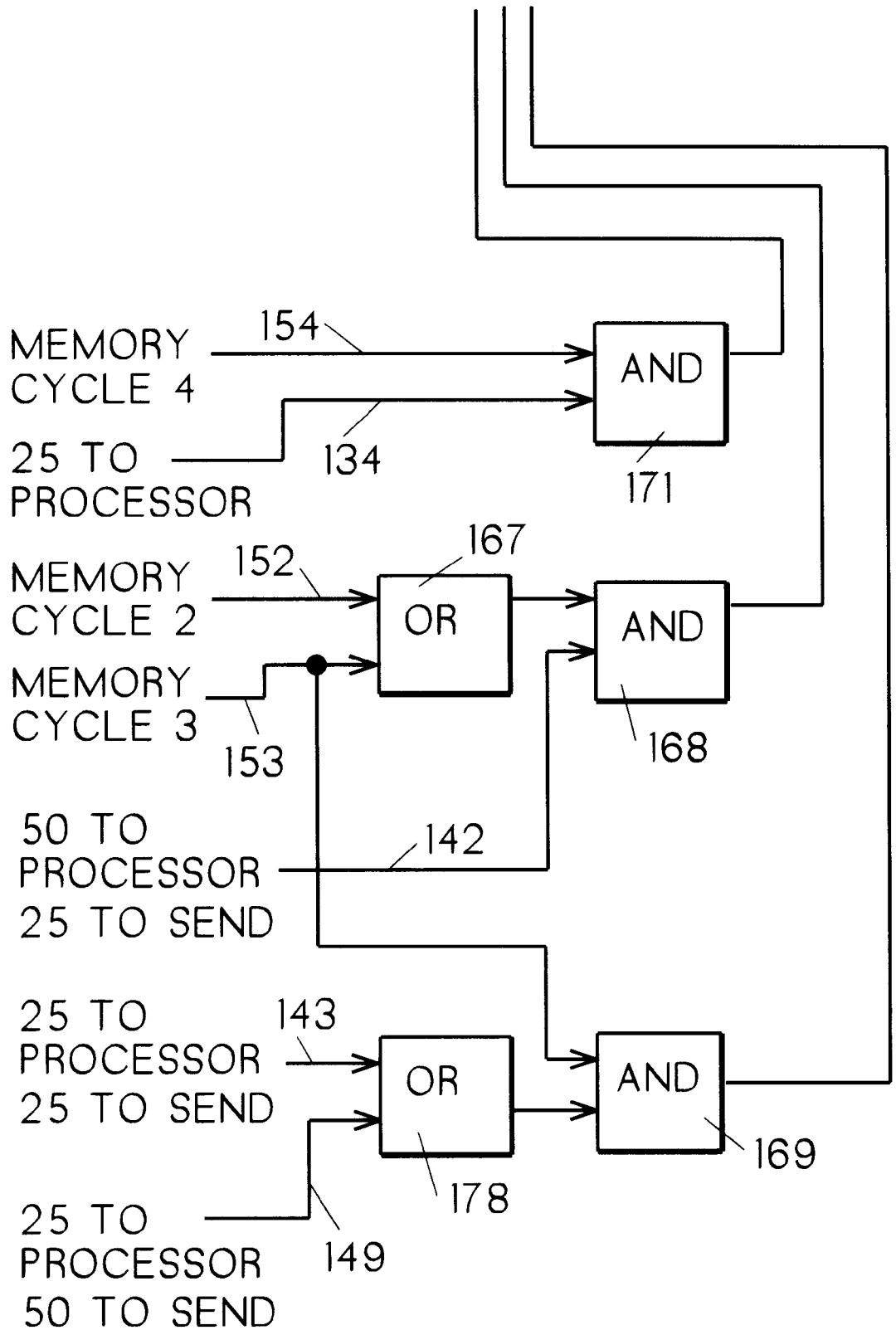

The output of AND gate 240 is fed to OR gate 242, the output of which is fed to AND gate 78. The output of AND gate 78, representing 25 MB/s memory 18 bandwidth allocated to processor 4, is fed on line 134 to AND gate 171 (FIG. 14B.)

The outputs of AND gates 244 and 246 are fed to OR gate 245, the output of which represents send at 25 MB/s and is fed to AND gate 74. The outputs of AND gates 248 and 250 are fed to OR gate 249, the output of which is fed to AND gate 74. The output of AND gate 74, representing 25 MB/s allocated to processor 4 and 25 MB/s allocated to send adapter 14, is fed on line 143 to OR gate 178 (FIG. 14B) and to OR gate 188 (FIG. 15A.)

The outputs of AND gates 252 and 264 are fed to OR gate 253, the output of which is fed to AND gate 80. The output of AND gate 80, representing 25 MB/s memory 18 bandwidth allocated to send adapter 14, is fed on line 136 to OR gate 188 (FIG. 15A.)

The output of AND gate 256 is fed to OR gate 258, the output of which is fed to AND gate 76. The output of AND gate representing 50 MB/s memory 18 bandwidth allocated to send adapter 14, is fed on line 137 to AND gate 187 and OR gate 198 (FIG. 15D.)

The output of OR gate 312 is fed to AND gate 262, the output of which is fed to AND gate 260. The output of AND gate 142, representing 50 MB/s bandwidth allocated to processor 4 and 25 MB/s bandwidth allocated to send adapter 14B, is fed on line 142 to AND gate 168 (FIG. 14.)

Referring further to FIGS. 13A–13L, 14A–14B and 15A–15E, in operation write request 31 and read request 33 from processor 4 are logically ORed in gate 50 to produce processor (write or read) request 49. Inverters 52, 54, and 56 generate the inverse (NOT) request signals 51, 53, and 55, respectively.

Referring to FIG. 13A, one of the possible allocations is shown by AND gate 58, which allocates all of the 100 MB/s of bandwidth to processor 4, the example of FIG. 12E. The inputs to AND gate 58 detect the condition where there is no RCV request 37 as detected by signal 53, there is no send request 35 as detected by signal 55, there is a processor request 49, and allocation register 28 permits processor 4 to be allocated 100 MB/s (implemented by gates 201 and 202). Gate 201 detects that the processor has been assigned a fixed bandwidth rate of 100 MB's as determined by AR5 signal 105 being a zero into inverter 204 to generate the PROC FIXED 205 signal, which is a logical 1 when the processor has been programmed to use only a fixed rate into adapter memory 18. AR9 signal line 109 represents the bit in allocation register 28 which defines the fixed rate to be 100 MB/s as shown in FIG. 8B. OR gate 202 logically OR's the output of gate 201 with AR5 signal 105, which indicates processor 4 is enabled to receive a variable amount of bandwidth as controlled by allocation logic 30. FIG. 8A shows the case where allocation register 28 selects dynamic allocation for the processor requests.

Referring to FIG. 13I, a different allocation is shown by AND gate 64, which allocates 50 MB/s of bandwidth to processor 4 and 50 MB/s of bandwidth to send adapter 14 (this case is shown by FIG. 12D.) The inputs to AND gate 64 determine that there is no RCV request as detected by signal 53, there is a send request 35, there is a processor request 49, and allocation register 28 permits processor 4 to be allocated 50 MB/s as detected by gates 228 to 230 and permits send adapter 14 to be allocated 50 MB/s as detected by gates 224 to 226. Gate 228 detects that the processor has been assigned a fixed bandwidth rate of 50 MB's as determined by the PROC FIXED 205 signal, which is a logical 1 when the processor has been programmed to use a fixed rate to adapter memory 18. AR7 signal 107 is the bit in allocation register 28 which defines the fixed rate to be 50 MB/s as shown in FIG. 8B. For the other case using gate 230, AR5 signal 105=1 is the bit in allocation register 28 which indicates that processor 4 is enabled to receive a variable amount of bandwidth as controlled by allocation logic 30. FIG. 8A shows the case where allocation register 28 enables the variable rate and dynamic allocation for handling the processor requests. Gate 230 detects that the processor has been assigned a variable bandwidth rate, and bit AR7 107 and AR8 108 indicate that the allocation of bandwidth should be based upon the processor having Mid Hi or Mid Lo priority as detected by gate 206 feeding gate 230. The output of AND gate 230 is a logical 1 when processor 4 is enabled for variable rate selection and the processor is assigned either of the middle priorities. OR gate 229 is a logical OR of the two middle priority cases (the fixed rate from gate 228 and the variable rate from gate 230) which enable 50 MB/s to be selected. Likewise, gate 224 detects that send adapter 14 has been assigned a fixed bandwidth rate of 50 MB's as determined by the SEND FIXED 209 signal, which is a logical 1 when send adapter 14 has been programmed to use a fixed rate to adapter memory 18. AR2 signal 102 is the bit in allocation register 28 which defines the fixed rate to be 50 MB/s as shown in FIG. 7B. For the other case using gate 226, AR0 signal 100=1 is the bit in allocation register 28 which indicates that send adapter 14 is enabled to receive a variable rate of bandwidth as controlled by allocation logic 30. FIG. 7A shows the case where allocation register 28 enables the variable rate and dynamic allocation for handling the send adapter requests. Gate 226 detects that send adapter 14 has been assigned a variable bandwidth rate, and bit AR2 102 or AR3 103 indicate that the allocation of bandwidth should be based upon the send adapter having Mid Hi or Mid Lo priority as detected by gate 210 feeding gate 226. The output of AND gate 226 is a logical 1 when send adapter 14 is enabled for the variable rate selection and is assigned either of the middle priorities. OR gate 225 is a logical OR of the two middle priority cases (the fixed rate from gate 224 and the variable rate from gate 226) which enable 50 MB/s each to be selected for both processor 4 and send adapter 14. The output from both gates 229 and 225 are input to AND gate 304, which goes to OR gate 306 to enable an input to gate 64 and allocate 50 MB/s to processor 4 and 50 MB/s to send adapter 14. There are two other cases that also cause the 50/50 split of the 100 MB/s bandwidth. These are OR'd into gate 306. The first case, detected by gate 300, occurs if both processor 4 bits AR5 and AR6 are 1, and send adapter 14 bits AR0 and AR1 being 1 are enabled for variable rate and selected to be Hi-Pri. The second case, detected by gate 302, is if both processor 4 bits AR5 and AR9 are 1, and send adapter 14 bits AR0 and AR4 being 1 are enabled for the variable rate and selected to be Lo-Pri.

There are other possible allocations for splitting 100 MB/s between the processor and the send adapter when operating using the variable rate: 100:0, 0:100, 75:25, or 25:75. The allocation made is dependent upon the programmable values stored to allocation register 28.

Referring again to FIG. 13A, for instance, if allocation register 28 was set to select HI-Pri (AR6 bit 106=1) for processor 4 and not Hi-Pri for send adapter 14 (AR1 bit 101=0), then dynamic allocation logic 30 allocates 100 MB/s to processor 4 and 0 MB/s to send adapter 14.

Referring to FIG. 13E, similarly, if allocation register 28 was set to select HI-Pri (AR1 bit 101=1) for send adapter 14 and not Hi-Pri for processor 4 (AR5 bit 105=0), then dynamic allocation logic 30 allocates 100 MB/s to send adapter 14 and 0 MB/s to processor 4.

Referring to FIGS. 13B and 13H, if allocation register 28 is set to select a Mid-Hi or Mid-Lo priority (AR7 or AR8 bits 107 or 108=1) for processor 4 and Lo-Pri for send adapter 14 (AR4 bit 104=1), then dynamic allocation logic 30 allocates 75 MB/s to processor 4 and 25 MB/s to send adapter 14.

Referring to FIGS. 13D and 13F, if allocation register 28 is set to select a Mid-Hi or Mid-Lo priority (AR2 or AR3 bits 102 or 103=1) for send adapter 14 and Lo-Pri for processor 4 (AR9 bit 109=1), then dynamic allocation logic 30 allocates 25 MB/s to processor 4 and 75 MB/s to send adapter 14.

Referring to FIGS. 13J, all other cases allocate the 100 MB/s bandwidth equally: 50 MB/s to processor 4 and 50 MB/s to send adapter 14.

Referring to FIG. 13K, another allocation case of interest is shown by AND gate 66. In this case, 25 MB/s is used by RCV adapter 12 and 75 MB/s remains to be allocated between processor 4 and send adapter 14. The possible allocations are: 75:0, 0:75, 50:25, 25:50 (processor allocation:send adapter allocation). AND gate 66 implements the 25:50 case. AND gate 66 selects this 25:50 allocation when RCV adapter 12 is RECEIVING AT 25, processor request 49=1, send request 35=1, and AND gate 236=1. AND gate 236 equals 1 when both processor 4 (AR5=1) and send adapter 14 (AR0=1) are selected by allocation register 28 to operate in the variable rate mode and AR2=1 indicates that send adapter 14 is programmed to be Mid-Hi priority and processor 4 is programmed to be a lessor priority (AR8 or AR9=1) as detected by gate 310. The timing for this case is shown in FIG. 12A.

Referring to FIG. 13J, gate 260 selects the reverse allocation (50:25) when RCV adapter 12 is RECEIVING AT 25, processor request 49=1, send request 35=1, and AND gate 262=1. AND gate 262 equals 1 when both processor 4 (AR5=1) and send adapter 14 (AR0=1) are selected by allocation register 28 to operate in the variable rate mode and AR7=1 indicates that processor 4 is programmed to be Mid-Hi priority and send adapter 14 is programmed to be a lessor priority (AR3 or AR4=1) as detected by gate 312. The timing for this case is shown in FIG. 11D.

FIGS. 13A–13L include similar combinational logic for detecting all possible combinations of processor requests, send requests, receiving rates, and allocation register settings to select an allocation dynamically for each scenario. Each selection is stable as long as the present conditions do not change. However, any change in the scenario (like the processor request line 49 or send request line 35 going inactive, the receiving rate changes, or the allocation register is reprogrammed) causes a dynamic and immediate change in the allocation of adapter memory 18 bandwidth. This happens immediately because the allocation logic of FIGS. 13A–13L is purely combinational logic and is not latched. Any change in the inputs reflects an immediate change to the outputs of the combinational allocation logic.

Referring further to FIGS. 14A–14B in connection with FIGS. 13A–13L, the combinational logic of block 164 (FIG. 9) for generating processor ready signals 32 and 34 will be described. Generation of processor ready signals block 164 receives the allocation decisions of FIGS. 13A–13L as made by memory bandwidth proportionment block 162 of FIG. 9. Block 162, responsive to the allocation decision generated with block 162, represented in the composite by line 200, generates processor ready signals 180, 32, and 34 in accordance with the waveforms shown in FIGS. 11 and 12.

Referring to FIGS. 14A–14B in connection with FIGS. 10A–10C, clock 2 line 143 is inverted at INV 176, the output of which is fed to AND gate 172 along with clock 1 line 141. The output of AND gate 172 is fed to OR gate 173, along with clock 2 line 143, and its output is fed on TIMING75 line 147 to AND gate 174 and AND gate 183 (FIG. 15A.) The output of AND gate 174 is fed to OR gate 170.

The output of OR gate 177 is fed to AND gate 175, along with clock 2 line 143, and its output is also fed to OR gate 170. The output of OR gate 178 is fed to AND gate 169 along with memory cycle 3 line 153, and its output is fed to OR gate 170. Memory cycle 2 line 152 and memory cycle 3 line 153 are fed to OR gate 167, the output of which is fed to AND gate 168, and its output is also fed to OR gate 170. Memory cycle 4 line 154 is fed to AND gate 171, and its output is also fed to OR gate 170. The output of OR gate 170 is read or write ready line 180, which is fed to AND gates 181 and 182. AND gate 181 output is write ready line 32, and the output of AND gate 182 is read ready line 34.

In operation, the combinational logic of block 164 (FIGS. 9 and 14A–14B) functions as follows. If memory bandwidth proportionment block 162 activates signal line 131 (100 TO PROCESSOR), block 164 responds by allocating 100 MB/s of memory 18 bandwidth to processor 4. Signal 131 (100 TO PROCESSOR) is a direct input to OR gate 170 driving write or read ready 180 to a constant logical 1 as shown in FIG. 12E. Write or read ready 180 drives AND gates 181 and 182 to produce either write ready 32 or read ready 34 depending upon whether write request 31 or read request 33 is active (signals 31 and 33 are mutually exclusive).

If the logic of FIG. 13B activates signal line 132 (75 to Processor), three fourths of the 100 MB/s of memory 18 bandwidth is to be allocated to processor 4. Signal 75 TO PROCESSOR line 132 is input to AND gate 174, which in turn drives OR gate 170 and write or read ready 180 to a waveform as shown in FIG. 12C. The waveform of FIG. 12C has write or read ready 180 driven to 0 for memory cycle 1 and driven to 1 for the other three memory cycle times 2, 3, and 4. The corresponding ready 180 timing is generated by inverter 176, AND 172, and OR 173 as combinational logic based on the CL1 141 and CL2 143 signals generated as a countdown of the basic 25 MHZ timing signal 91. TIMING75 signal 147 generated by OR gate 173 is 0 for memory cycle 1 (line 151) and 1 for the other three memory cycle times 2, 3, and 4 (lines 152–154.) TIMING75 line 147 feeds AND gate 174 to generate write or read ready 180, when signal line 132 (75 to Processor) is a 1.

If the logic of FIG. 13C or 13I activates either of the signal lines 133 (50 TO PROCESSOR) or 140 (50 TO PROCESSOR, 50 TO SEND), it indicates that one half of the 100 MB/s of memory 18 bandwidth is to be allocated to processor 4. Signal lines 133 and 140 are ORed together in gate 177, which feeds AND gate 175, OR 170, and drives write or read ready 180 to a waveform as shown in FIGS. 11H and 12D. The waveform of FIGS. 11H and 12D have write or read ready 180 driven to 0 for memory cycles 1 and 2, and driven to 1 for memory cycles 3 and 4. The corresponding ready 180 timing is generated directly by signal CL2 143. CL2 signal 143 is 0 for memory cycles 1 and 2, and is driven to 1 for memory cycles 3 and 4. CL2 line 143 feeds AND gate 175 to generate write or read ready 180, when either signal 50 TO PROCESSOR line 133 or 50 TO PROCESSOR, 50 TO SEND line 140 is a 1.

If memory bandwidth proportionment logic 162 (the logic of FIG. 13D or 13J or 13H) activates either 25 TO PROCESSOR, 50 TO SEND signal line 149 or 25 TO PROCESSOR, 25 TO SEND signal line 143, one quarter of the 100 MB/s of memory 18 bandwidth is to be allocated to processor 4. Signals 149 and 143 are OR'd together in gate 178, which feeds AND gate 169, OR 170, and drives Write or Read Ready 180 to a waveform as shown in FIGS. 11F and 12A. The waveform of FIGS. 11F and 12A has write or read ready 180 driven to 1 for memory cycle 3 and to 0 for the other memory cycles 1, 3, and 4. The corresponding ready 180 timing is generated directly by signal memory cycle 3 line 153 (FIG. 10). The corresponding ready 180 timing is generated as follows: memory cycle 3 line 153 feeds AND gate 169 to generate write or read ready 180, when either signal line 149 or 143 is a 1.

When bandwidth proportionment logic 162 (FIG. 9) activates 50 TO PROCESSOR, 25 TO SEND signal line 140, one half of the 100 MB/s of memory 18 bandwidth is to be allocated to processor 4. Signal 50 TO PROCESSOR, 25 TO SEND line 142 feeds AND gate 168, OR 170, and drives write or read ready line 180 to a waveform as shown in FIG. 11B. The waveform of FIG. 11B has write or read Ready 180 driven to 1 for memory cycles 2 and 3 and to 0 for the other memory cycles 1, 4, which is slightly different timing for ready signal 180 than the other two cases (FIGS. 11H and 12D) of allocating 50 MB/s to processor 4. The corresponding ready 180 timing is generated by ORing into gate 167 memory cycle 2 line 152 and memory cycle 3 line 153 signals from decoder 144 (FIG. 10.) Gate 167 feeds AND gate 168 and provides the correct ready 180 timing, when 50 TO PROCESSOR, 25 TO SEND signal line 142 is a 1.

When bandwidth proportionment logic 162 (FIGS. 9, 13D) activates 25 TO PROCESSOR signal line 134, one quarter of the 100 MB/s of memory 18 bandwidth is to be allocated to processor 4. The 25 TO PROCESSOR signal line 134 feeds AND gate 171, OR 170, and drives write or read ready line 180 to a waveform as shown in FIG. 11E. The waveform of FIG. 11E has write or read ready 180 driven to 1 for memory cycle 4 and to 0 for the other memory cycles 1, 2, 3, which is slightly different timing for ready signal 180 than the other two cases (FIGS. 11F and 12A) of allocating 25 MB/s to processor 4. The corresponding ready 180 timing is generated by memory cycle 4 signal 154 from decoder 144 (FIG. 10), which feeds AND gate 171 and provides the correct ready 180 timing when 25 TO PROCESSOR signal line 134 is a 1.

When bandwidth proportionate logic block 162 does not activate any allocation signals to the logic of FIGS. 14A–14B, there are no active AND gates (174, 175, 169, 168, or 171) into OR gate 170. Thus, the output of OR gate 170 (write or read ready 180) goes to a constant 0 as shown in FIGS. 11C, 11D, 11G, 12B, 12F, and 12G.

Referring to FIGS. 15A–15D, combinational logic implementing generation of network ready signals and controls block 166 (FIG. 9) will be described. Generation of network ready signals 166 receives the allocation decisions of memory bandwidth proportionment block 162 (FIG. 9.) Network controls block 166, knowing the allocation decision, generates send ready 39 and RCV ready 41 in accordance with the waveforms shown in FIGS. 11A–11H and 12A–12G.

Referring to FIG. 15A, the inputs to OR gate 190 are the outputs of AND gates 183, 184, 185, 187, 188, 189, and 320. AND gate 183 inputs are 75 TO SEND line 138 and TIMING75 line 147. AND gate 184 inputs are 25 TO PROCESSOR, 50 TO SEND line 149, and CL1 line 141. AND gate 185 inputs are 50 TO PROCESSOR, 50 TO SEND line 140 and CL2 line 143 after being inverted at INV 186. The inputs to AND 187 are 50 TO SEND line 137 and CL2 line 143. The inputs to AND 189 are memory cycle 4 line 154 and the output of OR gate 188, the inputs to which are 25 TO SEND line 136 and 25 TO PROCESSOR, 25 TO SEND line 143. The inputs to AND gate 320 are 25 TO PROCESSOR, 50 TO SEND line 149 and the output of OR gate 322, the inputs to which are memory cycle 2 line 152 and memory cycle 4 line 154. The output of OR gate 190 is send ready signal 39.

Figure 15C:
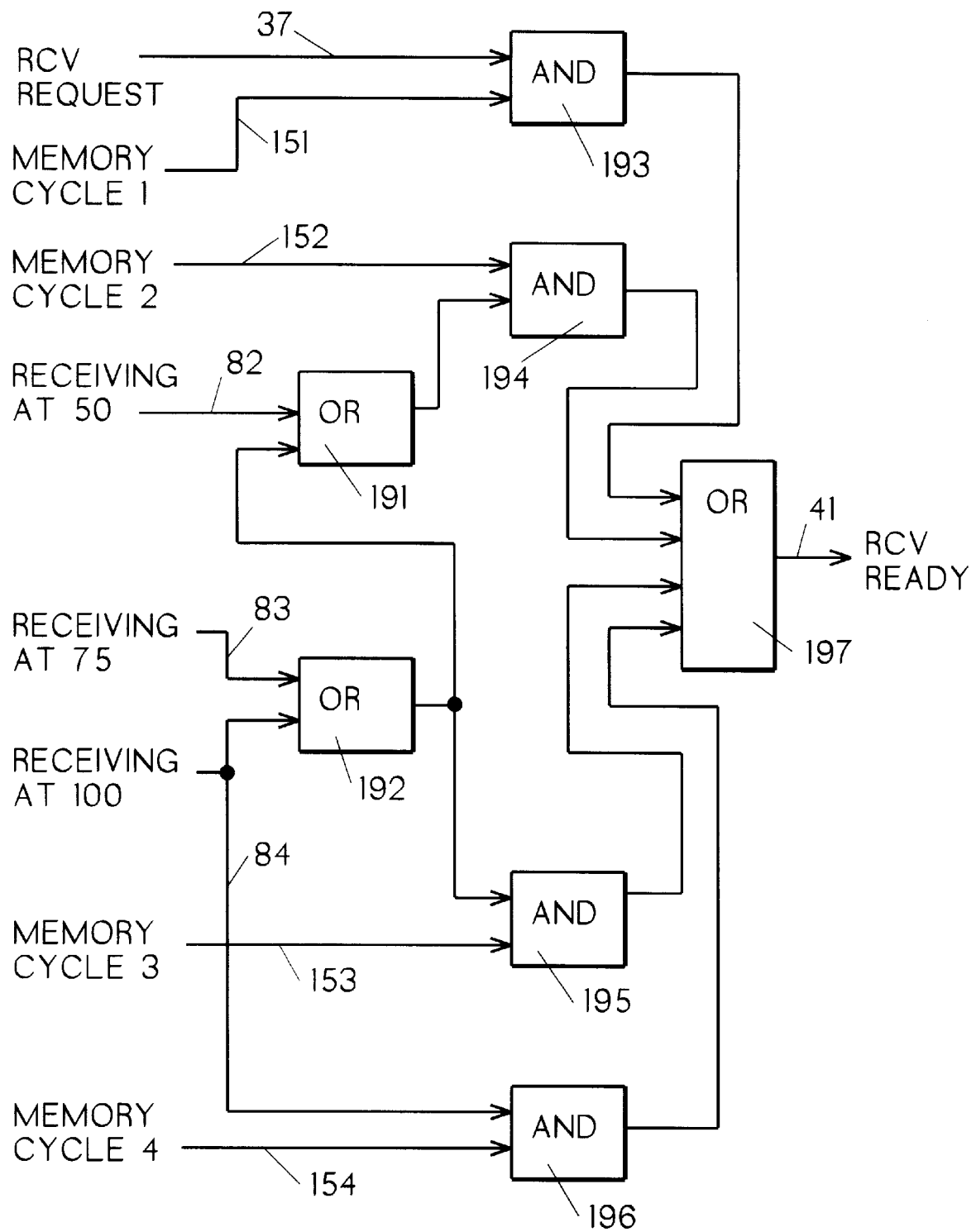
Figure 15D:
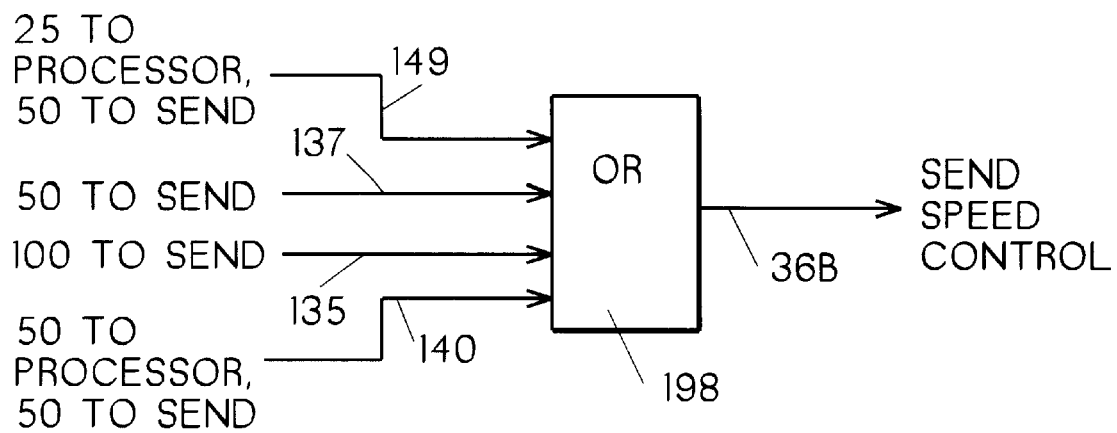
Figure 15E:
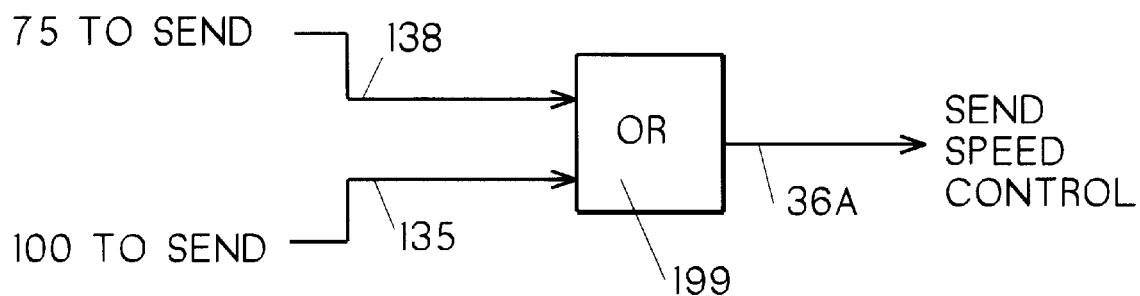

Referring to FIG. 15C, the inputs to OR gate 197 are AND gates 193, 194, 195, and 196. The inputs to AND gate 193 are receive request line 37 and memory cycle 1 line 151. The inputs to AND gate 194 are memory cycle 2 line 152 and the output of OR gate 191, the inputs to which are RECEIVING AT 50 line 82 and the output of OR gate 192. In inputs to OR gate 192 are RECEIVING AT 75 line 83 and RECEIVING AT 100 line 84, and its output is fed also to AND gate 195. The other input to AND gate is memory cycle 3 line 153. The inputs to AND gate 196 are memory cycle 4 line 154 and RECEIVING AT 100 line 84. The output of OR gate 197 is receive ready line 41.

Referring to FIG. 15D, send speed control line 36b is generated as the output of OR gate 198, the inputs to which are 50 TO SEND line 149, 25 TO PROCESSOR, 50 TO SEND line 149, 50 TO PROCESSOR, 50 TO SEND line 140, and 100 TO SEND line 135.

Referring to FIG. 15E, send speed control line 36a is generated as the output of OR gate 199, the inputs to which are 75 TO SEND line 138 and 100 TO SEND line 135.

Referring to FIG. 15A, in operation, combinational logic functions for send ready 39 are as follows. Responsive to logic block 162 activating 100 TO SEND line 135, all 100 MB/s of memory 18 bandwidth is allocated to send adapter 14.

Signal 100 TO SEND line 135 is a direct input to OR gate 190, driving send ready 39 to a constant logical 1 as shown in FIG. 12F.

Referring also to FIG. 13F, responsive to logic block 162 activating 75 TO SEND signal line 138, three fourths of the 100 MB/s of memory 18 bandwidth is allocated to send adapter 14. Signal line 75 TO SEND 138 is input to AND gate 183, which in turn drives OR gate 190 and send ready 39 to a waveform as shown in FIGS. 11H and 12G. The waveform of FIGS. 11H and 12R has send ready 39 driven to 0 for memory cycle 1 and driven to 1 for the other three memory cycle times 2, 3, and 4. The timing is generated by signal TIMING75 from gate 173 in FIG. 14A. TIMING75 feeds AND gate 183 to generate send ready 39, when the signal 75 TO SEND 138 is a 1.

Referring also to FIGS. 13G and 13K, responsive to logic block 162 activating either of the signals 50 TO SEND 137 or 25 TO PROCESSOR, 50 TO SEND 149, one half of the 100 MB/s of memory 18 bandwidth is to be allocated to send adapter 14. The 50 TO SEND signal line 137 feeds AND gate 187, OR 190, and drives Send Ready 39 to a waveform as shown in FIG. 11G. The waveform of FIG. 11G has send ready 39 driven to 0 for memory cycles 1 and 2, and driven to 1 for memory cycles 3 and 4. The corresponding ready 39 timing is generated directly by CL2 signal 143 (FIG. 10.) CL2 signal 143 is 0 for memory cycles 1 and 2, and is driven to 1 for memory cycles 3 and 4. The corresponding ready 39 timing is CL2 143 feeds AND gate 187 to generate send ready 39, when 50 TO SEND signal 137 is a 1.

Referring also to FIG. 13K responsive to logic block 162 activating 25 TO PROCESSOR, 50 TO SEND signal line 149, one half of the 100 MB/s of memory 18 bandwidth is allocated to send adapter 14. The 25 TO PROCESSOR, 50 TO SEND signal 149 feeds AND gate 320 and OR gate 190, and drives Send Ready 39 to the waveform shown in FIG. 12A. The waveform of FIG. 12A has send ready 39 driven to 1 for memory cycles 2 and 4, while it is driven to 0 for the other memory cycles 1 and 3. The corresponding ready 39 timing is generated by ORing Memory Cycle 2 line 152 and Memory Cycle 4 line 154 in gate 322. OR gate 322 feeds AND gate 320 to generate send ready 39, when 25 TO PROCESSOR, 50 TO SEND signal 149 is a 1. FIG. 12A has slightly different timing for ready signal 39 than the other two cases (FIGS. 11G and 12D) for allocating 50 MB/s to send adapter 14.

Referring also to FIG. 13I, responsive to logic block 162 activating 50 TO PROCESSOR, 50 TO SEND signal 140, one half of the 100 MB/s of memory 18 bandwidth is allocated to send adapter 14. The 50 TO PROCESSOR, 50 TO SEND signal line 140 feeds AND gate 185, OR gate 190, and drives Send Ready 39 to the waveform shown in FIG. 12D. The waveform of FIG. 12D has send ready 39 driven to 1 for memory cycles 1 and 2, while it is driven to 0 for the other memory cycles 3 and 4. The corresponding ready 39 timing is generated by the inverse of signal CL2 143 from FIG. 10 through inverter 186. CL2 signal 143 is 0 for memory cycles 1 and 2, and is 1 for memory cycles 3 and 4. The inverse timing is just the opposite. The corresponding ready 39 timing is generated by the inverse of CL2 143 feeding AND gate 185 to generate send ready 39, when 50 TO PROCESSOR, 50 TO SEND signal line 140 is a 1. FIG. 12D has slightly different timing for ready signal 39 than the other two cases (FIGS. 11G and 12A) for allocating 50 MB/s to send adapter 14.

Referring also to FIG. 13J, responsive to logic block 162 activating 50 TO PROCESSOR, 25 TO SEND line 142, one half of the 100 MB/s of memory 18 bandwidth is to be allocated to processor 4. The 50 TO PROCESSOR, 25 TO SEND line 142 feeds AND gate 168, OR 170, and drives write or read ready 180 to the waveform shown in FIG. 11B. The waveform of FIG. 11B has write or read ready line 180 driven to 1 for memory cycles 2 and 3 and to 0 for the other memory cycles 1 and 4, which is slightly different timing for ready signal 180 than the other two cases (FIGS. 11H and 12D) for allocating 50 MB/s to processor 4. The corresponding ready 180 timing is generated by ORing in gate 167 memory cycle 2 line 152 and memory cycle 3 line 153 (FIG. 10.) OR gate 167 feeds AND gate 168 and provides the correct ready 180 timing, when 50 TO PROCESSOR, 25 TO SEND signal 142 is a 1.

Referring also to FIGS. 13L and 13H, responsive to logic block 162 activating either the 25 TO PROCESSOR, 25 TO SEND line 143 or 25 TO SEND line 136, one quarter of the 100 MB/s of memory 18 bandwidth is allocated to send adapter 14. The 25 TO PROCESSOR, 25 TO SEND signal line 143 and 25 TO SEND signal line 136 are ORed together in OR gate 188, which feeds AND gate 189 and OR gate 190, and drives send ready 39 to the waveform shown in FIGS. 11B, 11D, and 11F. The waveforms of FIGS. 11B, 11D, and 11F have send ready 39 driven to 1 for memory cycle 4 and to 0 for the other memory cycles 1, 2, and 3. The corresponding ready 39 timing is generated directly by memory cycle 4 signal 154 (FIG. 10) feeding AND gate 189 to generate send ready 39, when either 25 TO PROCESSOR, 25 TO SEND signal line 143 or 25 TO SEND signal line 136 is a 1.

When memory bandwidth proportionment block 162 (FIG. 9) does not activate any allocation signals to send ready logic 166 (FIGS. 9 and 15A–15E), there are no active AND gates 183, 184, 187, 189, or 320 into OR gate 190. Thus, the output of OR gate 190 on send ready line 39 goes to a constant 0 as shown in FIGS. 11C, 11E, 11H, 12C, and 12E.

Referring to FIG. 15C, in operation, the combinational logic functions for driving RCV ready signal line 41 will be explained.

Referring to FIG. 15C in connection with FIG. 13F, if logic decode 60 activates the RCV status signal RECEIVING AT 25 on line 81, one quarter of the 100 MB/s of memory 18 bandwidth is allocated RCV adapter 12. The waveform for RCV Ready 41 is shown in FIGS. 11B, 12A, 12B, and 12C. The waveforms of FIGS. 11B, 12A, 12B and 12C have RCV Ready 41 driven to 1 for memory cycle 1 and to 0 for the other memory cycles 2, 3, and 4. The corresponding ready 41 timing is generated directly by signal memory cycle 1 from 2:4 decoder 144 (FIG. 10B.) The corresponding ready 39 timing is generated by memory cycle 1 line 151 feeding AND gate 193 to OR gate 197 to generate RCV Ready 41, whenever there is an active RCV request 37 from RCV adapter 12 to AND gate 193. RCV ready 41 is always active during memory cycle 1 whenever there is an active RCV Request 37, not just for the RECEIVING AT 25 case.

If decoder 60 activates RECEIVING AT 50 signal line 82, one half of the 100 MB/s of memory 18 bandwidth is allocated to RCV adapter 12. RECEIVING AT 50 line 82 feeds OR gate 191, AND gate 194, OR gate 197, and drives RCV ready 41 to the waveform shown in FIGS. 11F, 11G, and 11H. The waveforms of FIGS. 11F, 11G, and 11H have RCV ready 41 driven to 1 for memory cycles 1 and 2, and driven to 0 for memory cycles 3 and 4. AND gate 193 always sets RCV ready 41 to 1 for memory cycle 1. AND gate 194, enabled by RECEIVING AT 50 line 82, sets RCV ready 41 to 1 for memory cycle 2. The corresponding ready 41 timing is driven by both AND gates 193 and 194 to generate RCV ready 41, when signals RECEIVING AT 50 line 82 and RCV request 37 are both 1's.

If decoder 60 activates RECEIVING AT 75 signal line 83, three fourths of the 100 MB/s of memory 18 bandwidth is allocated to RCV adapter 12. RECEIVING AT 75 line 83 feeds OR gate 192, AND gate 195, OR gate 197, and drives RCV ready 41 to the waveform shown in FIGS. 11D and 11E. The waveforms of FIGS. 11D and 11E have RCV ready 41 driven to 1 for memory cycles 1, 2, and 3, and driven to 0 for memory cycle 4. AND gate 193 always sets RCV ready 41 to 1 for memory cycle 1. AND gate 194, enabled by RECEIVING AT 75 line 83 through OR gate 191 and AND gate 194, sets RCV ready 41 to 1 for memory cycle 2. AND gate 195, enabled by RECEIVING AT 75 line 83 through OR gate 192, sets RCV ready 41 to 1 for memory cycle 3. The corresponding ready 41 timing is driven by AND gates 193, 194, and 195 to generate RCV ready 41, when signals RECEIVING AT 50 and RCV request 37 are both 1's.

If decoder 60 activates RECEIVING AT 100 signal line 84, all of the 100 MB/s of memory 18 bandwidth is allocated to RCV adapter 12. RECEIVING AT 100 signal line 84 feeds OR gate 192 and AND gate 196 directly, and OR gate 197, and drives RCV ready 41 to the waveform shown in FIG. 11C. The waveform of FIG. 11C has RCV ready 41 driven to 1 for memory cycles 1, 2, 3, and 4. AND gate 193 always sets RCV ready 41 to 1 for memory cycle 1. AND gate 194, enabled by RECEIVING AT 100 line 84 through OR gates 191 and 192, and AND gate 194, sets RCV ready 41 to 1 for memory cycle 2. AND gate 195, enabled by RECEIVING AT 100 line 84 through OR gate 192, sets RCV ready 41 to 1 for memory cycle 3. AND gate 196, enabled by RECEIVING AT 100 line 84, sets RCV ready 41 to 1 for memory cycle 4. The corresponding ready 41 timing is driven by AND gates 193, 194, 195, and 196 to generate RCV ready 41, when RECEIVING AT 100 line 84 and RCV request line 37 are both 1's.

When decode logic 60 does not activate any allocation signals 81–84 to the RCV ready logic of FIG. 15C, there are no active AND gates 193, 194, 195, 196 into OR gate 197. Thus, the output of OR gate 197 on RCV ready line 41 goes to a constant 0 as shown in FIGS. 12D, 12E, 12F, and 12G.

Referring to FIGS. 15D and 15E, the logic for generating send speed control signals 36a and 36b will next be described.

Referring to FIG. 15E in connection with FIGS. 13F and 13E, OR gate 199 generates send speed control signal 36a when the send speed is set at 75 TO SEND 138 or 100 TO SEND 135.

Referring to FIG. 15D in connection with FIGS. 13G, 13I, 13K and 13E, OR gate 198 generates send speed control signal 36b when the send speed set to be any of the versions of 50 TO SEND 137, 140 or 149 or 100 TO SEND 135. This generation of the send speed control signals 36 is consistent with the coded 36a and 36b signals shown in FIG. 5.

Referring to FIG. 5, control signals 36a and 36b are sent to send adapter 14, where they select the frequency (speed) at which the message is to be transferred over network 2. Control signals 36 select the frequency of sending clock 122 (FIG. 4), which controls the frequency at which the data bytes are sent to network 2.

Figure 16A:
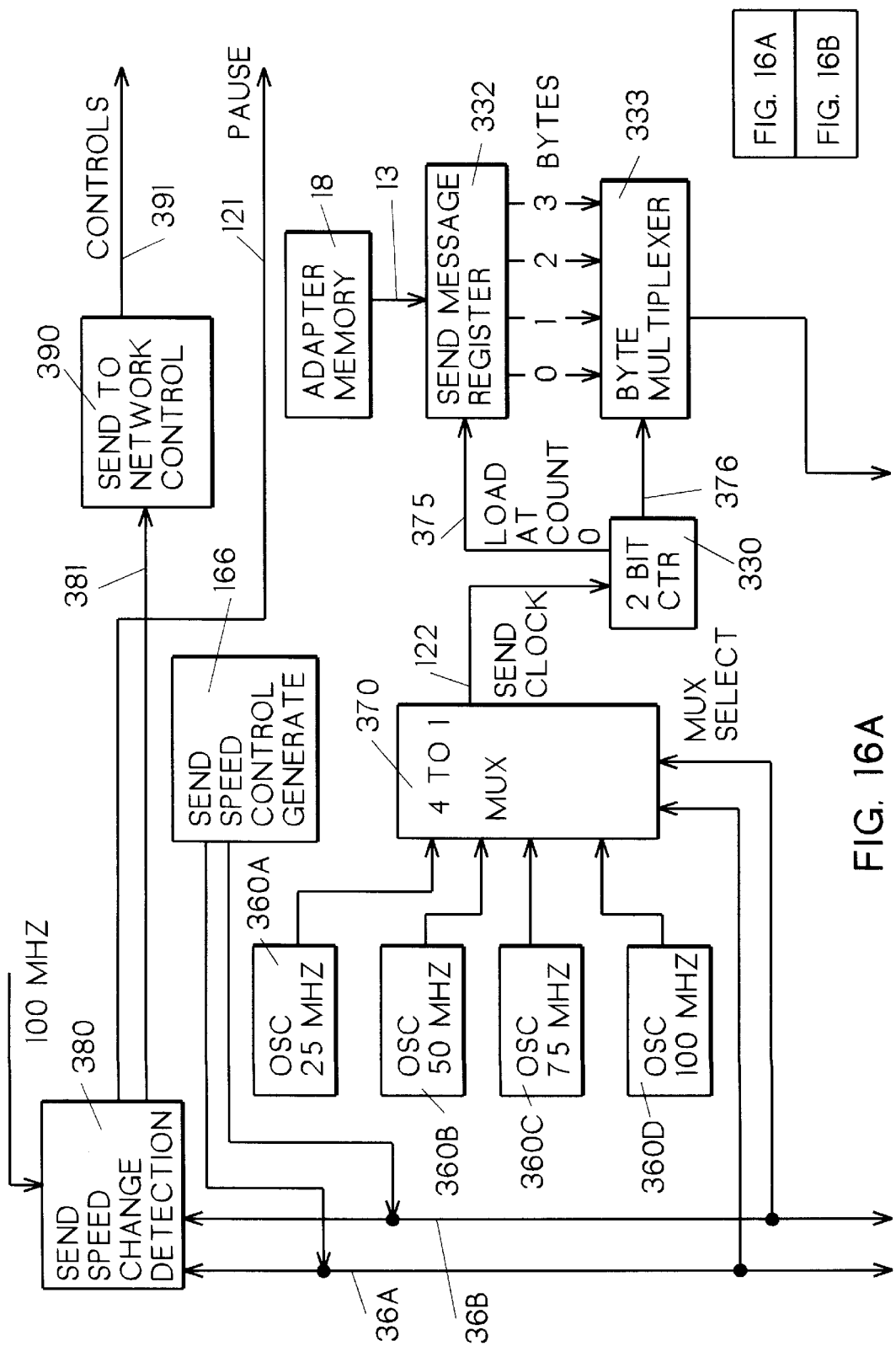
FIGS. 16A and 16B are a logic flow diagram showing the logic in the send adapter for selecting and transmitting data to the network interface at a plurality of speeds according to the preferred embodiment of this invention.
Figure 16B:
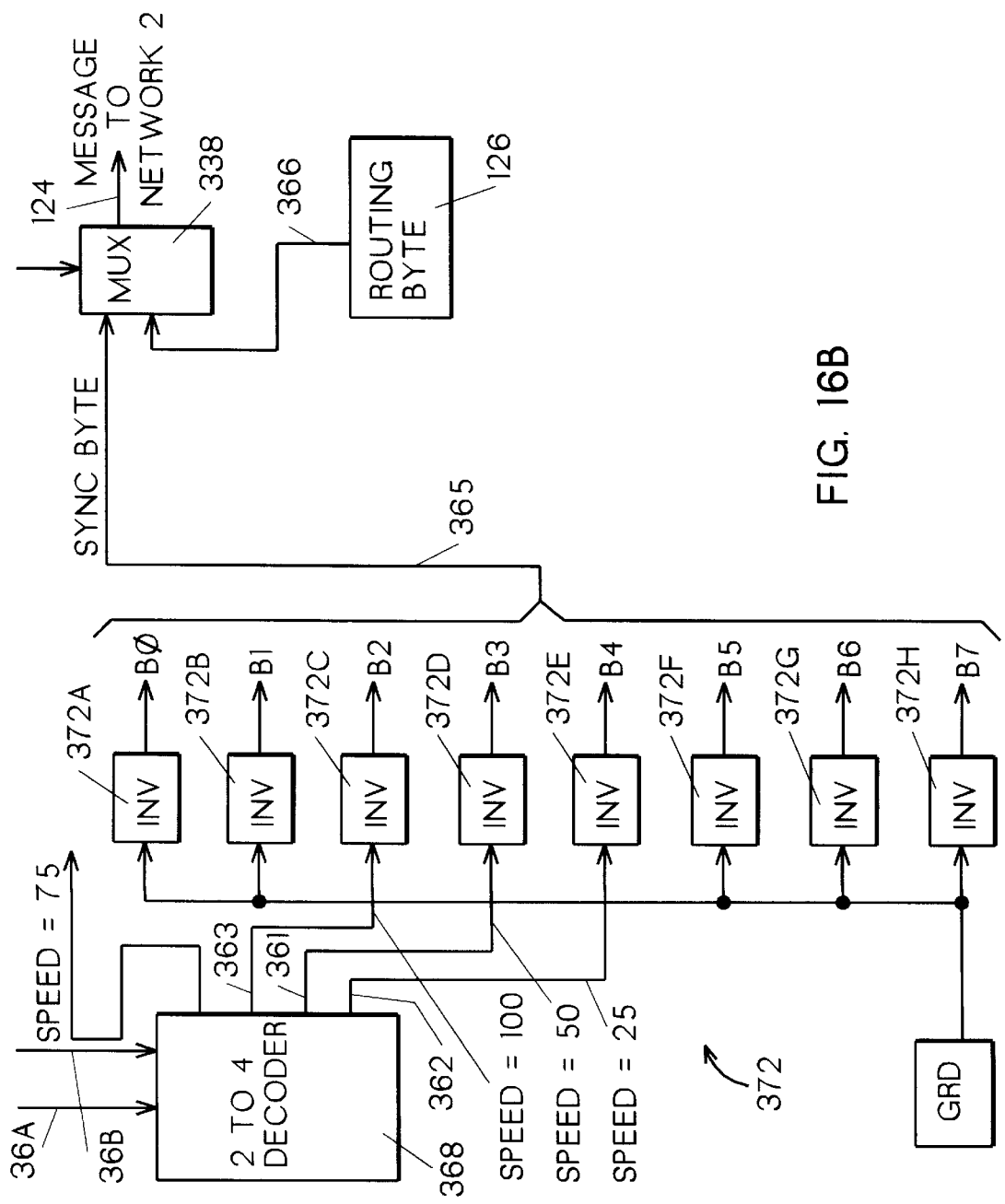

Referring to FIGS. 16A–16B, the speed control selection logic in send adapter 14 will next be described.

Data message bus 13 from adapter memory 18 feeds send message register 332, the outputs of which are fed as bytes 1 through 3 to byte multiplexer 333 and thence to multiplexer 338, where they are multiplexed with sync byte 365 and routing bytes 366 and placed on data bus 124 to network 2.

Send speed control bits 36a and 36b from dynamic allocation logic 30 are fed to 4 to 1 multiplexer 370, send speed change direction block 380 and 2 to 4 decoder 368. Send speed change direction block 380 is clocked by 100 MHZ, and its outputs appears on pause and resync line 381 to control block 390 and on pause line 121 to network 2. The outputs of control block 390 appear on controls lines 391.

Multiplexer 370 is driven by 25 MHZ oscillator 360A, 50 MHZ oscillator 360B, 75 MHZ oscillator 360C, and 100 MHZ oscillator 360D, and its output appears on sending clock line 122 to counter 330, the outputs of which are load at count=0 line 375 to send message register 332 and byte select line 376 to byte multiplexer 333.

Decoder 368 outputs SPEED=50 line 361, SPEED=75 line 362 and SPEED=100 line 363 are fed to inverters 372D, 372E and 372C, respectively. Inverters 372A, 372B, 372F, 372G, and 372H are tied to ground GRD, so as to force their outputs B0, B1, B5, B6 and B7 to logical 1's. The outputs B0 through B7 appear on sync byte line 365, such that sync byte values of 1111, 1110 1111, 1111 0111, and 1101 1111 represent 25 MHZ, 50 MHZ, 75 MHZ and 100 MHZ, respectively.

Referring further to FIGS. 16A–16B, in operation, two control bits 36a and 36b coming from dynamic allocation logic 30 are used to control multiplexer block 370. Block 370 selects one of four mutually exclusive frequencies to gate to its output, which becomes the sending clock signal 122 of FIG. 4 and defines the frequency of the data sent to network 2. The way that sending clock 122 determines the data transmission frequency is through block 330, which is a 2-bit cyclic counter that determines which byte is being sent at any given time. The 2-bit cyclic counter 330 increments on the rise of each sending clock 122, so it counts at the rate defined by MUX 370. The output of block 330 feeds and controls byte multiplexer 333, which selects one byte at a time (4 bytes per message word). The selected byte is output to network 2 through multiplexer 338. Data message words are accessed from send FIFO 40 in adapter memory 18 on bus 13 to register 332. While the next word of the message is being fetched from adapter memory 18 based on send ready 39, the data message word in register 332 is sent to network 2. Byte multiplexer 333 selects one byte at a time and sends it to the network. Counter 330 increments every clock time of sending clock 122 and causes bytes to be continually read out in cyclic order: Byte 0, Byte 1, Byte 2, Byte 3, Byte 0, etc. Everytime that Byte 0 becomes active, simultaneously the next word is loaded into register 332, so that the next word is present in register 332 everytime that Byte 0 starts a new transmission cycle of the next 4 bytes.

However, before starting data message transmission to network 2, two other transmittals must occur: routing bytes 126 and SYNC byte 127 as shown in FIG. 4. Routing bytes 126 are stripped off by network 2, but SYNC byte 127 is passed from send adapter 14 through network 2 to RCV adapter 12 at the destination node. SYNC byte 127 serves two purposes at RCV adapter 12: 1) It provides one clock time to permit the RCV adapter to get in synchronization with the incoming asynchronous data, and 2) it defines the speed of the incoming message. The 4 allowable SYNC bytes and their meaning in the preferred embodiments are: 1111 means the message is transmitted at 25 MHZ, 1110 1111 means the message is transmitted at 50 MHZ, 1111 0111 means the message is transmitted at 75 MHZ, and 1101 1111 means the message is transmitted at 100 MHZ.

Referring further to FIGS. 16A–16B in connection with FIGS. 4, 15D and 15E, the logic that creates the variable SYNC byte pattern 127 on line 365 will next be described. SYNC byte 127 is variable and indicates the speed at which send adapter 14 is transmitting the message. Send speed control bits 36a and 36b from dynamic allocation logic 30 are fed to 2-to-4 decoder 368. Decoder 368 decodes the bits into 4 discrete signals, each defining one of the 4 transmission speeds. The 4 signals generated by decoder 368 are mutually exclusive. The SYNC byte generator circuitry 372 comprises 8 inverters 372A to 372H, which are fed either by ground (GRD=logical 0) or one of the signals from decoder 368. Ground through an inverter yields a logical 1, so the inputs to inverters (372 A, B, F, G, and H) are all grounded to place logical 1's on bits 0, 1, 5, 6, and 7 of SYNC byte 127. These 5 bits are always 1's, regardless of which transmission speed is selected. Inverter 372C is fed from the Speed=100 signal from block 368 and causes SYNC byte bit 2 to go to 0 only when the 100 MB/s speed is selected. Inverter 372D is fed from the Speed=50 signal from block 368 and causes SYNC byte bit 3 to go to 0 only when the 50 MB/s speed is selected. Inverter 372E is fed from the Speed=75 signal from block 368 and causes SYNC byte bit 4 to go to 0 only when the 75 MB/s speed is selected. For the 25 MB/s speed selection, all 8 bits of SYNC byte 127 are 1's. SYNC byte 127 leaving generator 372 and defining the message speed goes to the byte-wide data input multiplexer 338 and is gated through to network 2 for only 1 clock time of sending clock 127.

Dynamic allocation logic 30 monitors on a real time basis the active requesters for use of adapter memory 18 and the current receiving rate from RCV adapter 12. Logic 30 allocates bandwidths to requestors and responds instantly as requester demands change. A common case is for send adapter 14 to begin sending a message at one frequency (speed) and then to change the rate one or more times before the message transfer is complete. The mechanism for changing the transfer rate during a message is controlled by send speed change detection logic block 380. Logic 380 continually monitors send speed control lines 36a and 36b. Every clock cycle of sending clock 122, logic 120 saves the state of the send speed controls 36a and 36b for one cycle and compares the state of lines 36a and 36b during the present cycle to their value during the previous cycle. Normally, the compare is equal and the message transfer proceeds without requiring any change. However, if the compare is not equal, dynamic allocation 30 has commanded a change in speed during a message transfer.

Upon detecting a rate change, logic 380 issues the pause and resync signal 381 to send to network control logic 390. This temporarily halts the message transfer, sends all zeroes data bytes, and then resynchronizes and continues the message transfer from where it left off. Logic 380 also generates pause signal 121 to network 2 to inform RCV adapter 12, which is receiving the current message, that a pause and resync operation is taking place.

Figure 17A:
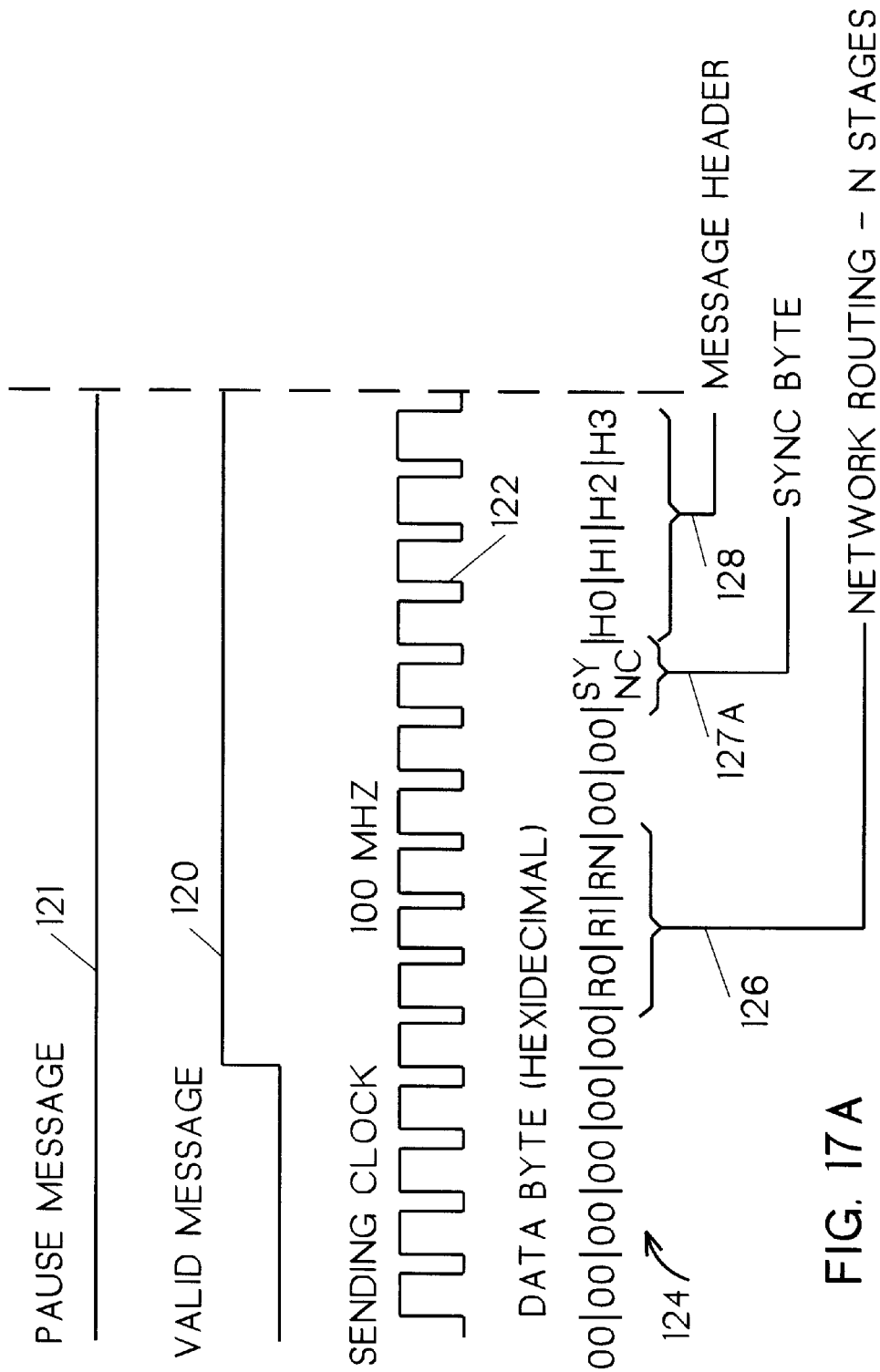
FIGS. 17A and 17B are a timing diagram showing the method for changing transmission speeds during the sending of a data message according to the preferred embodiment of this invention.
Figure 17B:
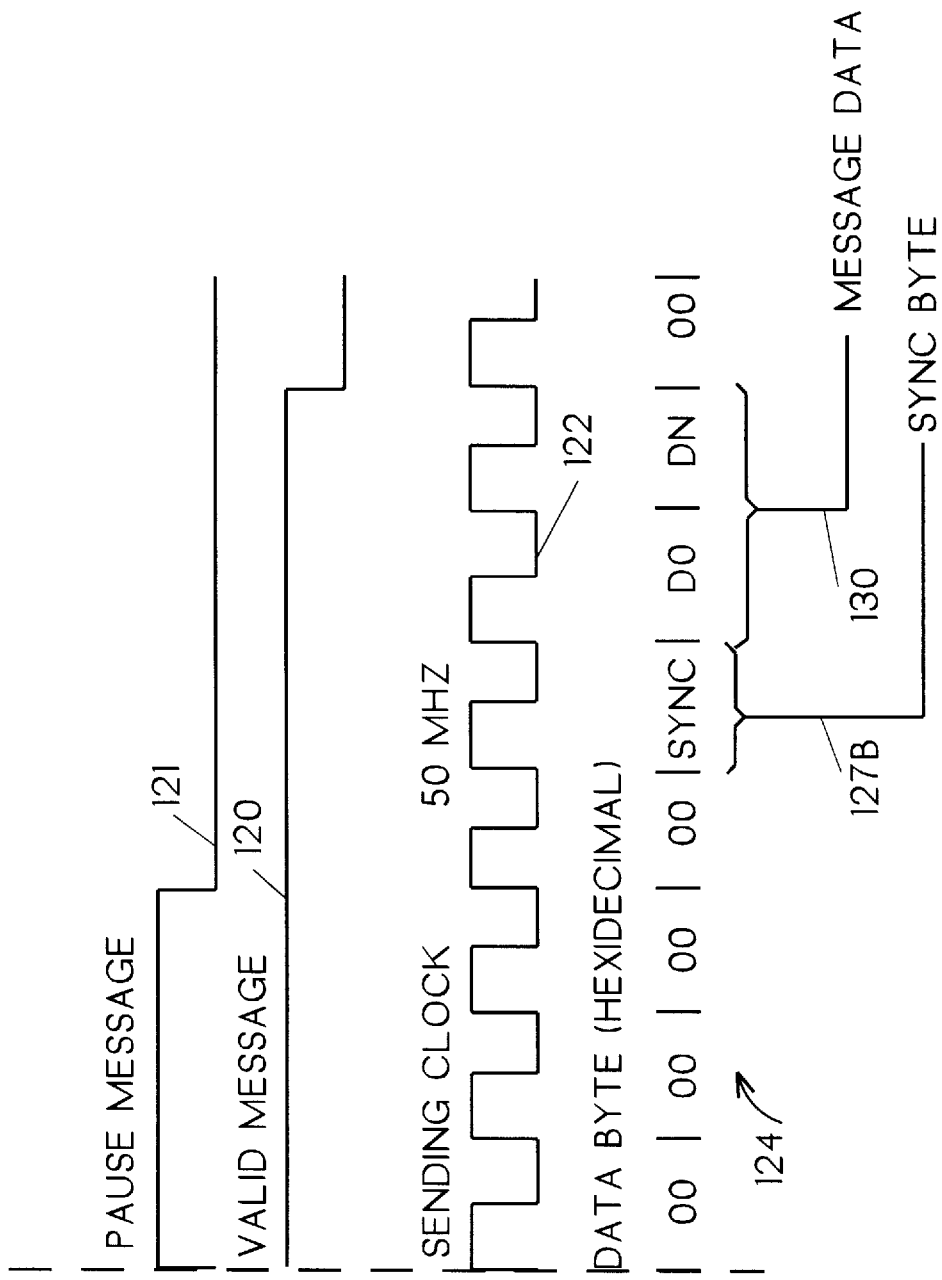

Referring to FIGS. 17A–17B in connection with FIG. 4, the timing for the pause and resync operation is shown. The message transmittal begins as usual with the sending clock 122 implementing the selected frequency. For example, assume that initially send adapter 14 is allocated all 100 MB/s of memory 18 bandwidth and sending clock 122 is selected to be 100 MHZ. The message begins by transferring at 100 MHZ and the normal message sequence is executed as follows: network routing 126, SYNC byte 127, message header 128, and message data 130. The example shown in FIGS. 17A–17B assumes that the initial sending clock is 100 MHZ and a first Sync byte 127a (bit pattern 1101 1111) from sync byte generator 372 via multiplexer 338 is sent preceeding message 128 to inform the RCV adapter 12 on the other side of network 2 that it is receiving the message at 100 MB/s.

Logic 380 continually monitors send speed control lines 36a and 36b. Upon logic 380 detecting a new allocation to sending adapter 14 of 50 MB/s, it causes send adapter 14 to down-shift from sending at 100 MB/s to sending at 50 MB/s. Logic 380 responds immediately to the new allocation by executing a pause and resync sequence over network 2. Send speed controls 36a and 36b immediately change the sending clock 122 rate by changing the multiplexer selection to block 370. Pause message signal 121 is raised to network 2 and pause and resync signal 381 is generated to send to network control block 390. Block 390 sends all zeroes data bytes to network data lines 124 for 4 cycle times at the new send clock. Block 380 leaves pause signals 381 and 121 active for 3 clock cycle times, and then resets pause signals 381 and 121 to 0's to restart the data message at the newly selected clock rate. First, logic 390 sends a second sync byte 127b, and this is followed by the continuation of data message 130. Sync byte generator 372 loads sync byte 127b with a bit pattern 1111 0111 to indicate to the RCV adapter 12 over network 2 that the rate has been down shifted to 50 MB/s.

The pause and resync operation does not change the data message in anyway, it just delays the message five clock cycles to send new sync byte 127b and indicate a change in transmission rate. Routing bytes 126 are not repeated for the pause and resync operation. This is because the connections through network 2 are not broken, but held active so that the message can continue after the pause. The valid message signal 120 going to 0 breaks network connections. Since signal 120 stays at 1 during the pause and resync operations, the previously established connection through network 2 is not broken.

RCV adapter 12 receives sync bytes 127a and 127b and uses them to determine the receiving rate. A preferred apparatus for receiving data at one of a plurality of frequencies into RCV adapter 14 under control of coded SYNC bytes is described in U.S. patent application Ser. 08/763,468, filed Dec. 10, 1996 by H. T. Olnowich for Network Adapters For Multi-Speed Transmissions, of common assignee (Docket EN995119), the teaching of which are incorporated herein and used directly for the receiving portion of the present invention.

Advantages Over the Prior Art

An advantage of the preferred embodiment of this invention is that it provides a method and apparatus for a network adapter to dynamically allocate adapter memory and network bandwidths instantaneously on a demand basis. As previously noted, this has the effect of increasing the system performance by a factor of up to two.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, f or storing signals for controlling the operation of a computer according to the method of the invention and/or to structure its components in accordance with the system of the invention.

Accordingly, the scope of protection of this invention is limited only by the following claims and their equivalents.

I claim:

1. A communication network adapter comprising:
 a receive port for receiving non-packetized data messages over a parallel interface from a communication network;
 a send port for sending data messages over a parallel interface to said communication network;
 at least one processor port over a parallel interface for communicating data messages with respect to a nodal processor; and
 dynamic allocation logic for dynamically changing the allocation of adapter memory bandwidth to said send port, said receive port, and said processor port, and for dynamically changing the transmission rates of said send and receive ports between or during message transmission upon said changing of memory bandwidth allocation.

2. The adapter of claim 1, wherein said dynamic allocation logic is responsive to allocation control indicia from said nodal processor and to the presence of data messages at said receive port in allocating said memory bandwidth.

3. The adapter of claim 2, wherein said dynamic allocation logic is responsive to a change in said control indicia for reallocating memory bandwidth during message transmission.

4. Method for communicating data messages with respect to a network adapter memory, comprising the steps of:
 selectively receiving non-packetized data messages over a parallel interface from a communication network at a first adapter memory port;
 selectively sending non-packetized data messages over a parallel interface to said communication network at a second adapter memory port;
 selectively communicating data messages over a parallel interface with respect to a nodal processor at a third adapter memory port; and
 dynamically changing the allocation of adapter memory bandwidth amongst said ports, and for dynamically changing the transmission rates to and from said communication network, respectively, during or between message transmission upon said changing of memory bandwidth allocation.

5. A bidirectional store-and-forward apparatus for buffering data between a first device and a second device, comprising:
 a buffer memory having a plurality of memory parallel ports for providing intermediate storage for said data;
 a first sending interface from said first device for storing said data to said buffer memory via a first memory port from said first device;
 a first receiving interface from said first device for reading said data from said buffer memory via a second memory port to said first device;
 a second sending interface from said second device for storing said data to said buffer memory via a third memory port from said second device;
 a second receiving interface from said second device for reading said data from said buffer memory via a fourth memory port to said second device;
 a maximum bandwidth supported by said buffer memory for storing and forwarding said data;
 a partitioning means for assigning a percentage of said maximum memory bandwidth to each said plurality of memory ports of said buffer memory; and
 a dynamic allocation means for assigning a percentage of said maximum memory bandwidth to each of said plurality of memory ports of said buffer memory, for changing said percentage dynamically, and for dynamically changing during or between message transmission the transmission rates of said first sending and receiving interfaces upon said changing of percentage.

6. The buffer memory and plurality of memory ports of claim 5, wherein each memory port is active only when valid data being transferred over said each memory port require storing or forwarding.

7. The dynamic allocation means of claim 5, wherein a percentage of maximum bandwidth allotted to a given memory port is allocated only when said given memory port is active, otherwise said given memory port is allocated no memory bandwidth.

8. The dynamic allocation means of claim 7, wherein said percentage of memory bandwidth allotted to each of said plurality of memory ports is further controlled by programmable control registers.

9. The dynamic allocation means of claim 8, wherein said programmable control registers are programmed to select a normal transfer rate for each said memory port, which transfer rate is supported by said buffer memory when said memory port is active and said memory bandwidth does not exceed said maximim memory bandwidth.

10. The dynamic allocation means of claim 9, wherein said programmable control registers are further controlled to select a default memory bandwidth allocation for each said memory port when the sum of the normal transfer rates of all active memory ports would exceed said maximum memory bandwidth, such that the sum of said default memory bandwidth allocations do not exceed said maximum memory bandwidth.

11. The dynamic allocation means of claim 9, wherein said programmable control registers are further programmed to select one of a plurality of alternate default memory bandwidth allocations for each said memory port when the sum of the normal transfer rates of all active memory ports would exceed said maximum memory bandwidth, in which case a different one of the plurality of alternate default memory bandwidth allocations is selected depending upon which of said memory ports are active.

12. The dynamic allocation means of claim 11, wherein said programmable control registers are further programmed to select which of said memory ports are enabled to be allocated rate changes and which are not.

13. The store-and-forward apparatus of claim 12, wherein said first device is a nodal processor and wherein said second device is a switch network, and wherein messages are sent from and received to said nodal processor to/from said switch network via said store-and-forward apparatus as controlled by said dynamic allocation means.

14. The dynamic allocation means of claim 13, wherein said programmable control registers are programmed to enable the memory ports to and from said nodal processor from and to said buffer memory for rate changes, to enable the memory port from said buffer memory to said switch network for rate changes, and to enable the memory port from said switch network to said buffer memory for only a normal transfer rate.

15. The dynamic allocation means of claim 5, where memory bandwidth is reallocated either between sending or receiving messages with respect to said network or during the sending or receiving of messages with respect to said network.

16. The dynamic allocation means of claim 15, wherein memory bandwidth being reallocated during the sending or receiving of messages with respect to said network causes the frequency at which the message is sent to the network to change and conform to a reallocated memory bandwidth.

17. A message transmittal system for transmitting over an unclocked, asynchronous transmission medium, a single non-packetized message including a first portion and a second portion, comprising:

first adapter logic for executing message transmission during a first portion of said message being transmitted at a first transmission rate; and second adapter logic for executing message transmission during a second portion of said message being transmitted at a second transmission rate.

18. The message transmittal system of claim 17, wherein said second transmission rate is either faster or slower than said first transmission rate.

19. The message transmittal system of claim 18, wherein said first and second transmission rates are controlled by a single clock making a change from a first frequency to a second frequency.

20. The message transmittal system of claim 17, further including third adapter logic for transmitting a first synchronization byte prior to said first portion of said message being transmitted at said first transmission rate and fourth adapter logic for transmitting a second synchronization byte prior to said second portion of said message being transmitted at said second transmission rate.

21. The message transmittal system of claim 20, wherein message transmittal is continuous and a change from said first transmission rate to said second transmission rate occurs without losing or repeating any portion of said message.

22. The message transmittal system of claim 21, wherein said change from said first transmission rate to said second transmission rate occurs by temporarily pausing the message transfer after said first portion of said message has been transmitted, then inserting null bytes, then said second synchronization byte, and finally said second portion of said message.

23. The message transmittal system of claim 17, wherein the sizes of first and second message portions are unrestricted.

24. The message transmittal system of claim 23, wherein said message contains more than two portions, a plurality of portions being assigned different transmission rates.

* * * * *